US009606760B2

(12) United States Patent
Tanaka

(10) Patent No.: US 9,606,760 B2
(45) Date of Patent: Mar. 28, 2017

(54) IMAGE FORMING APPARATUS FOR EXECUTING A PRINT JOB BASED ON A RECEIVED PRINT REQUEST

(71) Applicant: CANON KABUSHIKI KAISHA, Tokyo (JP)

(72) Inventor: Yuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/607,994

(22) Filed: Jan. 28, 2015

(65) Prior Publication Data
US 2015/0227333 A1 Aug. 13, 2015

(30) Foreign Application Priority Data
Feb. 10, 2014 (JP) ................ 2014-023768

(51) Int. Cl.
*G06F 3/12* (2006.01)
*H04N 1/00* (2006.01)
(52) U.S. Cl.
CPC .......... *G06F 3/1267* (2013.01); *G06F 3/1203* (2013.01); *G06F 3/126* (2013.01); *G06F 3/1274* (2013.01); *G06F 3/1286* (2013.01); *G06F 3/1287* (2013.01); *H04N 1/00244* (2013.01); *H04N 1/00973* (2013.01); *H04N 2201/0094* (2013.01)

(58) Field of Classification Search
CPC ..................................... G06F 3/1267
USPC ......................................... 358/1.15
See application file for complete search history.

(56) References Cited

U.S. PATENT DOCUMENTS

| 8,786,876 | B2 | 7/2014 | Abe | |
|---|---|---|---|---|
| 2007/0171467 | A1* | 7/2007 | Mokuya et al. | 358/1.15 |
| 2011/0063668 | A1* | 3/2011 | Shirai | 358/1.15 |
| 2011/0128571 | A1* | 6/2011 | Abe | G06F 3/1206 358/1.15 |
| 2011/0128579 | A1* | 6/2011 | Igarashi et al. | 358/1.15 |
| 2011/0157626 | A1* | 6/2011 | Park | 358/1.15 |
| 2012/0212760 | A1* | 8/2012 | Sakura | G06F 3/1204 358/1.13 |

FOREIGN PATENT DOCUMENTS

JP 2011-134303 A 7/2011

* cited by examiner

*Primary Examiner* — Jacky X Zheng
(74) *Attorney, Agent, or Firm* — Fitzpatrick, Cella, Harper & Scinto

(57) ABSTRACT

The print request of a print job issued from an information processing apparatus via a wide area network is received. Print job information issued from the information processing apparatus via a local area network is received. The storage destinations of the print request of the print job and the print job information are controlled in the issuing order of the print request of the print job and the print job information.

19 Claims, 27 Drawing Sheets

FIG. 5

| User | Spooler | LM | PM (WSDMon) | WSD Printer |
|---|---|---|---|---|

PRINT START // ~ S501
　　StartPrintJob( ){ // ~ S502
　　　do{
　　　　spRet = LM_StartDocPort( ); // ~ S503
　　　　　LM_StartDocPort( ){ // ~ S504
　　　　　　lmMultipleJobs = FALSE; // ~ S505
　　　　　　lmRetry = 0; // ~ S506
　　　　　　lmReceivedId = "None"; // ~ S507 lmRet = PM_StartDocPort( ); // ~ S508
　　　　　　　PM_StartDocPort( ){ // ~ S509
　　　　　　　　//PERFORM APPROPRIATE
　　　　　　　　PROCESSING AS NEEDED ~ S510
　　　　　　　　pmRet = ··· ;
　　　　　　　　return pmRet; // ~ S511
　　　　　　　}
　　　　　　return lmRet; // ~ S512
　　　　　}
　　　}
　　　while(!spRet); // ~ S513
　　　···PRINT JOB REQUEST ISSUING/RESERVATION PROCESSING (FIG. 6)···
　　　spRet = LM_EndDocPort( );// ~ S520
　　　　　LM_EndDocPort( ){ // ~ S521
　　　　　　lmMultipleJobs = FALSE; // ~ S522
　　　　　　lmRetry = 0; // ~ S523
　　　　　　lmReceivedId = "None"; // ~ S524
　　　　　　lmRet = PM_EndDocPort( ); // ~ S525
　　　　　　　PM_EndDocPort( ){ // ~ S526
　　　　　　　　//PERFORM APPROPRIATE
　　　　　　　　PROCESSING AS NEEDED
　　　　　　　　pmRet = ···;
　　　　　　　　return pmRet; // ~ S528　　S527
　　　　　　　}
　　　　　　return lmRet; // ~ S529
　　　　　}
　　　return spRet; // ~ S530
　　}

F I G. 6

| User | Spooler | LM | PM (WSDMon) | WSD Printer |
|---|---|---|---|---|

...S501 TO S513 OF FIG. 5...
```
        do{ //  ~S601
           spRet = LM_WritePort( );  // ~S602                     S604
                  LM_WritePort( ){  // ~S603                              S605
                     if((lmRetry > 0) && (lmMultipleJobs == TRUE)){  //
                        lmRet = GetPrinterElements(ans:ABCCommand);  //
                                         GetPrinterElementsResponse  //
                        lmReceivedId = <ans:ReceivedId>;  // ~S607
                        if(lmReceivedId =="None"){  // ~S627          S606
                           lmRetry = 0;  // ~S628
                        }
                        else{  // ~S629
                           lmRetry = lmRetry + 1;  // ~S608
                        }
                     }
                     lmRet = PM_WritePort( );  // ~S609
                        PM_WritePort( ){  // ~S610
                           pmRet = CreatePrintJob( );  // ~S611
                                         CreatePrintJobResponse / Fault //
                           return pmRet;  // ~S613
                        }                                            S612
                     if(!lmRet){  // ~S614                       S616
                        if(lmRetry == 0){  // ~S615
                           lmRet = GetPrinterElements(wprt:PrinterDescription);  //
                                         GetPrinterElementsResponse  //
                           if(<ans:MultipleJobsControl> =="true"){  //    S617
                              lmMultipleJobs = TRUE;  //        S618
                           }
                        }                                  S619
                        if(lmMultipleJobs == TRUE){  // ~S620     S621
                           lmRet = GetPrinterElements(ans:ABCCommand);  //
                                         GetPrinterElementsResponse //
                           lmReceivedId = <ans:ReceivedId>;  // ~S623   S622
                           if(lmReceivedId =="None"){  // ~S630
                              lmRetry = 0;  // ~S631
                           }
                           else{  // ~S632
                              lmRetry = lmRetry + 1;  // ~S624
                           }
                        }
                     }
                     return lmRet;  // ~S625
                  }
        }
        while(!spRet);  // ~S626
              ...PRINT DATA TRANSMISSION PROCESSING (FIG. 7)...
```
...S520 TO S530 OF FIG. 5...

FIG. 7

| User | Spooler | LM | PM (WSDMon) | WSD Printer |
|---|---|---|---|---|

PRINT START //S501 OF FIG. 5

StartPrintJob(){ //S502 OF FIG. 5
......SKIP......
while(IspRet); //S513 OF FIG. 5, S626 OF FIG. 6
do{
  spRet = LM_WritePort(); // ~S701
    LM_WritePort(){ // ~S702
    lmRet = PM_WritePort();  // ~S703
      PM_WritePort(){ // ~S704
      pmRet = SendDocument(); // ~S705
        SendDocumentResponse // ~S706
      return pmRet; // ~S707
    }
    return lmRet; // ~S708
  }
} while(IspRet); // ~S709
spRet = LM_EndDocPort(); //S520 OF FIG. 5
......SKIP......
}

FIG. 8A

```
<soap:Envelope xmlns:soap="http://www.w3.org/2003/05/soap-envelope"
    xmlns:wsa="http://schemas.xmlsoap.org/ws/2004/08/addressing"
    xmlns:wprt="http://schemas.yyyy.xxx/YYYY/MM/wdp/print">
  <soap:Header>
    <wsa:Action>http://schemas.yyyy.xxx/YYYY/MM/wdp/print/GetPrinterElements</wsa:Action>
    <wsa:MessageID>%MESSAGE_ID%</wsa:MessageID>
    <wsa:ReplyTo>%REPLY_TO%</wsa:ReplyTo>
    <wsa:From>%FROM%</wsa:From>
  </soap:Header>
  <soap:Body>
    <wprt:GetPrinterElementsRequest>
      <wprt:RequestedElements>
        <wprt:Name>wprt:PrinterDescription</wprt:Name>        ~801
      </wprt:RequestedElements>
    </wprt:GetPrinterElementsRequest>
  </soap:Body>
</soap:Envelope>
```

FIG. 8B

```
<env:Envelope xmlns:env="http://www.w3.org/2003/05/soap-envelope"
    xmlns:wsa="http://schemas.xmlsoap.org/ws/2004/08/addressing"
    xmlns:wprt="http://schemas.yyyy.xxx/YYYY/MM/wdp/print"
    xmlns:ans="http://www.abc.xxx/ns/wdp/print/v100">     ~806
  <env:Header>
    <wsa:Action>http://schemas.yyyy.xxx/YYYY/MM/wdp/print/GetPrinterElementsResponse</wsa:Action>
    <wsa:MessageID>%MESSAGE_ID%</wsa:MessageID>
    <wsa:RelatesTo>%RELATES_TO%</wsa:RelatesTo>
    <wsa:To>%TO%</wsa:To>
  </env:Header>
  <env:Body>
    <wprt:GetPrinterElementsResponse>
      <wprt:PrinterElements>
        <wprt:ElementData Name='wprt:PrinterDescription' Valid='true'>   ~803
          <wprt:PrinterDescription>   ~805
            <wprt:DeviceId>   ~804
              MFG:ABC;CMD:ABCCommand;MDL:Kmmn;CLS:PRINTER;DES:ABC Kmmn;VER:1.00;INFO:000;
            </wprt:DeviceId>
            <ans:MultipleJobsControl>true</ans:MultipleJobsControl>   ~802
          </wprt:PrinterDescription>
        </wprt:ElementData>
      </wprt:PrinterElements>
    </wprt:GetPrinterElementsResponse>
  </env:Body>
</env:Envelope>
```

FIG. 9A

```
<soap:Envelope xmlns:soap="http://www.w3.org/2003/05/soap-envelope"
    xmlns:wsa="http://schemas.xmlsoap.org/ws/2004/08/addressing"
    xmlns:wprt="http://schemas.yyyy.xxx/YYYY/MM/wdp/print"
    xmlns:ans="http://www.abc.xxx/ns/wdp/print/v100">
  <soap:Header>
    <wsa:Action>http://schemas.yyyy.xxx/YYYY/MM/wdp/print/GetPrinterElements</wsa:Action>
      <wsa:MessageID>%MESSAGE_ID%</wsa:MessageID>
      <wsa:ReplyTo>%REPLY_TO%</wsa:ReplyTo>
      <wsa:From>%FROM%</wsa:From>
  </soap:Header>
<soap:Body>
  <wprt:GetPrinterElementsRequest>
    <wprt:RequestedElements>
      <wprt:Name>ans:ABCCommand</wprt:Name>  ~903
      <ans:ABCCommand>  ~904
        <ans:SplJobId>5</ans:SplJobId>  ~905
        <ans:ReceivedId>None</ans:ReceivedId>  ~906
        <ans:Retry>0</ans:Retry>  ~901
        <ans:OSVersion>6.1</ans:OSVersion>  ~907
        <ans:DateTime>2009-01-01T00:08:00</ans:DateTime>  ~908
      </ans:ABCCommand>
    </wprt:RequestedElements>
  </wprt:GetPrinterElementsRequest>
</soap:Body>
</soap:Envelope>
```

FIG. 9B

```
<env:Envelope xmlns:env="http://www.w3.org/2003/05/soap-envelope"
    xmlns:wsa="http://schemas.xmlsoap.org/ws/2004/08/addressing"
    xmlns:wprt="http://schemas.yyyy.xxx/YYYY/MM/wdp/print"
    xmlns:ans="http://www.abc.xxx/ns/wdp/print/v100">
  <env:Header>
    <wsa:Action>http://schemas.yyyy.xxx/YYYY/MM/wdp/print/GetPrinterElementsResponse</wsa:Action>
    <wsa:MessageID>%MESSAGE_ID%</wsa:MessageID>
    <wsa:RelatesTo>%RELATES_TO%</wsa:RelatesTo>
    <wsa:To>%TO%</wsa:To>
  </env:Header>
  <env:Body>
    <wprt:GetPrinterElementsResponse>
      <wprt:PrinterElements>
        <wprt:ElementData Name='ans:ABCCommand' Valid='true'>  ~909
          <ans:ABCCommand>  ~910
            <ans:SplJobId>5</ans:SplJobId>  ~911
            <ans:ReceivedId>00000202</ans:ReceivedId>  ~912
            <ans:Retry>0</ans:Retry>  ~902
            <ans:OSVersion>6.1</ans:OSVersion>  ~913
            <ans:DateTime>2009-01-01T00:08:01</ans:DateTime>  ~914
          </ans:ABCCommand>
        </wprt:ElementData>
      </wprt:PrinterElements>
    </wprt:GetPrinterElementsResponse>
  </env:Body>
</env:Envelope>
```

F I G. 10A

```
<soap:Envelope xmlns:soap="http://www.w3.org/2003/05/soap-envelope"
   xmlns:wsa="http://schemas.xmlsoap.org/ws/2004/08/addressing"
   xmlns:wprt="http://schemas.microsoft.com/windows/2006/08/wdp/print"
   xmlns:ans="http://www.abc.xxx/ns/wdp/print/v100">
 <soap:Header>
 <wsa:Action>http://schemas.yyyy.xxx/YYYY/MM/wdp/print/GetPrinterElements</wsa:Action>
   <wsa:MessageID>%MESSAGE_ID%</wsa:MessageID>
   <wsa:ReplyTo>%REPLY_TO%</wsa:ReplyTo>
   <wsa:From>%FROM%</wsa:From>
 </soap:Header>
 <soap:Body>
   <wprt:GetPrinterElementsRequest>
     <wprt:Name>ans:ABCCommand</wprt:Name>            ～1001
     <ans:ABCCommand>   ～1002
       <ans:SplJobId>5</ans:SplJobId>   ～1003
       <ans:ReceivedId>00000202</ans:ReceivedId>   ～1004
       <ans:Retry>1</ans:Retry>   ～1005
       <ans:OSVersion>6.1</ans:OSVersion>   ～1006
       <ans:DateTime>2009-01-01T00:08:04</ans:DateTime>   ～1007
     </ans:ABCCommand>
   </wprt:GetPrinterElementsRequest>
 </soap:Body>
</soap:Envelope>
```

F I G. 10B

```
<env:Envelope xmlns:env="http://www.w3.org/2003/05/soap-envelope"
   xmlns:wsa="http://schemas.xmlsoap.org/ws/2004/08/addressing"
   xmlns:wprt="http://schemas.microsoft.com/windows/2006/08/wdp/print"
   xmlns:ans="http://www.abc.xxx/ns/wdp/print/v100">
 <env:Header>
 <wsa:Action>http://schemas.yyyy.xxx/YYYY/MM/wdp/print/GetPrinterElementsResponse</wsa:Action>
   <wsa:MessageID>%MESSAGE_ID%</wsa:MessageID>
   <wsa:RelatesTo>%RELATES_TO%</wsa:RelatesTo>
   <wsa:To>%TO%</wsa:To>
 </env:Header>
 <env:Body>
   <wprt:GetPrinterElementsResponse>
     <wprt:PrinterElements>
       <wprt:ElementData Name='ans:ABCCommand'Valid='true'>   ～1008
         <ans:ABCCommand>   ～1009
           <ans:SplJobId>5</ans:SplJobId>   ～1010
           <ans:ReceivedId>00000202</ans:ReceivedId>   ～1011
           <ans:Retry>1</ans:Retry>   ～1012
           <ans:OSVersion>6.1</ans:OSVersion>   ～1013
           <ans:DateTime>2009-01-01T00:08:05</ans:DateTime>   ～1014
         </ans:ABCCommand>
       </wprt:ElementData>
     </wprt:PrinterElements>
   </wprt:GetPrinterElementsResponse>
 </env:Body>
</env:Envelope>
```

FIG. 11A

```
<soap:Envelope xmlns:soap="http://www.w3.org/2003/05/soap-envelope"
   xmlns:wsa="http://schemas.xmlsoap.org/ws/2004/08/addressing"
   xmlns:wprt="http://schemas.yyyy.xxx/YYYY/MM/wdp/print">  ~1105
 <soap:Header>
  <wsa:To>%TO%</wsa:To>
  <wsa:Action>http://schemas.yyyy.xxx/YYYY/MM/wdp/print/CreatePrintJob</wsa:Action>
  <wsa:MessageID>%MESSAGE_ID%</wsa:MessageID>
  <wsa:ReplyTo>%REPLY_TO%</wsa:ReplyTo>
  <wsa:From>%FROM%</wsa:From>
 </soap:Header>
 <soap:Body>
  <wprt:CreatePrintJobRequest>
   <wprt:PrintTicket>
    <wprt:JobDescription>  ~1101
     <wprt:JobName>Photo2</wprt:JobName>  ~1102
     <wprt:JobOriginatingUserName>Natsu</wprt:JobOriginatingUserName>  ~1103
    </wprt:JobDescription>
   </wprt:PrintTicket>
  </wprt:CreatePrintJobRequest>
 </soap:Body>
</soap:Envelope>
```

FIG. 11B

```
<soap:Envelope xmlns:soap="http://www.w3.org/2003/05/soap-envelope"
   xmlns:wsa="http://schemas.xmlsoap.org/ws/2004/08/addressing"
   xmlns:wsdp="http://schemas.xmlsoap.org/ws/2006/02/devprof"
   xmlns:wprt="http://schemas.yyyy.xxx/YYYY/MM/wdp/print">
 <soap:Header>
  <wsa:To>%TO%</wsa:To>
  <wsa:Action>http://schemas.yyyy.xxx/YYYY/MM/wdp/print/CreatePrintJobResponse</wsa:Action>
  <wsa:MessageID>%MESSAGE_ID%</wsa:MessageID>
  <wsa:RelatesTo>%RELATES_TO%</wsa:RelatesTo>
 </soap:Header>
 <soap:Body>
  <wprt:CreatePrintJobResponse>
   <wprt:JobId>1234</wprt:JobId>  ~1104
  </wprt:CreatePrintJobResponse>
 </soap:Body>
</soap:Envelope>
```

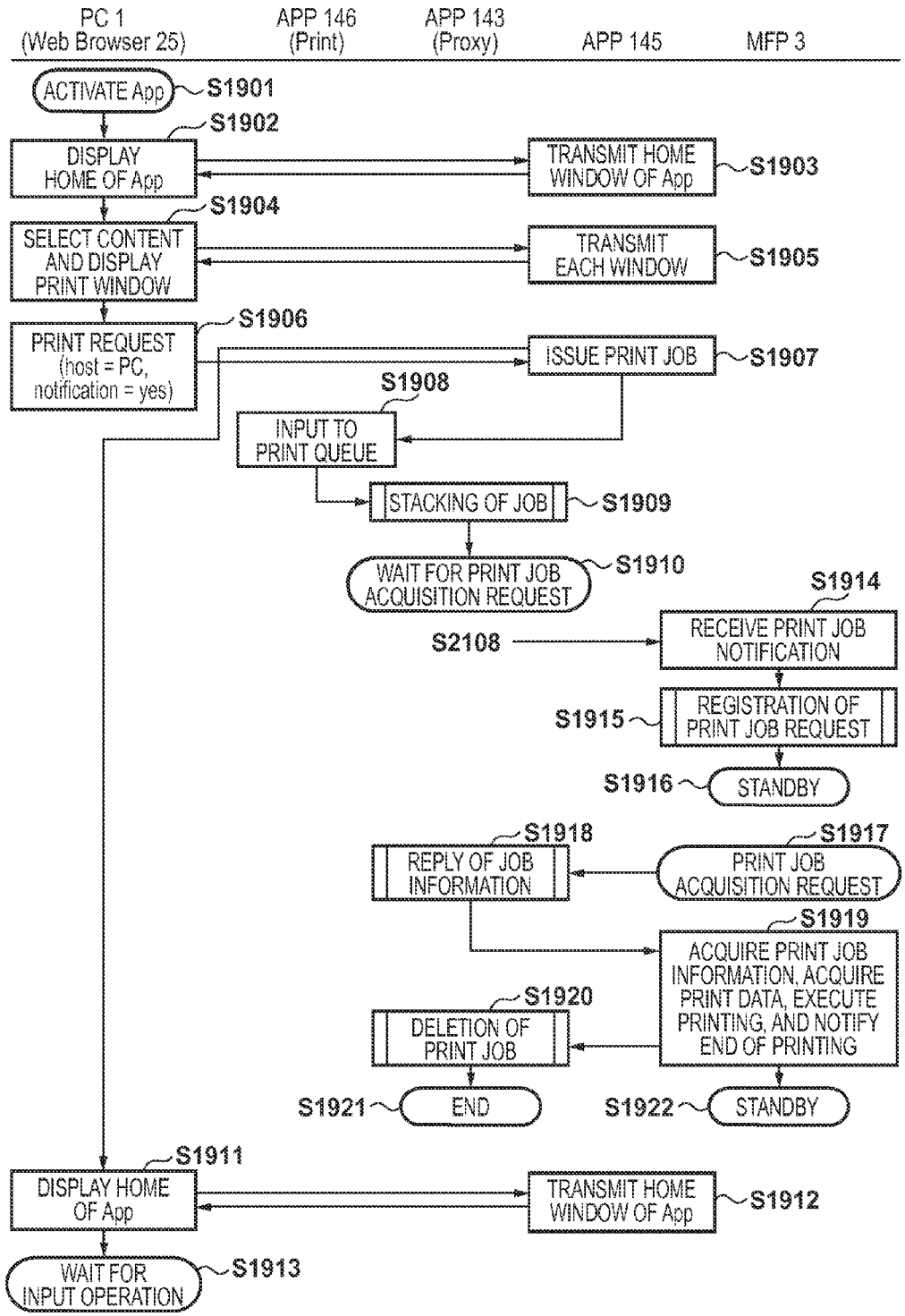

FIG. 22A

| TYPE OF QUEUE | JOB ID | ISSUING YEAR/MONTH/DAY/TIME |
|---|---|---|
| JOB QUEUE<br><br>(PRIORITY: 1,<br>CAPACITY: NO LIMITATION) | pm0010 | 20120814070715000 |
| | pm0011 | 20120814071020300 |
| | pm0012 | 20120814072033088 |
| | pm0013 | 20120814072501202 |
| | | |
| | | |
| | | |

FIG. 22B

| ID | INFORMATION |
|---|---|
| JOB ID | ISSUING YEAR/MONTH/DAY/TIME |
| | HOST(mfp, phone, etc.) |
| | OWNER NAME |
| | DEVICE ID |
| | JOB TICKET PATH (URI) |
| | PRINT IMAGE DATA PATH (URI) |
| | STATUS |
| | NECESSITY/NONNECESSITY OF JOB NOTIFICATION |
| | PRIORITY OF JOB |

F I G. 26A

| No | Protocol | Computer Name | wprt:Job Name | wprt: JobOriginating UserName | wprt:JobId | ans:SplJobId | ans:ReceivedId | Time |
|---|---|---|---|---|---|---|---|---|
| 1 | WSD | PC5 | Doc7 | User2 | 60 | 71 | 000008 | 905 |
| 2 | WSD | PC2 | Doc1 | User1 | 100 | 80 | 000004 | 901 |
| 3 | HTTP | - | - | - | - | - | - | - |
| 4 | WSD | PC6 | Doc6 | User5 | 130 | 90 | 000010 | 907 |
| 5 | WSD | PC7 | Doc11 | User8 | NULL | 95 | 000012 | 908 |
| 6 | HTTP | - | - | - | - | - | - | - |
| 7 | HTTP | - | - | - | - | - | - | - |
| 8 | HTTP | - | - | - | - | - | - | - |

F I G. 26B

| No | Protocol | Computer Name | wprt:Job Name | wprt: JobOriginating UserName | wprt:JobId | ans:SplJobId | ans:ReceivedId | Time |
|---|---|---|---|---|---|---|---|---|
| 1 | WSD | PC10 | Doc12 | User9 | NULL | 97 | 000020 | 1001 |
| 2 | WSD | PC8 | Doc5 | User11 | NULL | 100 | 000024 | 1006 |
| 3 | HTTP | - | - | - | - | - | - | - |
| 4 | - | - | - | - | - | - | - | - |
| 5 | - | - | - | - | - | - | - | - |
| 6 | - | - | - | - | - | - | - | - |
| 7 | - | - | - | - | - | - | - | - |
| 8 | - | - | - | - | - | - | - | - |

IMAGE FORMING APPARATUS FOR EXECUTING A PRINT JOB BASED ON A RECEIVED PRINT REQUEST

BACKGROUND OF THE INVENTION

Field of the Invention

The present invention relates to an image forming apparatus that manages a job, a control method, a storage medium storing a program, and an image forming system.

Description of the Related Art

In recent years, a peripheral apparatus control system constituted by connecting peripheral apparatuses to an information processing apparatus by utilizing various interfaces such as USB, Ethernet®, and a wireless LAN is effectively used at various sites such as home and an office. Examples of peripheral apparatuses are a printer, a copying machine, a facsimile apparatus, a scanner, a digital camera, and a multi-function peripheral of them. An information processing apparatus connected by a local network can implement a vendor-specific network printing system for a low-cost printer having no large-capacity storage medium, and a network printing system using a WSD (Web Service on Devices) print service. Even when performing printing using different network printing systems, it is known that a printer manages respective print jobs in a single print queue and can print them in an order in which the printer has accepted the print jobs from an information processing apparatus (Japanese Patent Laid-Open No. 2011-134303).

Recently, Google Inc. provides a cloud print service called Google Cloud Print® (to be abbreviated as GCP hereinafter) for such a printer. When using the cloud print service, the user first activates, from a personal computer (PC) or a mobile terminal, a document creation application (Web application) or the like using a Web browser installed in the PC or the mobile terminal. Then, the user can print a document by the printer or the multi-function peripheral via the Internet. Print jobs in cloud printing are managed by the print queue of an application that provides the cloud print service.

Conventionally, a print job from an information processing apparatus connected by a local network is managed in the print queue of the printer. A print job in cloud printing is registered in the print queue of an application that provides the cloud print service. When a printer accepts cloud printing from an information processing apparatus via a WAN (Wide Area Network), the cloud printing is not managed in the print queue of the printer but is directly executed. Even if the printer accepts cloud printing after accepting a print job from an information processing apparatus connected by a local network, the print job of cloud printing may interrupt and be printed first.

SUMMARY OF THE INVENTION

An aspect of the present invention is to eliminate the above-mentioned problems with the conventional technology. The present invention provides an image forming apparatus that manages, in a single queue, print jobs issued via a wide area network and print jobs issued via a local area network, and prints them in the acceptance order, a control method, a storage medium storing a program, and an image forming system.

The present invention in one aspect provides an image forming apparatus that is communicable via one of a wide area network and a local area network with an information processing apparatus configured to issue a print job, comprising: a first reception unit configured to receive a print request of a print job issued from the information processing apparatus via the wide area network; a second reception unit configured to receive print job information issued from the information processing apparatus via the local area network; and a control unit configured to control to store the print request of the print job received by the first reception unit and the print job information received by the second reception unit, in a first storage unit in an issuing order of the print request of the print job received by the first reception unit and the print job information received by the second reception unit, wherein the control unit stores one of the print request of the print job received by the first reception unit and the print job information received by the second reception unit, in accordance with a free capacity of the first storage unit, in a second storage unit of an apparatus connected to the image forming apparatus via a network.

According to the present invention, print jobs issued via a wide area network and print jobs issued via a local area network can be managed in a single queue and printed in the acceptance order.

Further features of the present invention will become apparent from the following description of exemplary embodiments with reference to the attached drawings.

BRIEF DESCRIPTION OF THE DRAWINGS

FIG. 5 is a sequence chart showing a calling sequence at the time of WSD printing;

FIG. 6 is a sequence chart showing a calling sequence at the time of WSD printing;

FIG. 7 is a sequence chart showing a calling sequence at the time of WSD printing;

FIGS. 8A and 8B are views showing the contents of GetPrinterElements;

FIGS. 9A and 9B are views showing the contents of GetPrinterElements;

FIGS. 10A and 10B are views showing the contents of GetPrinterElements;

FIGS. 11A and 11B are views showing the contents of CreatePrintJob;

FIG. 19 is a flowchart showing the procedures of processing of performing printing by executing the document creation APP from the Web browser of the PC;

FIGS. 22A and 22B are tables showing a job queue in the proxy APP, and a table that stores job information of a job stacked in the job queue of the proxy APP;

FIGS. 26A and 26B are tables each showing a print queue database that manages print job requests accepted by the MFP;

DESCRIPTION OF THE EMBODIMENTS

Figure 1:
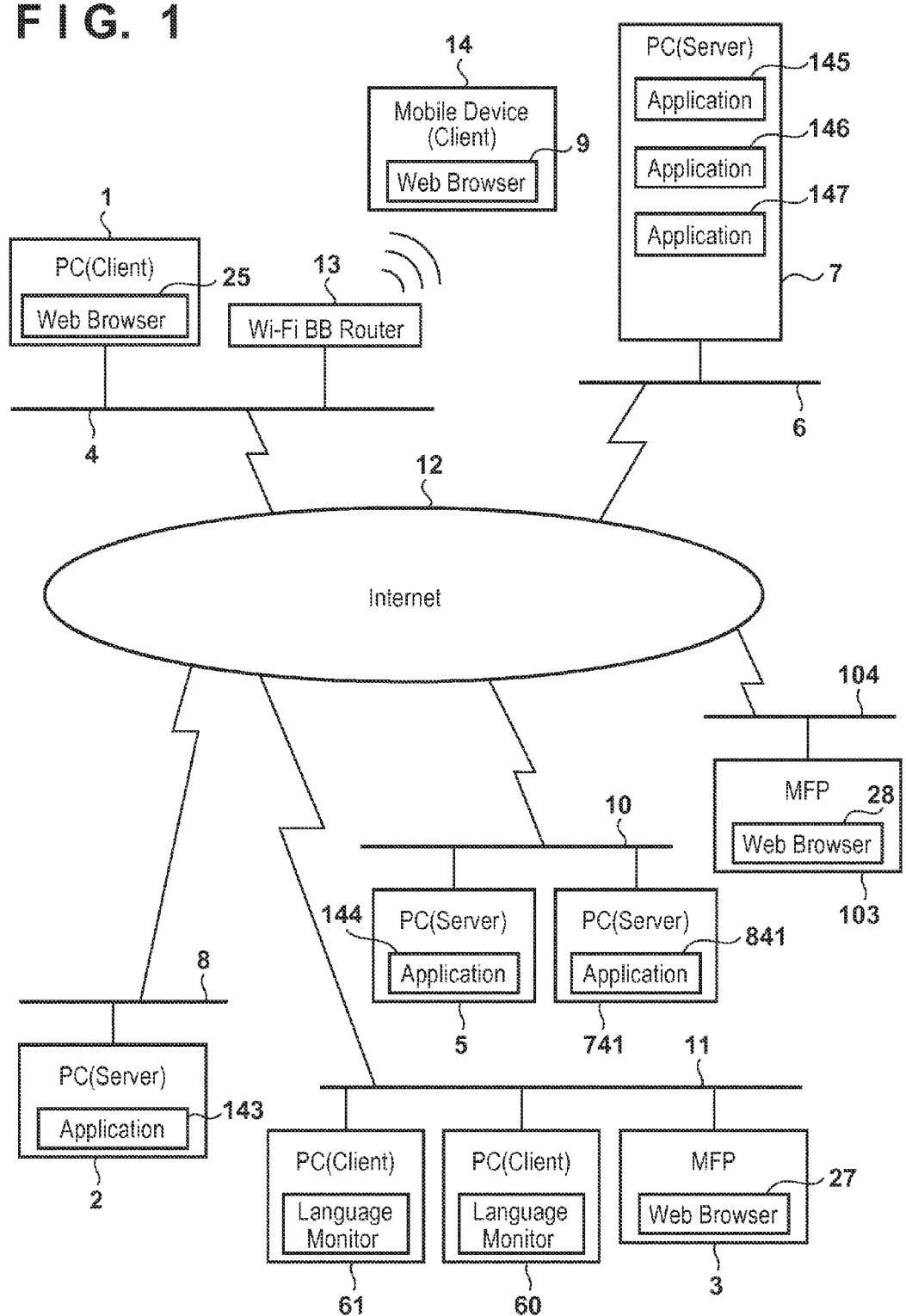
FIG. 1 is a block diagram showing the arrangement of a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

Of pieces of information of Windows7 Operating System cited below, those not to be described in detail are ones laid open to the public on the Microsoft Developer Network (MSDN) site. In the following description, WSD stands for Web Service on Devices and is information laid open to the public on the Windows Hardware Developer Central site. Print Service Definition Version 1.0 of WSD is Print Service defined by Microsoft Corporation, USA, which is laid open to the public on the Windows Hardware Developer Central site. A description of these pieces of information will not be given.

In the following description, a Web service API sometimes uses an HTTPS POST method (an example of a communication method) encrypted by SSL communication. As the POST method, a known one is usable. In the following description, the Web service API sometimes uses an HTTP GET method (an example of a communication method). As the GET method, a known one is usable. Also, in the following description, the Web service API sometimes uses an HTTPS GET method (an example of a communication method) encrypted by SSL communication. As the GET method, a known one is usable. HTTP stands for Hyper Text Transfer Protocol and is a known unencrypted communication protocol.

HTTPS stands for Hyper Text Transfer Protocol over Secure Socket Layer, and is a known encrypted communication protocol. SSL stands for Secure Socket Layer and is a known method of encrypting data on the Internet and transmitting/receiving the data. Google Cloud Print (GCP) is a known function at a site on the Internet.

First Embodiment

[System Arrangement]

FIG. 1 is a block diagram showing an example (image forming system) of the arrangement of a system including information processing apparatuses and peripheral apparatuses. The image forming system includes a plurality of information processing apparatuses, a plurality of peripheral apparatuses, and a terminal apparatus, which can communicate with each other via the Internet. Each of PCs 1, 2, 5, 7, 60, 61, and 741 is an example of the information processing apparatus (computer) and is, for example, a general personal computer. Each of the PCs 1, 2, 5, 7, 60, 61, and 741 includes hardware shown in FIG. 2A, details of which will be described later. The same OS may be installed in the respective PCs (PCs 1, 2, 5, 7, 60, 61, and 741), or different OSs may be installed. The OS of each PC is not particularly limited. In this embodiment, the first OS, for example, an operating system (OS) equivalent to a Chrome® OS available from Google Inc. is installed as an OS in the PC 1. In each of the PCs 2, 5, 60, 61, and 741, the second OS, for example, a Windows® Server OS available from Microsoft Corporation is installed. In the PC 7, the third OS, for example, an OS equivalent to Linux® is installed. The PCs 1, 2, 5, 7, 60, 61, and 741 are respectively connected to local area networks (LANs) 4, 6, 8, 10, and 11 constituted by interfaces (I/Fs) such as Ethernet®, and are also connected to a wide area network (WAN) (Internet 12). That is, a multi-function printer (MFP) 3, the PC 60, and the PC 61 are connected by a local area network.

Each of the MFP 3 and an MFP 103 is an example of a peripheral apparatus and is, for example, an image forming apparatus having a print function, a scanner function, a facsimile function, and the like. In this embodiment, each MFP includes a color inkjet printer, a color facsimile apparatus, a color scanner, and an external storage for a flash memory. Assume that each of the MFPs 3 and 103 is an MFP with a model name "Kmmn" available from ABC Company. Note that peripheral apparatuses are not limited to them and may be a printer, a copying machine, a facsimile apparatus, a scanner, a digital camera, and an apparatus having these multiple functions.

The MFP 3 is connected to a network 11 constituted by Ethernet®, and is also connected to the Internet 12. The MFP 103 is connected to a network 104 constituted by Ethernet®, and further connected to the Internet 12 via the network 104. The MFPs 3 and 103 include hardware shown in FIG. 2B, details of which will be described later.

A router 13 is, for example, a broadband router (Wi-Fi BB Router) including a Wi-Fi® wireless LAN, and is connected to the Internet 12. A mobile terminal (Mobile Device) 14 is, for example, a mobile phone or a mobile information terminal. The mobile terminal 14 includes hardware shown in FIG. 2A, details of which will be described later. The mobile terminal 14 is connected to the router 13, and connected to the Internet 12 via the router 13. In the mobile terminal 14 according to this embodiment, the fourth OS, for example, an OS equivalent to an Android® OS available from Google Inc. is installed. The following description assumes that the mobile terminal 14 is, for example, a mobile phone.

The PC 7 functions as a server, and includes applications 145, 146, and 147. The application 145 is a document creation application using a Web service, and will be called the document creation APP 145. The application 146 is an application that provides a cloud print service using a Web service, and will be called the cloud print APP 146. The application 147 is an image/document reading application using a Web service, and will be called the reading APP 147.

The PC 2 functions as a server and includes an application. An application 143 provides a cloud print proxy service that makes the MFPs 3 and 103 cope with a cloud print service provided by the cloud print APP 146. The application 143 will be called the proxy APP 143. The proxy APP 143 installed in the PC 2 can manage, for example, 5,000 MFPs at once, and can make the respective MFPs cope with a cloud print service provided by the cloud print APP 146. The proxy APP 143 includes a print queue shown in FIG. 22A, details of which will be described later.

The PC 5 functions as a server and includes an application 144. The application 144 provides an image conversion service that converts a PDF file into a JPEG file, and will be called the image conversion APP 144.

The PCs 1, 2, 5, 7, 60, 61, and 741, the mobile terminal 14, and the MFPs 3 and 103 are connected so that they can communicate with each other via the Internet 12. A Web browser 25 is installed in the PC 1, and a Web browser 9 is installed in the mobile terminal 14. Web browsers 27 and 28 are installed in the MFPs 3 and 103, respectively. The Web browsers 27 and 28 are identical, but the Web browsers 9, 25, and 27 are different from each other. That is, the Web browsers 9, 25, and 28 are different from each other. HTTP user agents passed to the document creation APP 145 in the User-Agent headers of HTTP requests by the Web browsers 9, 25, 27, and 28 are different from each other and are defined as follows:

User agent of the Web browser 9 of the mobile terminal 14: User-Agent: XXXX/5.0 (AAAA)

User agent of the Web browser 25 of the PC 1: User-Agent: XXXX/6.0 (CCCC)

User agent of the Web browser 27 of the MFP 3: User-Agent: YYYY/4.0 (DDDD)

AAAA, CCCC, and DDDD represent pieces of information required to identify respective terminals. By using these pieces of information, the document creation APP 145 can identify the type of terminal (for example, a mobile terminal, a PC, or an MFP), and switch a window to be displayed by the application and internal processing.

As described above, the cloud print APP 146 provides a cloud print service using a Web service, and has a function equivalent to, for example, the GCP provided by Google Inc. By utilizing this cloud print service, the document creation APP 145 can be executed from the Web browser 25 of the PC 1 or the Web browser 9 of the mobile terminal 14 to open a desired document and print it by the MFP 3 or 103.

Figure 17:
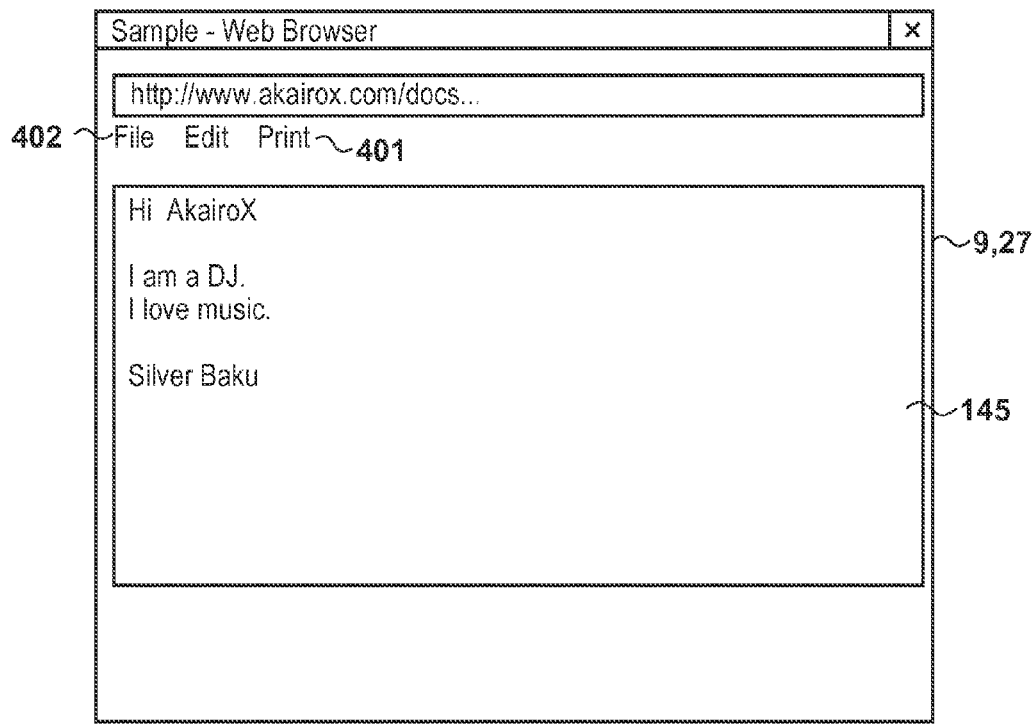
FIG. 17 is a view showing an example of the window of the document creation APP of the PC that is displayed by a Web browser.

For example, when the user wants to print an opened document and selects a print menu 401 on a window displayed by the document creation APP 145 as shown in FIG. 17, the cloud print APP 146 displays a print window 142 shown in FIG. 18, details of which will be described later. When the user selects a printer on the print window 142 and then presses a print button 534 to input a print execution instruction, the document creation APP 145 generates a print image as a PDF file.

The cloud print APP 146 generates a print job (print data) from this print image (PDF file) and print setting values selected on the print window 142, and stores the print job in a print queue for the selected printer in the cloud print service. Also, the cloud print APP 146 transmits a print job notification to the MFP. In this embodiment, the proxy APP 143 transmits a print job notification to the printer.

When the MFP has a function of rendering a PDF file, it can execute printing of a print job stored in the print queue. However, some low-end inkjet printers and MFPs do not have the function of rendering a PDF file. When such a printer or the like executes printing of a print job stored in the print queue, it is necessary to convert (pre-process) the print image of a PDF file into an image format (for example, a JPEG format) of a type that can be rendered by the low-end printer or the like.

To use a cloud print service provided by the cloud print APP 146, login using a user account and a password is necessary. A user who wants to use the cloud print service is prompted to register a user account and a password. When registering an MFP usable for printing in the cloud print service, the cloud print APP 146 first acquires an access token for utilizing the cloud print service by using the user account and the password. The cloud print APP 146 registers the MFP in association with the user account by using the acquired access token.

When registering a printer or an MFP, the cloud print APP 146 issues a device ID represented by a unique value, assigns it to each printer or MFP, and notifies the registration target printer or MFP of the device ID. As for registration processing of a printer or MFP, a known method is usable.

Figure 2A:
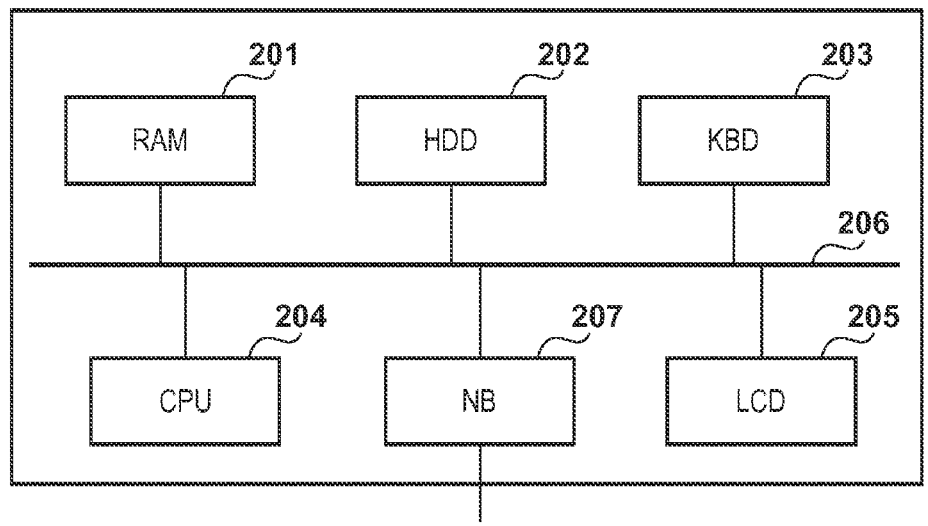
FIGS. 2A and 2B are block diagrams showing the hardware arrangements of a PC, mobile terminal, and MFP.
Figure 2B:
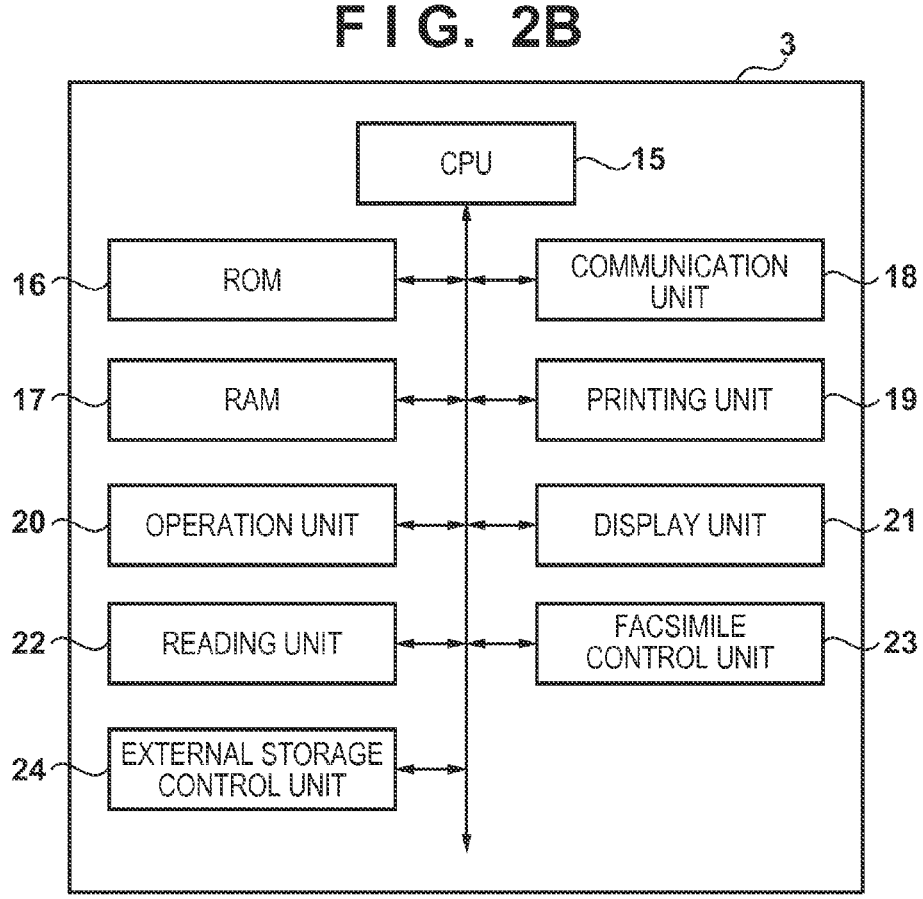

FIGS. 2A and 2B are block diagrams showing an example of the hardware arrangements of the PC, mobile terminal, and MFP. Each of the PCs 1, 2, 5, 7, 60, 61, and 741 and the mobile terminal 14 includes hardware shown in FIG. 2A. In FIG. 2A, the hardware arrangement will be explained by exemplifying the PC 1.

The PC 1 includes a random access memory unit (RAM 201), a hard disk drive unit (HDD 202), a keyboard unit (KBD 203), a CPU 204, a display (LCD 205), and a network board (NB 207). Also, the PC 1 includes a bus 206 that connects the above-mentioned building components to each other.

The CPU 204 is an example of a control unit and functions as the central processing unit of the PC 1. Note that the HDD 202 is an example of a storage unit. The storage unit may be a portable CD-ROM, an internally mounted ROM, a flash memory, an SSD, or the like. The KBD 203 is an example of an input unit. The LCD 205 is an example of a display unit. The NB 207 is an example of a communication control unit.

Figure 3A:
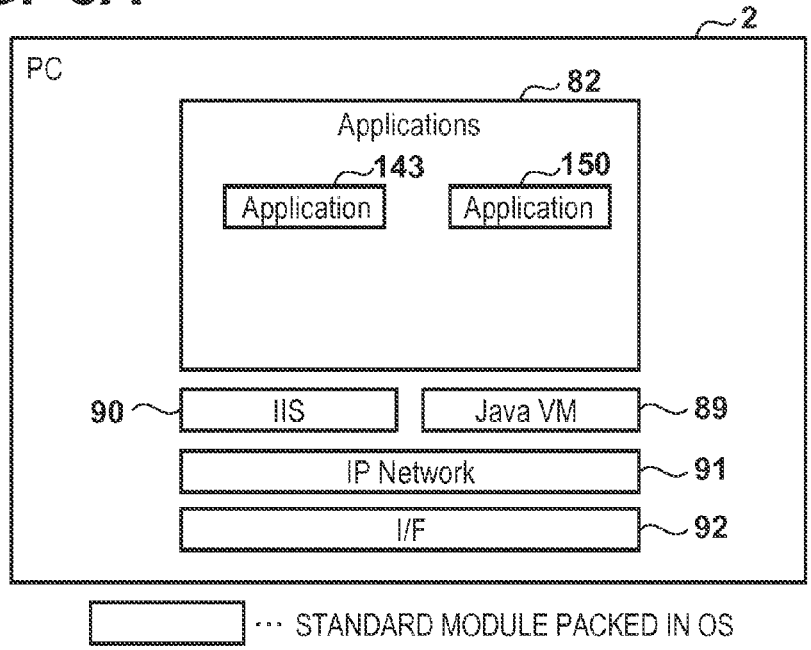
FIGS. 3A and 3B are block diagrams showing the software arrangement of the PC.
Figure 3B:
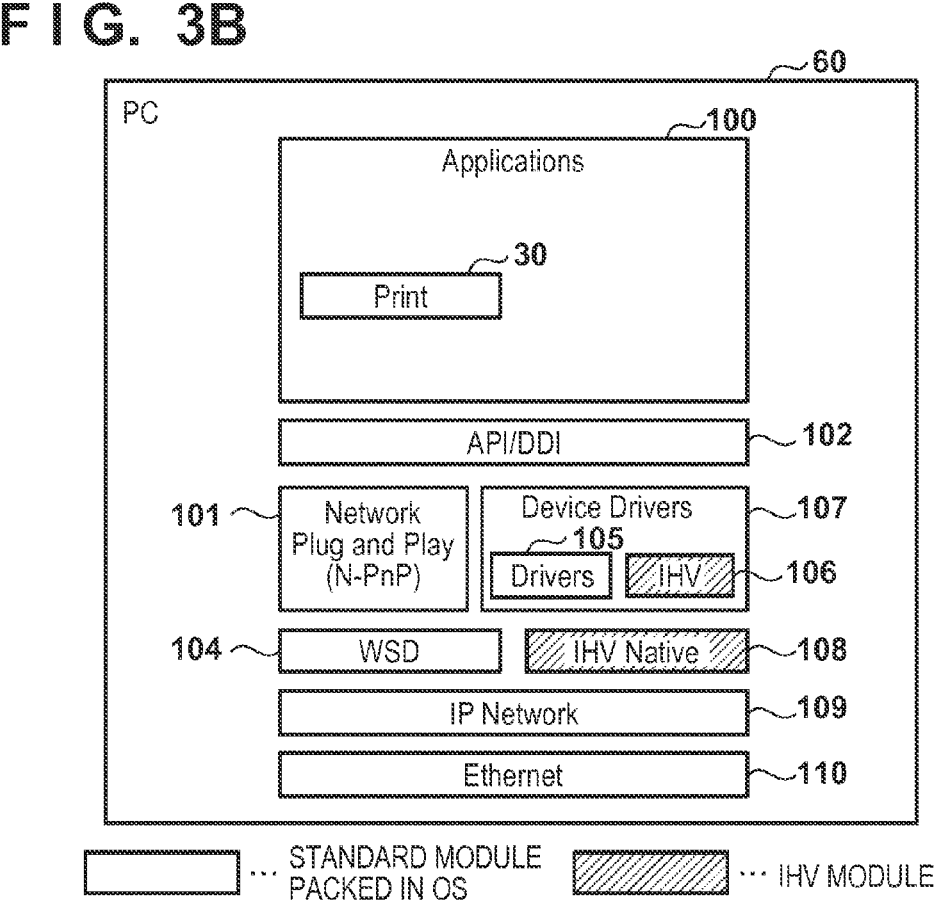

The programs of the proxy APP 143, respective modules (software) shown in FIGS. 3A and 3B, and the like are stored in the HDD 202, and if necessary, read out to the RAM 201 and executed by the CPU 204. Accordingly, the function of the proxy APP 143, those of the respective modules (software) shown in FIGS. 3A and 3B, and the like are implemented. Various databases (DBs) are allocated in the HDD 202, and the CPU 204 reads out information of each database to the RAM 201, as needed.

Each of the MFPs 3 and 103 includes hardware shown in FIG. 2B. In FIG. 2B, the hardware will be explained by exemplifying the MFP 3.

The MFP 3 includes a CPU 15, a ROM 16, a RAM 17, a communication unit 18, a printing unit 19, an operation unit 20, a display unit 21, a reading unit 22, a facsimile control unit 23, and an external storage control unit 24. The MFP 3 includes a bus that connects the above-mentioned building components to each other.

The CPU 15 is constituted by a microprocessor and the like. The CPU 15 serves as the central processing unit of the MFP 3, and controls the RAM 17, the communication unit 18, the printing unit 19, the operation unit 20, the display unit 21, the reading unit 22, the facsimile control unit 23, and the external storage control unit 24 in accordance with programs stored in the ROM 16.

The ROM 16 stores programs for executing print processing, processing of notifying a PC of the state of a print operation, and the like by the MFP 3 under the control of a printer driver (not shown). Also, the ROM 16 stores programs for executing facsimile transmission processing or reception processing, and processing of notifying the PC of the state of a facsimile operation (transmission or reception) by the MFP 3 under the control of a FAX driver (not shown). The RAM 17 temporarily stores print data. The print data is mainly sent from the PC, and printed by the printing unit 19 based on the print data. The RAM 17 also temporarily stores image data read by the reading unit 22, facsimile transmission data sent from the PC, facsimile reception data received by the facsimile control unit 23, and the like.

The communication unit 18 includes a connection port for the network 4 and a connection port for an analog telephone line, and controls Ethernet® and facsimile analog communication. The printing unit 19 includes a printing unit constituted by, for example, an inkjet printhead, respective color inks, a carriage, a printing paper conveyance mechanism, and an electrical circuit constituted by, for example, an ASIC for generating print pulses in the printhead based on print data. Note that the printing method of the printing unit is not limited to this, and a known one is usable.

For example, the display contents (image data) of a file opened in an application by a print operation on an application capable of printing or a facsimile transmission operation are temporarily stored as an EMF spool file in the HDD 202 of the PC 2. Then, the spool file is converted into print data or facsimile transmission data including control commands for the MFP 3 via a printer driver or a FAX driver. The converted data is then sent to the MFP 3 via the Internet.

The print data received by the MFP 3 is converted into print pulses by the printing unit 19, and is printed on printing paper (printing medium to be printed). The facsimile transmission data received by the MFP 3 is converted into a facsimile communication protocol by the facsimile control unit 23, and transmitted to a partner facsimile apparatus via an analog telephone line.

The operation unit 20 is constituted by various buttons such as a power button and a reset button, and accepts an operation to the MFP 3. The display unit 21 is constituted by a touch panel type liquid crystal display, can display the state of the MFP 3, and can display and input various kinds of setting information and a telephone number. The reading unit 22 includes an electrical circuit constituted by a color image sensor, an image processing ASIC, and the like, and controls the scanner function.

The facsimile control unit 23 is constituted by a facsimile modem, an analog communication circuit, and the like, and controls facsimile transmission and reception according to a facsimile communication protocol. The external storage control unit 24 is constituted by a slot for mounting a flash memory, an interface circuit for a storage, and the like, and controls a mounted flash memory.

FIGS. 3A and 3B are block diagrams showing an example of the software arrangement of the PC. In FIG. 3A, the software arrangement will be explained by exemplifying the PC 2 functioning as a server. The PC 2 includes Applications 82, Internet Information Services (IIS) 90, JAVA® Virtual Machine (JAVA® VM) 89, IP Network 91, and I/F 92. These modules are standard modules packed in an OS.

The I/F 92 is an I/F control stack that controls an I/F such as Ethernet®. The IP Network 91 is an IP Network control stack that controls IP Network.

The IIS 90 represents an IIS control unit that controls the IIS, and the proxy APP 143 provides a Web service by using the Web server function of the IIS control unit. The JAVA® VM 89 is software that converts Java® byte codes into native codes of a platform and executes the converted codes. The proxy APP 143 runs on the JAVA VM 89.

The Applications 82 is an application group and is constituted by the proxy APP 143, an application 150, and the like. Note that the application 150 indicates one known application, and a detailed description thereof will not be given here.

In FIG. 3B, the software arrangement will be explained by exemplifying the PC 60 functioning as a client. The PC 60 includes Applications 100, an interface 102, Device Drivers 107, and stacks 101, 104, 108, 109, and 110.

The stack 110 is an Ethernet® control stack that controls Ethernet®. The stack 109 is an IP Network control stack that controls IP Network. The stack 104 is a WSD control stack that controls WSD. The stack 108 is an IHV native protocol control stack that controls an IHV-specific protocol. The stack 101 is an N-PnP control stack that controls a Network Plug and Play (to be referred to as N-PnP hereinafter). Note that a Plug and Play Extensions (PnP-X) function normally installed in the Windows7 OS exists as a Plug and Play extended function. This embodiment will exemplify the use of N-PnP as a function equivalent to this function. The WSD control stack 104 includes WSDAPIs that control the WSD (to be described later). The IHV native protocol control stack 108 includes APIs that control an IHV-specific protocol.

The Device Drivers 107 is a device driver group and is constituted by a standard driver group 105 normally packed in an OS, and an IHV driver group 106 provided by the IHV.

The Applications 100, the interface 102, the Device Drivers 107, the stacks 101 and 104, the standard driver group 105, and the stacks 108, 109, and 110 are standard modules packed in an OS. The IHV driver group 106 and the Device Drivers 107 are IHV modules.

The interface 102 is an application/DDI interface, and is constituted by Application Programming Interface (API) and Device Driver Interface (DDI). The Applications 100 is an application group and includes an application 30. The application 30 is an application capable of printing (to be described later).

Figure 4:
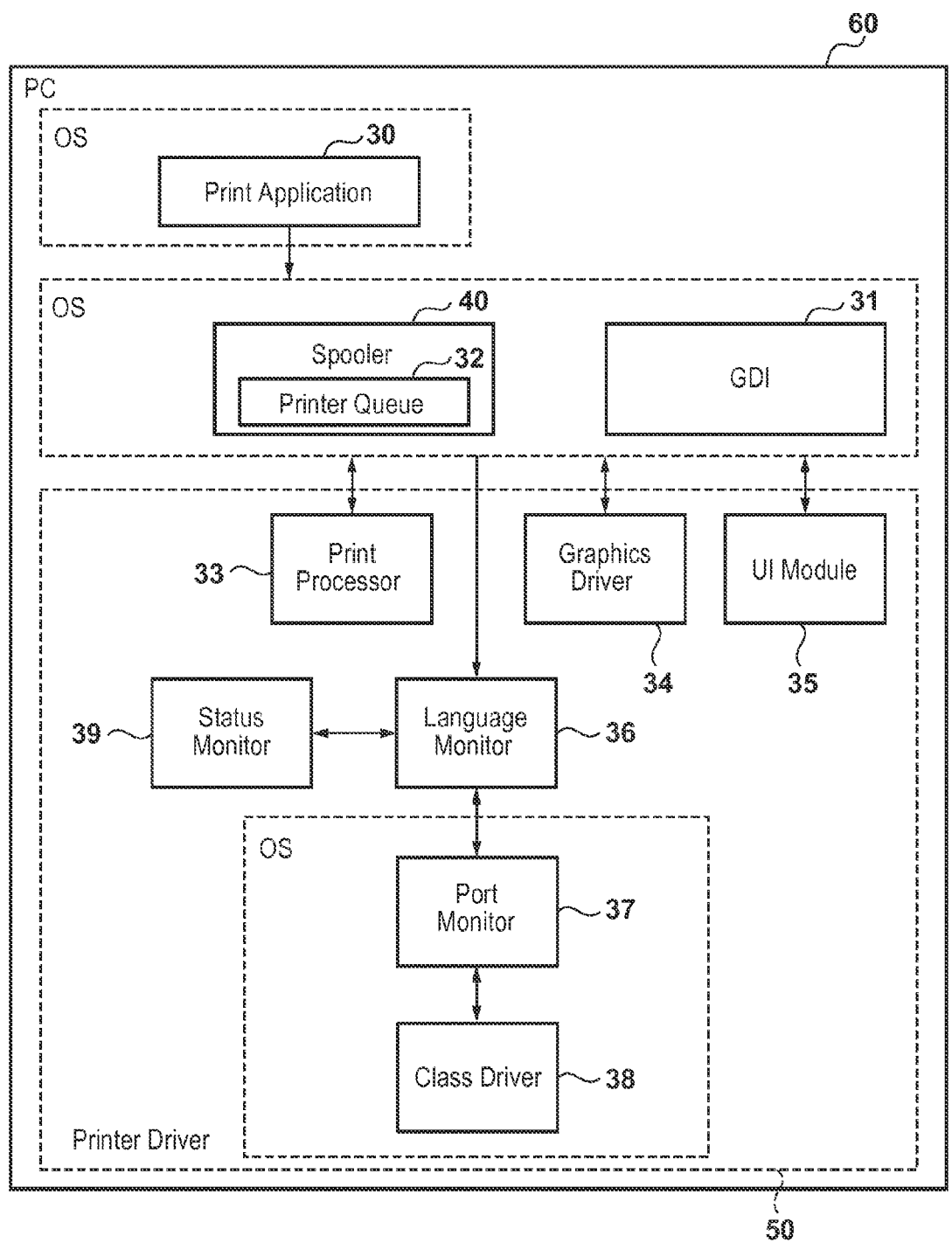
FIG. 4 is a block diagram showing the arrangement of a printer driver in the PC.

FIG. 4 is a block diagram showing the arrangement of a printer driver in the PC 60. In FIG. 4, a printer driver 50 is a printer driver for the MFP 3 that is installed in the PC 60. The printer driver 50 is provided by ABC Company that is the manufacturer of the MFP 3. The printer driver 50 includes modules 33 to 36 and 39. The application 30 is an application capable of printing, and is equivalent to, for example, Notepad (Notepad.exe) serving as a standard text editor packed in an OS. A module 31 is Graphics Device Interface (GDI) and is part of an OS. A printer queue 32 is constituted as part of a spooler 40 and queues print jobs. Queued print jobs are displayed on a printer queue folder (not shown). The print processor 33 performs change of the print layout and special processing on a print image. The graphics driver 34 serves as the image processing core of the printer driver, performs image processing for printing based on a drawing instruction sent from the GDI 31, and creates a print control command.

The UI module 35 provides and controls the user interface of the printer driver. The language monitor 36 serves as a data communication I/F, and controls transmission/reception of data. The status monitor 39 displays the remaining amount of ink in the MFP 3, a warning, and a state such as an error. A port monitor 37 performs processing of transmitting, to a proper port, data sent from the language monitor 36, or receiving, via a class driver 38, data sent from the MFP 3. In particular, a port monitor that controls a USB is called USBMon, and a port monitor that controls WSD Print Service is called WSDMon. The class driver 38 is a low-level module closest to the port. In this embodiment, the class driver 38 is equivalent to a driver of the printer class of a WSD- or IHV-specific protocol, and controls a port (a USB or network port in this embodiment).

[Calling Sequence in WSD Printing]

FIGS. 5 to 16B are charts showing examples of calling sequences and flowcharts regarding WSD print processing. Programs regarding these calling sequences and flowcharts are stored in a PC or an MFP. The program of an application that runs on the PC is stored in the HDD 202, read out to the RAM 201, and executed by the CPU 204. The program of an application that runs on the MFP is stored in the ROM 16, read out to the RAM 17, and executed by the CPU 15.

FIG. 5 is a sequence chart showing a calling sequence at the time of printing from a PC connected to the MFP 3 by a local network. Assume that the MFP 3 is a printer that can accept a plurality of print jobs, process only one of the print jobs, and execute it.

In FIG. 5, if it is detected that the user has started printing from the application 30 (step S501), the OS calls the StartPrintJob( ) function of the spooler 40. In this function (step S502), first, the spooler 40 calls the LM_StartDocPort( ) function of the language monitor 36 (step S503). In this function (step S504), the language monitor 36 initializes lmMultipleJobs by substituting FALSE into it (step S505).

lmMultipleJobs is a flag used in the language monitor 36. When the MFP 3 has a function of accepting a plurality of print jobs and sequentially processing them, TRUE is set in this flag; otherwise, FALSE is set. The language monitor 36 initializes lmRetry by substituting 0 into it (step S506). lmRetry is a variable used in the language monitor 36, and indicates the retry count of a print job request issued from the PC 60 to the MFP 3. The language monitor 36 initializes lmReceivedId by substituting "None" into it (step S507). A print reservation ID issued upon accepting the reservation of a print job request by the MFP 3 is substituted into lmReceivedId in steps S607 and S623 of FIG. 6 (to be described later).

After that, the language monitor 36 calls the PM_StartDocPort( ) function of the port monitor 37 (step S508). In this function (step S509), the port monitor 37 performs appropriate processing as needed (step S510), substitutes the result of the processing into a return value pmRet, and ends this function. Then, the control returns to the call source (step S511). In general, when the processing has been normally done, TRUE is substituted into pmRet; otherwise, FALSE is substituted into pmRet.

The language monitor 36 substitutes the return value of the PM_StartDocPort( ) function into the return value lmRet (step S508), and ends the LM_StartDocPort( ) function. The control then returns to the call source (step S512). The spooler 40 substitutes the return value of the LM_StartDocPort( ) function into spRet (step S503). If spRet is not TRUE (is FALSE) (step S513), the process returns to step S503, and the spooler 40 calls the LM_StartDocPort( ) function of the language monitor 36. If spRet is TRUE in step S513, the process advances to step S601 of FIG. 6. Print job request issuing/reservation processing will be described later with reference to FIG. 6.

Finally, the spooler 40 calls the LM_EndDocPort( ) function of the language monitor 36 (step S520). In this function (step S521), the language monitor 36 initializes lmMultipleJobs by substituting FALSE into it (step S522). The language monitor 36 initializes lmRetry by substituting 0 into it (step S523). The language monitor 36 initializes lmReceivedId by substituting "None" into it (step S524). After that, the language monitor 36 calls the PM_EndDocPort( ) function of the port monitor 37 (step S525).

In this function (step S526), the port monitor 37 executes appropriate processing as needed (step S527), substitutes the result of the processing into the return value pmRet, and ends this function. Then, the control returns to the call source (step S528). In general, when the processing has been normally done, TRUE is substituted into pmRet; otherwise, FALSE is substituted into pmRet. The language monitor 36 substitutes the return value of the PM_EndDocPort( ) function into lmRet (step S525), and ends the LM_EndDocPort( ) function. Then, the control returns to the call source (step S529). The spooler 40 substitutes the return value of the LM_EndDocPort( ) function into spRet (step S520), and ends the StartPrintJob( ) function. Then, the control returns to the call source (step S530).

[Print Job Request Issuing/Reservation Processing]

FIG. 6 is a sequence chart showing a calling sequence at the time of printing from a PC connected to the MFP 3 by a local network. In FIG. 6, the spooler 40 calls the LM_WritePort( ) function of the language monitor 36 (step S602). In this function (step S603), the language monitor 36 confirms the lmRetry and lmMultipleJobs values (step S604). If lmRetry is larger than 0 and lmMultipleJobs is TRUE, the process advances to step S605. If lmRetry is 0 or lmMultipleJobs is not TRUE (is FALSE), the process advances to step S609.

In step S605, the language monitor 36 sets ans:ABCCommand in an argument, and calls the GetPrinterElements( ) function of the WSDAPIs that control the WSD. In this function, the PC 60 issues GetPrinterElementsRequest of WSD Print Service to the MFP 3. In response to GetPrinterElementsRequest, the MFP 3 sends back GetPrinterElementsResponse to the PC (step S606). If the PC 60 receives GetPrinterElementsResponse, TRUE is substituted into the return value of the GetPrinterElements( ) function, and the control returns to the call source (step S605). If the PC 60 has not received GetPrinterElementsResponse within a predetermined time after it issued GetPrinterElementsRequest to the MFP 3, FALSE is substituted into the return value of the GetPrinterElements( ) function, and the control returns to the call source (step S605).

In step S605, the language monitor 36 substitutes the return value of the GetPrinterElements( ) function into lmRet. Note that a description of an error case in which FALSE is sent back as the return value of the GetPrinterElements( ) function will not be given here. GetPrinterElementsRequest issued from the PC 60 in step S605, and GetPrinterElementsResponse sent back by the MFP 3 in response to GetPrinterElementsRequest will be described in detail later with reference to FIGS. 9A to 10B.

The language monitor 36 substitutes, into lmReceivedId, a value set in an <ans:ReceivedId> element 912 or 1011 in GetPrinterElementsResponse passed as an argument of the GetPrinterElements( ) function in step S605 (step S607). The language monitor 36 confirms the lmReceivedId value, and if the value is "None" (step S627), initializes the print job request retry count by substituting 0 into lmRetry (step S628). If the lmReceivedId value is not "None" (step S629), the language monitor 36 updates the print job request retry count by substituting, into lmRetry, a value obtained by adding 1 to lmRetry (step S608).

In step S609, the language monitor 36 calls the PM_WritePort( ) function of the port monitor 37. In this function (step S610), the port monitor 37 calls the CreatePrintJob( ) function of the WSDAPIs that control the WSD (step S611). In this function, the PC 60 issues CreatePrintJobRequest of WSD Print Service to the MFP 3. CreatePrintJobRequest includes detailed information about this print job. In response to CreatePrintJobRequest, the MFP 3 sends back CreatePrintJobResponse or Fault (ServerErrorNotAcceptingJobs) to the PC 60 (step S612).

For example, when the MFP 3 is ready to accept and execute a print job and actually accepts the print job, it sends back CreatePrintJobResponse to the PC 60. To the contrary, when the MFP 3 is ready to accept a print job but is not ready to execute the print job, and actually accepts the print job, it sends back Fault (ServerErrorNotAcceptingJobs) to the PC 60. Even when the MFP 3 cannot accept a print job, it sends back Fault (ServerErrorNotAcceptingJobs) to the PC 60. If the PC 60 receives CreatePrintJobResponse, TRUE is substituted into the return value of the CreatePrintJob( ) function, and the control returns to the call source (step S613). If the PC 60 receives Fault (ServerErrorNotAcceptingJobs), FALSE is substituted into the return value of the CreatePrintJob( ) function, and the control returns to the call source (step S611).

The port monitor 37 substitutes the return value of the CreatePrintJob( ) function into the return value pmRet (step S611), and ends the PM_WritePort( ) function. Then, the control returns to the call source (step S613). The language monitor 36 substitutes the return value of the PM_WritePort( ) function into the return value lmRet (step S609). The language monitor 36 confirms the lmRet value (step S614). If the lmRet value is TRUE, the process advances to step S625. If the lmRet value is not TRUE (is FALSE), the language monitor 36 confirms the lmRet value (step S615). If lmRet is 0 in step S615, the language monitor 36 sets wprt:PrinterDescription in an argument, and calls the GetPrinterElements( ) function of the WSDAPIs that control the WSD (step S616).

In this function, the PC 60 issues GetPrinterElementsRequest of WSD Print Service to the MFP 3. GetPrinterElementsRequest includes a <wprt:Name>wprt:PrinterDescription</wprt:Name> element 801 (to be described later with reference to FIG. 8A) necessary to acquire an <ans:MultipleJobsControl> element 802 (to be described later with reference to FIG. 8B) representing whether the MFP 3 can accept a plurality of print jobs. In response to GetPrinterElementsRequest, the MFP 3 sends back GetPrinterElementsResponse to the PC 60 (step S617). If the PC 60 receives GetPrinterElementsResponse, TRUE is substituted into the return value of the GetPrinterElements( ) function, and the control returns to the call source (step S616). If the PC 60 has not received GetPrinterElementsResponse within a predetermined time after it issued GetPrinterElementsRequest to the MFP 3, FALSE is substituted into the return value of the GetPrinterElements( ) function, and the control returns to the call source (step S616).

In step S616, the language monitor 36 substitutes the return value of the GetPrinterElements( ) function into lmRet. Note that a description of an error case in which FALSE is sent back as the return value of the GetPrinterElements( ) function will not be given here. The language monitor 36 confirms the value set in the <ans:MultipleJobsControl> element 802 in GetPrinterElementsResponse passed as an argument of the GetPrinterElements( ) function (step S618). If "true" is set in the <ans:MultipleJobsControl> element 802 in step S618, TRUE is substituted into lmMultipleJobs (step S619). If lmRetry is not 0 in step S615 (mRetry is an integer larger than 0 in practice because a value substituted into lmRetry in steps S608 and S624 is an integer of 0 or larger), the process advances to step S620.

If lmMultipleJobs is TRUE in step S620, the language monitor 36 sets ans:ABCCommand in an argument, and calls the GetPrinterElements( ) function of the WSDAPIs that control the WSD (step S621).

In this function, the PC 60 issues GetPrinterElementsRequest of WSD Print Service to the MFP 3. In response to GetPrinterElementsRequest, the MFP 3 sends back GetPrinterElementsResponse to the PC (step S622). If the PC 60 receives GetPrinterElementsResponse, TRUE is substituted into the return value of the GetPrinterElements( ) function, and the control returns to the call source (step S621). If the PC 60 has not received GetPrinterElementsResponse within a predetermined time after it issued GetPrinterElementsRequest to the MFP 3, FALSE is substituted into the return value of the GetPrinterElements( ) function, and the control returns to the call source (step S621).

In step S621, the language monitor 36 substitutes the return value of the GetPrinterElements( ) function into lmRet. Note that a description of an error case in which FALSE is sent back as the return value of the GetPrinterElements( ) function will not be given here. GetPrinterElementsRequest issued from the PC 60 in step S621, and GetPrinterElementsResponse sent back by the MFP 3 in response to GetPrinterElementsRequest will be described in detail later with reference to FIGS. 9A to 10B.

The language monitor 36 substitutes, into lmReceivedId, a value set in the <ans:ReceivedId> element 912 or 1011 in GetPrinterElementsResponse passed as an argument of the GetPrinterElements( ) function in step S621, that is, a print reservation ID (step S623).

The language monitor 36 confirms the lmReceivedId value, and if the value is "None" (step S630), initializes the print job request retry count by substituting 0 into lmRetry (step S631). If the lmReceivedId value is not "None" (step S632), the language monitor 36 updates the print job request retry count by substituting, into lmRetry, a value obtained by adding 1 to lmRetry (step S624).

If lmMultipleJobs is not TRUE (is FALSE) in step S620, the process advances to step S625. In step S625, the language monitor 36 ends the LM_WritePort( ) function, and the control returns to the call source. At this time, the lmRet value is sent back as the return value of the LM_WritePort( ) function. The spooler 40 substitutes the return value of the LM_WritePort( ) function into spRet (step S602). If spRet is not TRUE (is FALSE) (step S626), the process returns to step S602, and the spooler 40 calls the LM_WritePort( ) function of the language monitor 36. If spRet is TRUE in step S626, the spooler 40 performs print data transmission processing shown in FIG. 7 subsequently.

[Print Data Transmission Processing]

FIG. 7 is a sequence chart showing a calling sequence at the time of printing. If spRet is TRUE in step S626 of FIG. 6, the spooler 40 calls the LM_WritePort( ) function of the language monitor 36 in FIG. 7 (step S701). In this function (step S702), the language monitor 36 calls the PM_WritePort( ) function of the port monitor 37 (step S703). In this function (step S704), the port monitor 37 calls the SendDocument( ) function of the WSDAPIs that control the WSD (step S705).

In this function, the PC 60 issues SendDocumentRequest of WSD Print Service to the MFP 3, uses MTOM (Message Transmission Optimization Mechanism) message encoding, and transmits, to the MFP 3, print data constituted by print control commands as unprocessed bytes using a SOAP message. In response to SendDocumentRequest, the MFP 3 sends back SendDocumentResponse to the PC 60 (step S706). If the PC 60 receives SendDocumentResponse and ends the transmission of all print data to the MFP 3, TRUE is substituted into the return value of the SendDocument( ) function, and the control returns to the call source (step S705).

If an error has occurred at the time of issuing SendDocumentRequest or receiving SendDocumentResponse by the PC 60, FALSE is substituted into the return value of the SendDocument( ) function, and the control returns to the call source (step S705). The port monitor 37 substitutes the return value of the SendDocument( ) function into the return value pmRet (step S705), and ends the PM_WritePort( ) function. Then, the control returns to the call source (step S707).

The language monitor 36 substitutes the return value of the PM_WritePort( ) function into the return value lmRet (step S703), and ends the LM_WritePort( ) function. Then, the control returns to the call source (step S708). The spooler 40 substitutes the return value of the LM_WritePort( ) function into spRet (step S701). If spRet is not TRUE (is FALSE) (step S709), the process returns to step S701, and the spooler 40 calls the LM_WritePort( ) function of the language monitor 36. If spRet is TRUE in step S709, the process advances to step S520 in FIG. 5.

[Processing of LM_WritePort( ) Function in Language Monitor 36]

Figure 14:
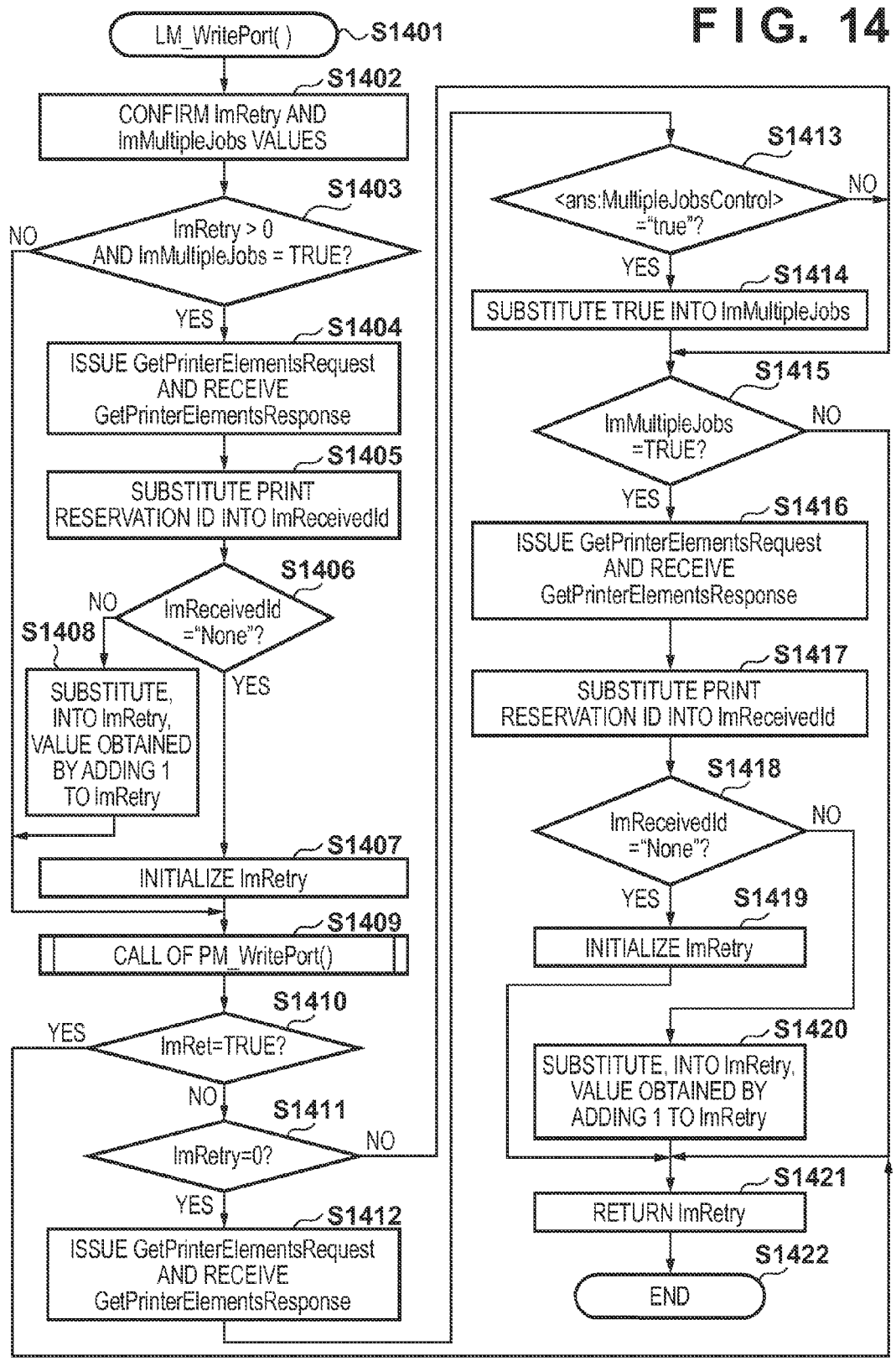
FIG. 14 is a flowchart showing the procedures of processing of an LM_WritePort( ) function in a language monitor.

FIG. 14 is a flowchart showing the procedures of processing of the LM_WritePort( ) function in the language monitor 36. A program regarding the flowchart of FIG. 14 is stored in the HDD 202, read out to the RAM 201, and executed by the CPU 204. If the spooler 40 calls the LM_WritePort( ) function of the language monitor 36 in FIG. 6, the language monitor 36 starts processing of the LM_WritePort( ) function in FIG. 14 (step S1401). The language monitor 36 confirms the lmRetry and lmMultipleJobs values (step S1402). If lmRetry is larger than 0 and lmMultipleJobs is TRUE, the process advances to step S1404. If lmRetry is 0 or lmMultipleJobs is not TRUE (is FALSE), the process advances to step S1409 (step S1403).

In step S1404, the language monitor 36 sets ans:ABCCommand in an argument, and calls the GetPrinterElements( ) function of the WSDAPIs that control the WSD. In this function, the PC 60 issues GetPrinterElementsRequest of WSD Print Service to the MFP 3 (step S1404). In response to GetPrinterElementsRequest, the MFP 3 sends back GetPrinterElementsResponse to the PC 60 (step S606 of FIG. 6 and step S1319 of FIG. 13).

If the PC 60 receives GetPrinterElementsResponse, TRUE is substituted into the return value of the GetPrinterElements( ) function, and the control returns to the language monitor 36 serving as the call source (step S1404). If the PC 60 has not received GetPrinterElementsResponse within a predetermined time after it issued GetPrinterElementsRequest to the MFP 3, FALSE is substituted into the return value of the GetPrinterElements( ) function, and the control returns to the language monitor 36 serving as the call source (step S1404). The language monitor 36 substitutes the return value of the GetPrinterElements( ) function into lmRet (step S1404). Note that a description of an error case in which FALSE is sent back as the return value of the GetPrinterElements( ) function will not be given here. GetPrinterElementsRequest issued from the PC 60 in step S1404, and GetPrinterElementsResponse sent back by the MFP 3 in response to GetPrinterElementsRequest will be described in detail later with reference to FIGS. 9A to 10B.

The language monitor 36 substitutes, into lmReceivedId, a value set in the <ans:ReceivedId> element 912 or 1011 in GetPrinterElementsResponse passed as an argument of the GetPrinterElements( ) function in step S1404 (step S1405). The language monitor 36 confirms the lmReceivedId value (step S1406). If the value is "None", the process advances to step S1407. If the value is not "None", the process advances to step S1408.

In step S1407, the language monitor 36 initializes the print job request retry count by substituting 0 into lmRetry, and the process advances to step S1409. In step S1408, the language monitor 36 updates the print job request retry count by substituting, into lmRetry, a value obtained by adding 1 to lmRetry. Then, the process advances to step S1409.

In step S1409, the language monitor 36 calls the PM_WritePort( ) function of the port monitor 37. Processing by the port monitor 37 in this function will be described later with reference to FIG. 15A. The language monitor 36 substitutes the return value of the PM_WritePort( ) function into the return value lmRet (step S1409). The language monitor 36 confirms the lmRet value (step S1410). If lmRet is TRUE, the process advances to step S1421. If lmRet is not TRUE (is FALSE), the process advances to step S1411. In step S1411, the language monitor 36 confirms the lmRetry value. If lmRetry is 0, the process advances to step S1412. If lmRetry is not 0, the process advances to step S1415. The case in which lmRetry is not 0 is a case in which lmRetry is an integer larger than 0 in practice because a value substituted into lmRetry in steps S1408 and S1420 is an integer of 0 or larger).

In step S1412, the language monitor 36 sets wprt:PrinterDescription in an argument, and calls the GetPrinterElements( ) function of the WSDAPIs that control the WSD. In this function, the PC 60 issues GetPrinterElementsRequest of WSD Print Service to the MFP 3 (step S1412). GetPrinterElementsRequest includes the <wprt:Name>wprt:PrinterDescription</wprt:Name> element 801 (to be described later with reference to FIG. 8A) necessary to acquire the <ans:MultipleJobsControl> element 802 (to be described later with reference to FIG. 8B) representing whether the MFP 3 can accept a plurality of print jobs. In response to GetPrinterElementsRequest, the MFP 3 sends back GetPrinterElementsResponse to the PC 60 (step S617 of FIG. 6 and step S1319 of FIG. 13).

If the PC 60 receives GetPrinterElementsResponse, TRUE is substituted into the return value of the GetPrinterElements( ) function, and the control returns to the language monitor 36 serving as the call source (step S1412). If the PC 60 has not received GetPrinterElementsResponse within a predetermined time after it issued GetPrinterElementsRequest to the MFP 3, FALSE is substituted into the return value of the GetPrinterElements( ) function, and the control returns to the language monitor 36 serving as the call source (step S1412). The language monitor 36 substitutes the return value of the GetPrinterElements( ) function into lmRet (step S1412). Note that a description of an error case in which FALSE is sent back as the return value of the GetPrinterElements( ) function will not be given here. The language monitor 36 confirms the value set in the <ans:MultipleJobsControl> element 802 in GetPrinterElementsResponse passed as an argument of the GetPrinterElements( ) function (step S1413).

If "true" is set in the <ans:MultipleJobsControl> element 802 in step S1413, the process advances to step S1414; otherwise, the process advances to step S1415. In step S1414, the language monitor 36 substitutes TRUE into lmMultipleJobs, and the process advances to step S1415. In step S1415, the language monitor 36 confirms the lmMultipleJobs value. If the lmMultipleJobs value is TRUE, the process advances to step S1416. If the lmMultipleJobs value is not TRUE (is FALSE), the process advances to step S1421.

In step S1416, the language monitor 36 sets ans:ABC-Command in an argument, and calls the GetPrinterElements( ) function of the WSDAPIs that control the WSD. In this function, the PC 60 issues GetPrinterElementsRequest of WSD Print Service to the MFP 3. In response to GetPrinterElementsRequest, the MFP 3 sends back GetPrinterElementsResponse to the PC (step S622 of FIG. 6 and step S1319 of FIG. 13). If the PC 60 receives GetPrinterElementsResponse, TRUE is substituted into the return value of the GetPrinterElements( ) function, and the control returns to the language monitor 36 serving as the call source (step S1416). If the PC 60 has not received GetPrinterElementsResponse within a predetermined time after it issued GetPrinterElementsRequest to the MFP 3, FALSE is substituted into the return value of the GetPrinterElements( ) function, and the control returns to the language monitor 36 serving as the call source (step S1416). The language monitor 36 substitutes the return value of the GetPrinterElements( ) function into lmRet (step S1416). Note that a description of an error case in which FALSE is sent back as the return value of the GetPrinterElements( ) function will not be given here. GetPrinterElementsRequest issued from the PC 60 in step S1416, and GetPrinterElementsResponse sent back by the MFP 3 in response to GetPrinterElementsRequest will be described in detail later with reference to FIGS. 9A to 10B.

The language monitor 36 substitutes, into lmReceivedId, a value set in the <ans:ReceivedId> element 912 or 1011 in GetPrinterElementsResponse passed as an argument of the GetPrinterElements( ) function in step S1416, that is, a print reservation ID (step S1417). Then, the process advances to step S1418. The language monitor 36 confirms the lmReceivedId value (step S1418). If the value is "None", the process advances to step S1419. If the value is not "None", the process advances to step S1420. In step S1419, the language monitor 36 initializes the print job request retry count by substituting 0 into lmRetry, and the process advances to step S1420. In step S1420, the language monitor 36 updates the print job request retry count by substituting, into lmRetry, a value obtained by adding 1 to lmRetry. In step S1421, the language monitor 36 sends back, to the spooler 40, lmRet as the return value of the LM_WritePort( ) function, and ends the processing of the LM_WritePort( ) function. Then, the control returns to the spooler 40 serving as the call source (step S1422).

[Processing of PM_WritePort( ) Function in Port Monitor 37]

Figure 15A:
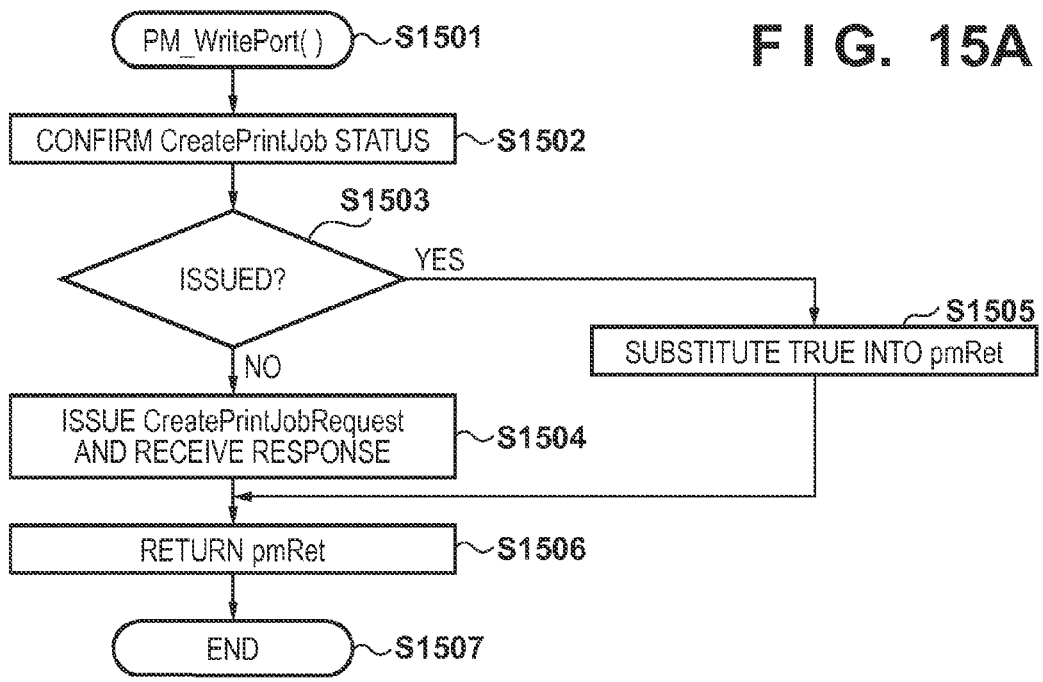
FIGS. 15A and 15B are flowcharts showing the procedures of processing of a PM_WritePort( ) function in a port monitor.
Figure 15B:
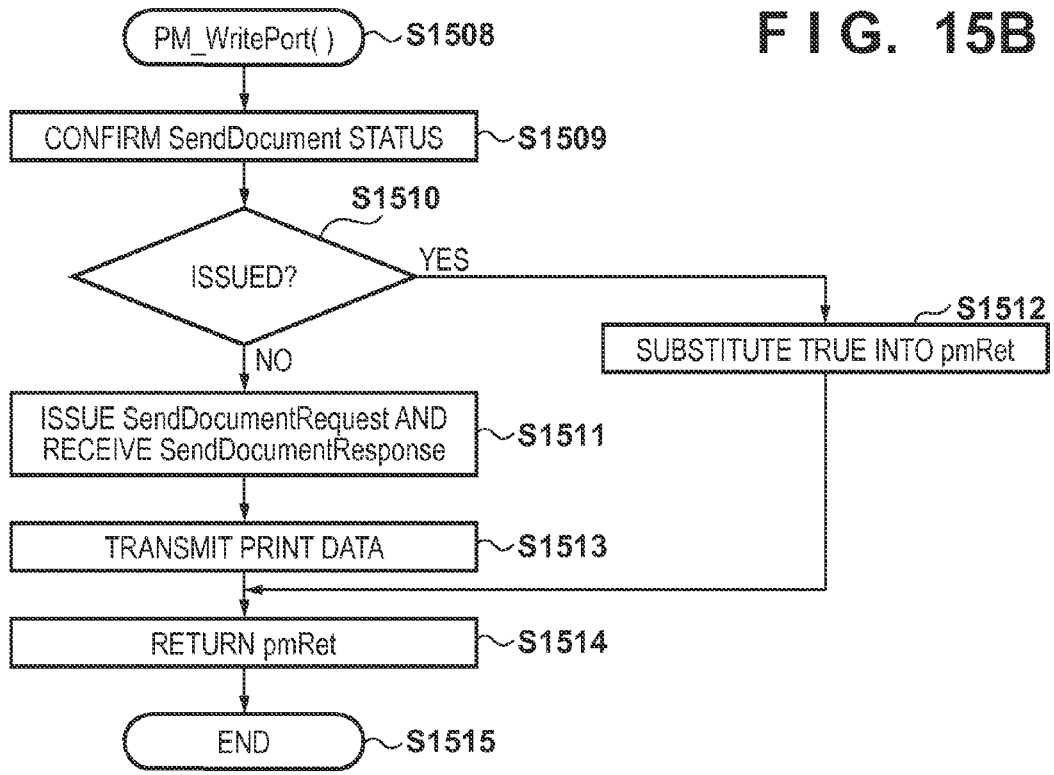

FIGS. 15A and 15B are flowcharts showing the procedures of processing of the PM_WritePort( ) function in the port monitor 37. Programs according to the flowcharts of FIGS. 15A and 15B are stored in the HDD 202, read out to the RAM 201, and executed by the CPU 204. If the language monitor 36 calls the PM_WritePort( ) function of the port monitor 37 in step S1409 of FIG. 14, the port monitor 37 starts processing of the PM_WritePort( ) function in FIG. 15A (step S1501). The port monitor 37 confirms the CreatePrintJob status (step S1502). If the port monitor 37 has issued CreatePrintJobRequest and has already received CreatePrintJobResponse as a response to CreatePrintJobRequest (step S1503), the process advances to step S1505; otherwise, the process advances to step S1504. In step S1505, the port monitor 37 substitutes TRUE into the return value pmRet.

In step S1504, the port monitor 37 calls the CreatePrintJob( ) function of the WSDAPIs that control the WSD. In this function, the PC 60 issues CreatePrintJobRequest of WSD Print Service to the MFP 3 (step S1504). CreatePrintJobRequest includes detailed information about this print job. In response to CreatePrintJobRequest, the MFP 3 sends back a CreatePrintJobResponse or Fault (ServerErrorNotAcceptingJobs) to the PC 60 (step S612 of FIG. 6). For example, when the MFP 3 is ready to accept and execute a print job, and actually accepts the print job, it sends back CreatePrintJobResponse to the PC 60 (step S612 of FIG. 6). In contrast, when the MFP 3 is ready to accept a print job but is not ready to execute the print job, and actually accepts the print job, it sends back Fault (ServerErrorNotAcceptingJobs) to the PC 60 (step S612 of FIG. 6). Also, when the MFP 3 cannot accept a print job, it sends back Fault (ServerErrorNotAcceptingJobs) to the PC 60 (step S612 of FIG. 6).

If the PC 60 receives CreatePrintJobResponse, TRUE is substituted into the return value of the CreatePrintJob( ) function, and the control returns to the port monitor 37 serving as the call source (step S1504). If the PC 60 receives Fault (ServerErrorNotAcceptingJobs), FALSE is substituted into the return value of the CreatePrintJob( ) function, and the control returns to the port monitor 37 serving as the call source (step S1504). The port monitor 37 substitutes the return value of the CreatePrintJob( ) function into the return value pmRet (step S1504). The port monitor 37 returns, to the language monitor 36, pmRet as the return value of the PM_WritePort( ) function (step S1506), and ends the processing of the PM_WritePort( ) function. Then, the control returns to the language monitor 36 serving as the call source (step S1507).

If the language monitor 36 calls the PM_WritePort( ) function of the port monitor 37 in step S703 of FIG. 7, the port monitor 37 starts processing of the PM_WritePort( ) function in FIG. 15B (step S1508). The port monitor 37 confirms the SendDocument status (step S1509). If the port monitor 37 has issued SendDocumentRequest and has already received SendDocumentResponse as a response to SendDocumentRequest (step S1510), the process advances to step S1512; otherwise, the process advances to step S1511.

In step S1512, the port monitor 37 substitutes TRUE into the return value pmRet. In step S1511, the port monitor 37 calls the SendDocument( ) function of the WSDAPIs that control the WSD (step S705 of FIG. 7). In this function, the PC 60 issues SendDocumentRequest of WSD Print Service to the MFP 3, uses MTOM (Message Transmission Optimization Mechanism) message encoding, and transmits, to the MFP 3, print data constituted by print control commands as unprocessed bytes using a SOAP message (step S1511). In response to SendDocumentRequest, the MFP 3 sends back SendDocumentResponse to the PC 60 (step S706 of FIG. 7).

If an error has occurred at the time of issuing SendDocumentRequest or receiving SendDocumentResponse by the PC 60, FALSE is substituted into the return value of the SendDocument( ) function, and the control returns to the call source (step S1511). The port monitor 37 substitutes the return value of the SendDocument( ) function into the return value pmRet (step S2111). If the PC 60 receives SendDocumentResponse and ends the transmission of all print data to the MFP 3, TRUE is substituted into the return value of the SendDocument( ) function, and the control returns to the port monitor 37 serving as the call source (step S1513). The port monitor 37 substitutes the return value of the Send-Document( ) function into the return value pmRet (step S1513). The port monitor 37 returns, to the language monitor 36, pmRet as the return value of the PM_WritePort( ) function (step S1514), and ends the processing of the PM_WritePort( ) function. Then, the control returns to the language monitor 36 serving as the call source (step S1515).

FIGS. 8A to 10B are views showing the contents of GetPrinterElements. FIGS. 11A and 11B show the contents of CreatePrintJob. A GetPrinterElements operation is normally used to acquire information about a printer. A CreatePrintJob operation is a print job start request. A description of the contents of GetPrinterElements and CreatePrintJob that are defined in WSD Print Service Definition Version 1.0 will not be given.

[Contents of CreatePrintJob]

FIGS. 11A and 11B show the contents of CreatePrintJob. FIG. 11A shows CreatePrintJobRequest, and FIG. 11B shows CreatePrintJobResponse.

FIG. 11A is a view showing CreatePrintJobRequest. CreatePrintJobRequest shown in FIG. 11A is merely an example of a request issued from the PC 60 to the MFP 3. In FIG. 11A, a description 1105 defines the name space of WSD Print Service as a name space name wprt. The effective range of the name space name wprt represents public information defined by WSD Print Service Definition Version 1.0. In the following description, the name space name wprt is similarly handled, and the effective range of the name space name wprt represents public information defined by WSD Print Service Definition Version 1.0. A description 1101 is a <wprt:JobDescription> element and is public information including information about a print job. A description 1102 is a <wprt:JobName> element, and a print job name serving as public information is set. In this example, a print job name "Photo2" is set. A description 1103 is a <wprt:JobOriginatingUserName> element, and the name of a user who issued this print job is set as public information. This example represents a state in which a user name "Natsu" is set.

FIG. 11B is a view showing CreatePrintJobResponse. CreatePrintJobResponse shown in FIG. 11B is an example of a response sent back from the MFP 3 to the PC 60. In FIG. 11B, a description 1104 is a <wprt:JobId> element, and is public information in which a job ID issued from the MFP 3 to identify a print job at the time of accepting the print job by the MFP 3 is set for the print job requested by CreatePrintJobRequest issued from the PC 60. This example represents a state in which a job ID "1234" is set.

[Contents of GetPrinterElements]

FIGS. 8A and 8B show the contents of GetPrinterElements. FIG. 8A shows GetPrinterElementsRequest, and FIG. 8B shows GetPrinterElementsResponse.

FIG. 8A is a view showing GetPrinterElementsRequest. GetPrinterElementsRequest shown in FIG. 8A is an example of a request issued from the PC 60 to the MFP 3. In FIG. 8A, a description 801 is a <wprt:Name> element, and is public information in which wprt:PrinterDescription is set as its value.

FIG. 8B is a view showing GetPrinterElementsResponse. GetPrinterElementsResponse shown in FIG. 8B is an example of a response sent back from the MFP 3 to the PC 60. When the MFP 3 receives GetPrinterElementsRequest including the <wprt:Name> element 801 in which wprt:PrinterDescription is set, it sends back wprt:PrinterDescription to the PC 60 by GetPrinterElementsResponse. In FIG. 8B, a description 806 defines the name space of WSD Print Service of ABC Company as a name space name ans. The effective range of the name space name ans includes private information defined by WSD Print Service of ABC Company. In the following description, the name space name ans is similarly handled, and the effective range of the name space name ans represents private information defined by WSD Print Service of ABC Company. A description 803 is a <wprt:ElementData> element, and is public information in which wprt:PrinterDescription of public information is set as a Name attribute. This indicates that GetPrinterElementsResponse includes wprt:PrinterDescription designated by the <wprt:Name> element 801.

A description 805 is a <wprt:PrinterDescription> element, and is public information that includes information about, for example, functions mounted in the MFP 3. A description 804 is a <wprt:DeviceId> element, and is pubic information in which data (character string) defined by Device ID of IEEE 1284-2000 is set. This indicates Device ID of the MFP 3. This example represents a state in which Device ID "MFG:ABC;CMD:ABCCommand;MDL:Kmmn;CLS:PRINTER;DES:ABC Kmmn;VER:1.00;INFO:000;" is set. The description 802 is an <ans:MultipleJobsControl> element, and is private information representing whether the MFP 3 is a printer having a multiple-print job control function. The multiple-print job control function is a function capable of accepting a plurality of print jobs by the printer, and processing one of these print jobs to execute printing. "true" is set in this element when the printer has this function, and "false" is set when the printer does not have this function. This example represents a state in which "true" is set.

FIGS. 9A and 9B show the contents of GetPrinterElements. FIG. 9A shows GetPrinterElementsRequest, and FIG. 9B shows GetPrinterElementsResponse.

FIG. 9A is a view showing GetPrinterElementsRequest. GetPrinterElementsRequest shown in FIG. 9A is an example of a request issued from the PC 60 to the MFP 60. In FIG. 9A, a description 903 is a <wprt:Name> element, and is public information in which ans:ABCComand is set as its value. ans:ABCComand is private information. A description 904 is an <ans:ABCComand> element, and is private information that includes an <ans:SplJobId> element 905, and an <ans:ReceivedId> element 906, an <ans:Retry> element 901, an <ans:OSVersion> element 907, and an <ans:DateTime> element 908.

All the elements 905, 906, 901, 907, and 908 are pieces of private information, and the language monitor 36 sets appropriate values in these elements in GetPrinterElementsRequest. The language monitor 36 sets, in the <ans:SplJobId> element 905, a value (job ID) set in a third argument JobId passed when the spooler 40 calls the LM_StartDocPort( ) function in step S503 of FIG. 5. This job ID passed from the spooler 40 to the language monitor 36 was issued from an OS in the PC 60. Thus, the value set in the <ans:SplJobId> element 905 is completely different from a job ID that is issued from the MFP 3 and set in the <wprt:JobId> element 1104. This example represents a state in which a value "5" is set. The specification of the LM_StartDocPort( ) function is as follows:

---

BOOL WINAPI LM_StartDocPort(
    HANDLE    hPort,

```
        LPWSTR    pPrinterName,
        DWORD     JobId,
        DWORD     Level,
        LPBYTE    pDocInfo
);
```

—Parameters—
hPort: Caller-supplied port handle.
pPrinterName: Caller-supplied pointer to a string containing the printer name.
JobId: Caller-supplied, spooler-assigned job identifier.
Level: Caller-supplied value indicating the type of structure pointed to by pDocInfo. Possible values are as follows:

| Level | pDocInfo   |
|-------|------------|
| 1     | DOC_INFO_1 |
| 2     | DOC_INFO_2 | pDocInfo: Caller-supplied pointer to a DOC_INFO_1 or DOC_INFO_2 structure. These structures are described in the Microsoft Windows SDK documentation.
—Return Value—
If the operation succeeds, the function should return TRUE. Otherwise it should return FALSE.

The specification of the PM_WritePort( ) function serving as the interface of the language monitor 36 and port monitor 37 is as follows:

```
    BOOL WINAPI PM_WritePort(
        HANDLE    hPort,
        LPBYTE    pBuffer,
        DWORD     cbBuf,
        LPDWORD   pcbWritten
    );
```

—Parameters—
hPort: Caller-supplied port handle.
pBuffer: Caller-supplied pointer to a buffer containing data to be written to the port.
cbBuf: Caller-supplied size, in bytes, of pBuffer.
pcbWritten: Caller-supplied pointer to a location to receive the number of bytes successfully written to the port.
—Return Value—
If the operation succeeds, the function should return TRUE. Otherwise it should return FALSE.

The port monitor 37 calls CreatePrintJob( ) of the WSDAPIs that control the WSD in step S611 of FIG. 6 (step S1502 of FIG. 15A). Values set in the <wprt:JobName> element 1102, the <wprt:JobOriginatingUserName> element 1103, and the <wprt:JobId> element 1104 shown in FIGS. 11A, and 11B, which can be referred to as arguments of this function, are not passed as arguments of the PM_WritePort( ) function. Therefore, the language monitor 36 can neither refer to values set in the elements 1102, 1103, and 1104, nor change these values. For the same reason, the language monitor 36 cannot add the elements 905, 906, 901, 907, and 908 serving as pieces of private information to CreatePrintJobRequest by using a CreatePrintJob operation issued from the port monitor 37.

A print reservation ID issued when the MFP 3 accepted a reservation for a print job request is set in the <ans:ReceivedId> element 906. This example represents a state in which a value "None" is set because a print reservation ID has not been issued yet from the MFP 3. The language monitor 36 sets "None" in the <ans:ReceivedId> element 906 as an initial value used when the language monitor 36 tries to transmit, to the MFP 3 for the first time, the start data of print data constituted by print control commands, which serves as a trigger for issuing a print job request from the PC 60 to the MFP 3. In other cases, the language monitor 36 saves, in lmReceived, a value set in the <ans:ReceivedId> element 912 of GetPrinterElementsResponse finally sent from the MFP 3 to the PC 60, and sets this value in the <ans:ReceivedId> element 906.

In the <ans:Retry> element 901, the retry count of a print job request issued from the PC 60 to the MFP 3 is set. This example represents a state in which a value "0" is set to indicate a case in which the PC 60 transmits a print job request to the MFP 3 for the first time. Every time the language monitor 36 tries to transmit the start data of print data constituted by print control commands, which serves as a trigger for issuing a print job request from the PC 60 to the MFP 3, the language monitor 36 updates the retry count one by one, and sets the value in the <ans:Retry> element 901.

In the <ans:OSVersion> element 907, the version of the OS of the PC 60 is set. The language monitor 36 calls the GetVersionEx( ) function serving as the API of the OS and sets, in the <ans:OSVersion> element 907, version information of the OS sent back by the argument. This example represents a state in which a value "6.1" indicating the Windows7 OS is set.

The MFP 3 confirms a value set in the <ans:OSVersion> element 907, and can switch control in accordance with the OS of the PC (for example, between the Windows7 OS of the PC and other OSs). For example, when the OS is changed from the Windows7 OS to a new Windows OS and the timings and control of the WSD protocol and the like are changed, the MFP 3 switches the timings and control of the WSD protocol and the like in accordance with the change. As a result, stable control optimized for each OS installed in the PC can be performed, and a malfunction and the like can be prevented.

In the <ans:DateTime> element 908, the date & time when GetPrinterElementsRequest is issued is set. The language monitor 36 calls the API of the OS, acquires the date and time, and sets the date & time in the <ans:DateTime> element 908 by using the date and time. This example represents a state in which a value "2009-01-01T00:08:00" is set. The MFP 3 does not always receive, in the issuing order, GetPrinterElementsRequest requests sequentially issued from a plurality of PCs (PC 60, PC 61, and other PCs (not shown)) to the MFP 3 in accordance with the statuses of PCs, printers, and various devices connected in the network 11. Thus, the MFP 3 decides, based on the <ans:DateTime> element 908, the order in which the GetPrinterElementsRequest requests are processed. In accordance with this order, the MFP 3 sends back GetPrinterElementsResponse responses (to be described later with reference to FIG. 9B) to the issuing source PCs as responses to the GetPrinterElementsRequest requests.

FIG. 9B is a view showing GetPrinterElementsResponse. GetPrinterElementsResponse shown in FIG. 9B is an example of a response issued from the PC 60 to the MFP 3. When the MFP 3 receives GetPrinterElementsRequest including the <wprt:Name> element 903 in which ans:ABCCommand is set, it sends back ans:ABCCommand by GetPrinterElementsResponse to the PC 60. In FIG. 9B, a description 909 is a <wprt:ElementData> element, and is public information in which private information ans:ABCCommand is set as a Name attribute. This represents that GetPrinterElementsResponse includes ans:ABCCommand designated by the <wprt:Name> element 903. A description 910 is an <ans:ABCCommand> element, and is private information that includes an <ans:SplJobId> element 911, the <ans:ReceivedId> element 912, an <ans:Retry> element 902, an <ans:OSVersion> element 913, and an <ans:DateTime> element 914. All the elements 911, 912, 902, 913, and 914 are pieces of private information. The MFP 3 sets, in the <ans:SplJobId> element 911 without any change, a value set in the <ans:SplJobId> element 905. This example represents a state in which a value "5" is set.

The MFP 3 sets an appropriate value in the <ans:ReceivedId> element 912, which will be described later with reference to FIG. 13. This example represents a state in which a value "00000202" is set. The MFP 3 confirms a value set in the <ans:Retry> element 901, and when "0" is set, determines that GetPrinterElementsRequest targets a newly issued print job. When a value other than "0" is set, the MFP 3 determines that GetPrinterElementsRequest targets a restart request for a print job, a reservation of which has been accepted by the MFP 3. The MFP 3 sets, in the <ans:Retry> element 902 without any change, a value set in the <ans:Retry> element 901. This example represents a state in which a value "0" is set to indicate a case in which the language monitor 36 tries to transmit, to the MFP 3 for the first time, the start data of print data constituted by print control commands, which serves as a trigger for issuing a print job request from the PC 60 to the MFP 3.

The <ans:OSVersion> element 913 represents version information of the OS of the PC (PC 60). The MFP 3 sets, in the <ans:OSVersion> element 913 without any change, a value set in the <ans:OSVersion> element 907. This example represents a state in which a value "6.1" representing the Windows7 OS is set. In the <ans:DateTime> element 914, the date & time when GetPrinterElementsResponse is issued is set. The MFP 3 acquires the date and time from an incorporated real time clock, and sets the date & time in the <ans:DateTime> element 914 by using the date and time. This example represents a state in which a value "2009-01-01700:08:01" is set.

The PC 60 can acquire, from the time difference between the <ans:DateTime> element 908 and the <ans:DateTime> element 914, the time until GetPrinterElementsResponse is received after GetPrinterElementsRequest is issued. The PC 60 can calculate and predict the communication speed and traffic of the network 11 by using the acquired time, and can optimize control of the communication and timing of the WSD protocol based on this time. The PC 60 can call the internal timer of the OS by using the API, and compare the time, calculated based on this timer, until a reply of GetPrinterElementsResponse is received after GetPrinterElementsRequest is issued, with a time calculated from the time difference between the <ans:DateTime> element 908 and the <ans:DateTime> element 914. Based on this comparison result, the PC 60 can correct the date and time of the real time clock of the MFP 3, and correct the date and time in the PC 60.

As described in the description of FIG. 9A, in step S515 of FIG. 5 or step S611 of FIG. 6 (step S1502 of FIG. 15A), the port monitor 37 calls CreatePrintJob( ) of the WSDAPIs that control the WSD. However, values set in the <wprt:JobName> element 1102, <wprt:JobOriginatingUserName> element 1103, and <wprt:JobId> element 1104 shown in FIG. 11, which can be referred to as arguments of the function, are not passed as arguments of the PM_WritePort( ) function. Thus, the language monitor 36 can neither refer to values set in the elements 1102, 1103, and 1104, nor change these values. For the same reason, the language monitor 36 cannot refer to the elements 911, 912, 902, 913, and 914 serving as pieces of private information from CreatePrintJobResponse by using a CreatePrintJob operation issued from the port monitor 37.

FIGS. 10A and 10B show the contents of GetPrinterElements. FIG. 10A shows GetPrinterElementsRequest, and FIG. 10B shows GetPrinterElementsResponse.

FIG. 10A is a view showing GetPrinterElementsRequest. GetPrinterElementsRequest shown in FIG. 10A is an example of a request issued from the PC 60 to the MFP 3. In FIG. 10A, a detailed description of the same contents as those in FIG. 9A will not be repeated.

A description 1001 is a <wprt:Name> element, and is public information in which ans:ABCCommand is set as its value. ans:ABCCommand is private information. A description 1002 is an <ans:ABCCommand> element, and is private information that includes an <ans:SplJobId> element 1003, an <ans:ReceivedId> element 1004, an <ans:Retry> element 1005, an <ans:OSVersion> element 1006, and an <ans:DateTime> element 1007. All the elements 1003, 1004, 1005, 1006, and 1007 are pieces of private information, and the language monitor 36 sets appropriate values in these elements in GetPrinterElementsRequest. The language monitor 36 sets, in the <ans:SplJobId> element 1003, a value set in the third argument JobId passed when the spooler 40 called the LM_StartDocPort( ) function in step S503 of FIG. 5. This example represents a state in which a value "5" is set.

In the <ans:ReceivedId> element 1004, a print reservation ID issued when the MFP 3 accepted a reservation for a print job request is set. This example represents a state in which the MFP 3 has already accepted the reservation for the print job request and a value "00000202" issued at the time of acceptance is set. In the <ans:Retry> element 1005, the retry count of a print job request issued from the PC 60 to the MFP 3 is set. This example represents a state in which a value "0" is set to indicate a case in which the PC 60 transmits a print job request to the MFP 3 as the first retry.

Every time the language monitor 36 tries to transmit print data constituted by the first print control command, which serves as a trigger for issuing a print job request from the PC 60 to the MFP 3, the language monitor 36 updates the retry count one by one, and sets the value in the <ans:Retry> element 1005. In the <ans:OSVersion> element 1006, the version of the OS of the PC 60 is set. This example represents a state in which a value "6.1" indicating the Windows7 OS is set. In the <ans:DateTime> element 1007, the date & time when GetPrinterElementsRequest is issued is set. This example represents a state in which a value "2009-01-01700:08:04" is set.

FIG. 10B is a view showing GetPrinterElementsResponse. GetPrinterElementsResponse shown in FIG. 10B is an example of a response issued from the PC 60 to the MFP 3. When the MFP 3 receives GetPrinterElementsRequest including the <wprt:Name> element 1001 in which ans:ABCCommand is set, it sends back ans:ABCCommand by GetPrinterElementsResponse to the PC 60. In FIG. 10B, a detailed description of the same contents as those in FIG. 9B will not be repeated.

A description 1008 is a <wprt:ElementData> element, and is public information in which private information ans:ABCCommand is set as a Name attribute. This represents that GetPrinterElementsResponse includes ans:ABCCommand designated by the <wprt:Name> element 1001. A description 1009 is an <ans:ABCCommand> element, and is private information that includes an <ans:SplJobId> element 1010, the <ans:ReceivedId> element 1011, an <ans:Retry> element 1012, an <ans:OSVersion> element 1013, and an <ans:DateTime> element 1014. All the elements 1010, 1011, 1012, 1013, and 1014 are pieces of private information. The MFP 3 sets, in the <ans:SplJobId> element 1010 without any change, a value set in the <ans:SplJobId> element 1003. This example represents a state in which a value "5" is set. The MFP 3 sets an appropriate value in the <ans:ReceivedId> element 1011, which will be described later with reference to FIG. 13. This example represents a state in which a value "00000202" is set. The MFP 3 sets, in the <ans:Retry> element 1012 without any change, a value set in the <ans:Retry> element 1005. This example represents a state in which a value "1" is set.

The MFP 3 sets, in the <ans:OSVersion> element 1013 without any change, a value set in the <ans:OSVersion> element 1006. This example represents a state in which a value "6.1" is set. The MFP 3 acquires the date and time from the incorporated real time clock, and sets the date & time in the <ans:DateTime> element 1014 by using the date and time. This example represents a state in which a value "2009-01-01T00:08:05" is set.

[Print Queue Database of MFP 3]

FIGS. 26A and 26B are tables each showing a print queue database that manages print job requests accepted by the MFP 3. FIG. 26A shows a print queue database installed in the MFP 3. In this embodiment, a total of four print jobs including a print job during execution by the MFP can be managed as the number of acceptable print jobs. Further, four print job requests can be reserved. The print job request is a print request for a print job, and does not include a print image. The print queue database manages both print jobs (and print job requests) using a local network (for example, the WSD protocol), and cloud print jobs (and print job requests) using a wide area network. That is, the print queue database in the MFP 3 shown in FIG. 26A centralizes management of different protocols, for example, print job requests designating printing via a local area network and print job requests designating printing via a wide area network. FIG. 26B shows a print queue database in an application server that provides cloud printing. In this embodiment, the PC 2 functioning as a server includes the print queue database shown in FIG. 26B. This print queue database is used when a terminal connected on a local network controls network printing including both print jobs using the WSD protocol and cloud print jobs. That is, the print queue database in the application server shown in FIG. 26B centralizes management of, for example, print job requests designating printing via a local area network and print job requests designating printing via a wide area network. The print queue database in FIG. 26B is used to register a print job request when the number of print jobs registrable in the print queue database of the printing apparatus (MFP 3 in this embodiment) exceeds an upper limit value.

In FIGS. 26A and 26B, "Null" represents that there is a free area where no data exists, and "-" represents that data is undefined (unusable).

In FIG. 26A, a "No." field represents the turn of a print job during execution or a reserved print job request. That is, in FIG. 26A, No. indicates the priority of a print job scheduled to execute printing. No. 1 indicates a print job, printing of which is currently executed. No. 2 indicates a top-priority print job scheduled to execute printing next. Nos. 3 and 5 to 8 indicate reservations for print jobs. Of Nos. 5 to 8, No. 5 indicates a reservation for a print job of high priority next to No. 4, and No. 8 indicates a reservation for a lowest-priority print job scheduled to execute printing finally.

In FIG. 26B, a "No." field represents the turn of a reserved print job request. That is, in FIG. 26B, No. indicates the priority of a print job request that is registered in the print queue database of FIG. 26A when a print job becomes newly registrable in the print queue database of FIG. 26A. In FIGS. 26A and 26B, a "Protocol" field represents a communication protocol used in network communication between the PC and the MFP 3. In this embodiment, either WSD or HTTP is set.

In FIGS. 26A and 26B, a "Computer Name" field represents the name of a computer that issued a print job request. A "wprt:JobName" field represents a print job name set in the <wprt:JobName> element (for example, the description 1102). A "wprt:JobOriginatingUserName" field represents a user name set in the <wprt:JobOriginatingUserName> element (for example, the description 1103). A "wprt:JobId" field represents a job ID that has been issued from the MFP 3 and is set in the <wprt:JobId> element (for example, the description 1104). That is, the job ID is an ID issued from the MFP 3 upon completion of accepting a job in the MFP 3. For example, a job ID "60" is set in the "wprt:JobId" field on line No. 1 in FIG. 26A. This indicates that the MFP 3 is executing printing of this print job and has already issued a job ID. Nos. 2 and 4 represent print jobs before execution of printing though the MFP 3 has already issued job IDs, that is, print jobs waiting for printing upon completion of acceptance.

"Null" is set in the "wprt:JobId" field on line No. 5 of FIG. 26A and lines Nos. 1 and 2 of FIG. 26B. This indicates that the MFP 3 has only accepted reservations for these print job requests, and has neither executed printing nor issued job IDs. Note that "-" is set in the "wprt:JobId" field on lines Nos. 3, 6, 7, and 8 of FIG. 26A and line No. 3 of FIG. 26B. This indicates that a <wprt:JobId> element does not exist in a cloud print job and is undefined (unusable).

An "ans:SplJobId" field in FIGS. 26A and 26B represents a job ID that has been issued from the spooler 40 and is set in the <ans:SplJobId> element (for example, the description 905 or 1003). For example, a case is conceivable, in which a given user successively prints the same document from one PC over and over. When the spooler 40 can process these print jobs in parallel by using a plurality of threads or the like, print job names set in <wprt:JobName> elements (for example, the descriptions 1102) in a plurality of CreatePrintJobRequest requests, and user names set in <wprt:JobOriginatingUserName> elements (for example, the descriptions 1103) become the same print job name and user name between the respective print job requests, and these print job requests cannot be discriminated from each other. This problem can be solved by setting job IDs issued from the spooler 40 in information held in the print queue database so that these print jobs can be identified. An "ans:ReceivedId" field in FIGS. 26A and 26B represents a print reservation ID set in the <ans:ReceivedId> element (for example, the description 912 or 1011). A "Time" field in FIGS. 26A and 26B represents a time count value representing the time when the MFP 3 accepted a print job request issued from the PC or a reservation confirmation request for the print job request.

In this embodiment, for example, print jobs that have been issued from the respective PCs 60 and 61 on the network 11 and use the WSD protocol, and print jobs in cloud printing that have been issued from the PC 1 on the network 4 coexist. Even in such an environment where print jobs issued through different paths, in other words, print jobs of a plurality of protocols coexist, the printing apparatus (MFP 3 in this case) can use the print queue database as shown in FIGS. 26A and 26B to correctly print in the issuing order of the print jobs issued from respective PCs.

[CreatePrintJob Processing in MFP 3]

Figure 12:
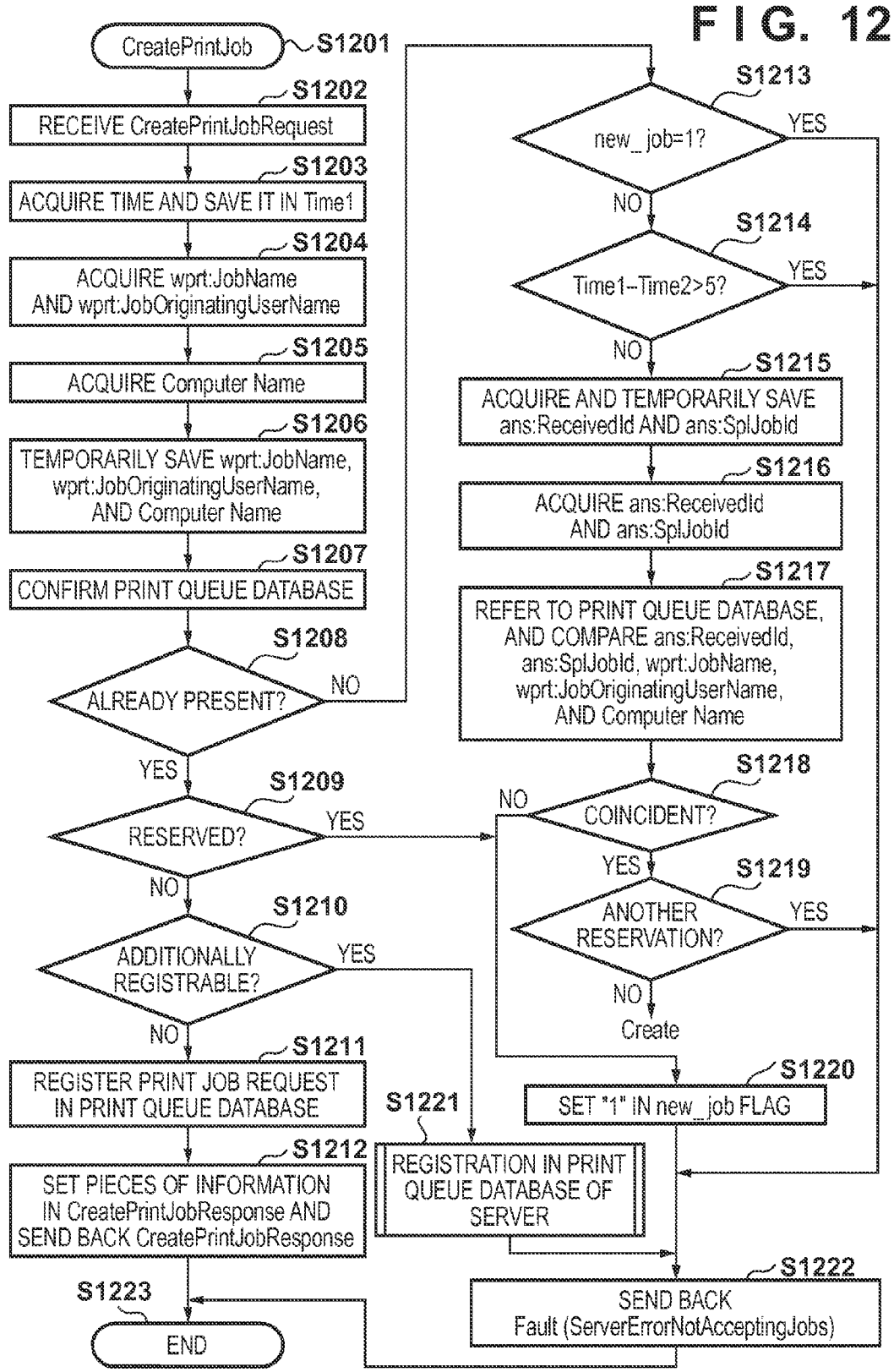
FIG. 12 is a flowchart showing the procedures of CreatePrintJob processing in the MFP.

FIG. 12 is a flowchart showing the procedures of CreatePrintJob processing in the MFP 3. A program for executing the processing in FIG. 12 is stored in the ROM 16, read out to the RAM 17, and executed by the CPU 15. At the time of activation, the MFP 3 initializes a new_job flag allocated in the RAM 17 or the like by setting "0". For example, when the PC 60 issues CreatePrintJobRequest (for example, FIG. 11A) to the MFP 3 and the MFP 3 accepts it, step S1201 starts. The MFP 3 receives CreatePrintJobRequest (step S1202), acquires a count value capable of measuring the time or elapsed time from a timer incorporated in the MFP 3, and stores it as Time1 (step S1203). The unit of the count value is, for example, "sec".

The MFP 3 acquires a print job name set in the <wprt:JobName> element 1102 and a user name set in the <wprt:JobOriginatingUserName> element 1103 from the received CreatePrintJobRequest (step S1204). Also, the MFP 3 acquires the computer name of a computer that has issued CreatePrintJobRequest (step S1205). In this case, the computer name of the PC 60 is acquired. In this embodiment, an IP address is acquired from a TCP reception socket in HTTP POST addressed to WSD Print Service, and a computer name is acquired based on the IP address. In this embodiment, in order to simplify the description, a computer name is acquired from an IP address, and a PC is specified using this computer name to perform each processing. However, a PC may be directly specified from an IP address to perform each processing. The MFP 3 temporarily saves the acquired print job name, user name, and computer name (step S1206).

Based on the print job name, the user name, and the computer name, the MFP 3 determines whether a reservation for the print job request of the print job, the start of which has been requested by CreatePrintJobRequest already received in step S1202, already exists in the print queue database shown in FIG. 26A (step S1207). For example, the print queue database is searched based on one of the three elements such as the print job name, and when, for example, the same print job name is found, it may be determined that such a reservation is likely to exist. In this case, if the same print job name is not found, it is determined that such a reservation is not likely to exist.

If the MFP 3 determines that a reservation for the print job request is likely to already exist in the print queue database shown in FIG. 26A, the process advances to step S1213. If the MFP 3 determines that a reservation for the print job request is not likely to exist, the process advances to step S1209 (step S1208). In step S1209, the MFP 3 determines that the print queue database shown in FIG. 26A includes a reservation for the request of another print job higher in priority than the print job, the start of which has been requested by CreatePrintJobRequest received in step S1202. If the MFP 3 determines that such a reservation exists, the process advances to step S1220. If the MFP 3 determines that such a reservation does not exist, the process advances to step S1210.

In step S1210, the MFP 3 determines whether the print queue database in the MFP 3 has a free area, and the print job request of the print job, the start of which has been requested by CreatePrintJobRequest received in step S1202, can be registered. If the MFP 3 determines that the print job request can be registered, the process advances to step S1211. If the MFP 3 determines that the print job request cannot be registered, the process advances to step S1221. In step S1211, the MFP 3 registers, in the print queue database of the MFP 3 shown in FIG. 26A, the print job request of the print job, the start of which has been requested by CreatePrintJobRequest received in step S1202. The MFP 3 sends back CreatePrintJobResponse (for example, FIG. 11B) to the PC 60 as a response representing that the print job of the print job request CreatePrintJobRequest received in step S1202 is accepted and executed (step S1212). After that, the MFP 3 ends the CreatePrintJob Processing (step S1223).

In step S1221, the MFP 3 transmits a print job request to the proxy APP 143. In this case, the print job request of the print job, the start of which has been requested by CreatePrintJobRequest, is registered in the print queue database of the proxy APP 143, which will be described later with reference to FIG. 16B. After the processing in step S1221, the process advances to step S1222.

If the MFP 3 determines in step S1208 that the reservation for the print job request is likely to already exist in the print queue database shown in FIG. 26A, the process advances to step S1213. In step S1213, the MFP 3 refers to the value of the new_job flag, and determines whether "1" has been set. If the MFP 3 determines that "1" has been set, the process advances to step S1222. If the MFP 3 determines that "1" has not been set (for example, "0" has been set), the process advances to step S1214.

Figure 13:
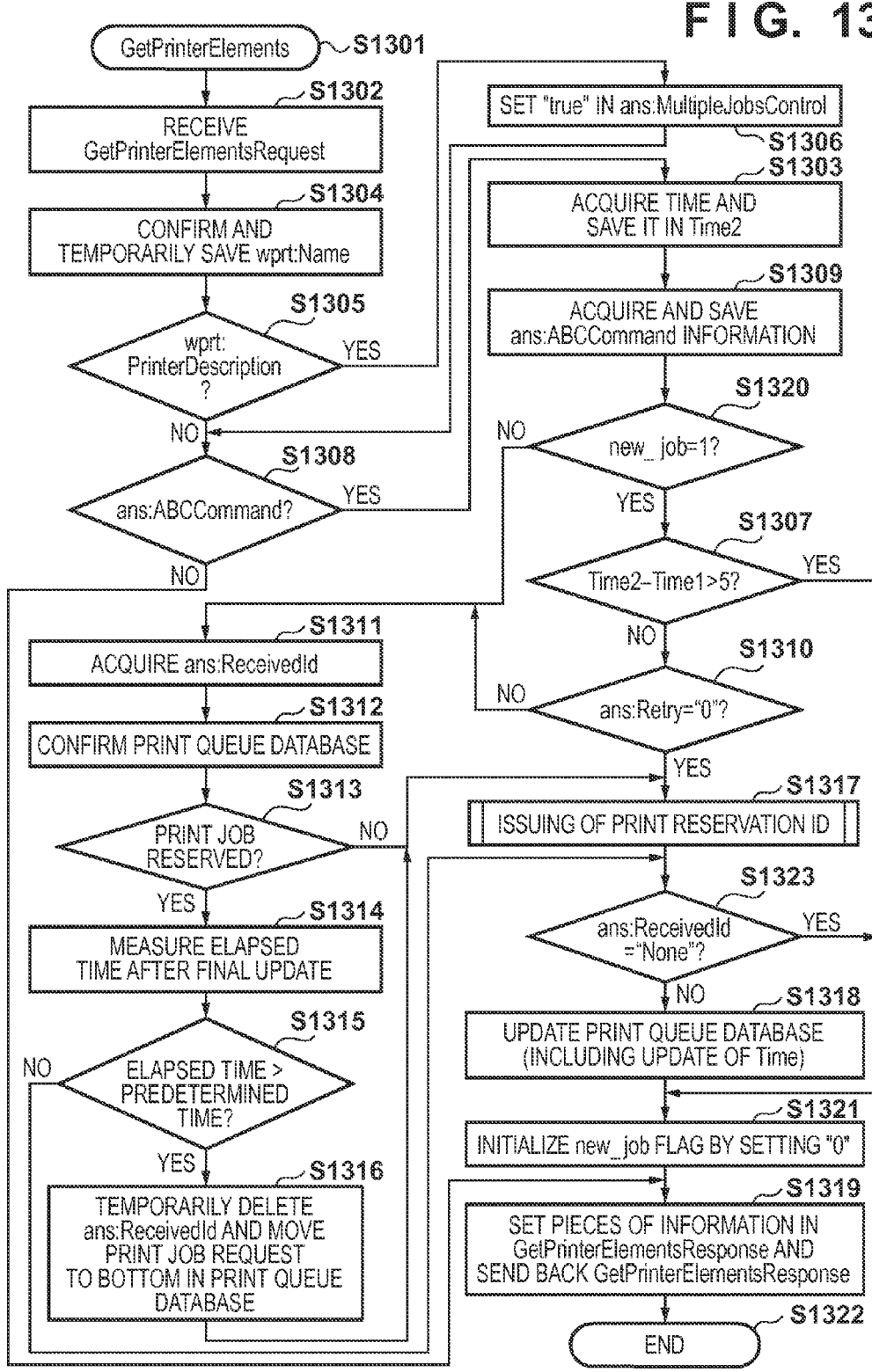
FIG. 13 is a flowchart showing the procedures of GetPrinterElements processing in the MFP.

In step S1214, the MFP 3 subtracts a count value Time2 saved in step S1303 of FIG. 13 from the count value Time1 saved in step S1203. That is, the MFP 3 obtains the elapsed time until CreatePrintJobRequest was received in step S1202 after GetPrinterElementsRequest was received in step S1302 of FIG. 13. In step S1214, the MFP 3 determines whether the elapsed time has exceeded 5 sec. If the MFP 3 determines that the elapsed time has exceeded 5 sec, the process advances to step S1222. If the MFP 3 determines that the elapsed time has not exceeded 5 sec, the process advances to step S1215.

In step S1215, the MFP 3 searches the print queue database shown in FIG. 26A based on the print job name, user name, and computer name stored in step S1206 for a reservation of a print job request having the same pieces of information as these pieces of information. The MFP 3 acquires, from the print queue database, a print reservation ID set in the "ans:ReceivedId" field, and a job ID that has been issued from the spooler 40 and is set in the "ans:SplJobId", and temporarily saves them.

The MFP 3 acquires, from information included in the <ans:ABCComand> element (for example, the description 904 or 1002) saved in step S1309 of FIG. 13, a print reservation ID (for example, the description 1004) set in the <ans:ReceivedId> element and a job ID (for example, the description 1003) that has been issued from the spooler 40 and is set in the <ans:SplJobId> element (step S1216). The MFP 3 compares the print reservation ID and the job ID issued from the spooler 40, which have been acquired in step S1216, with the print reservation ID and the job ID issued from the spooler 40, which have been temporarily saved in step S1215. Based on the print reservation ID temporarily saved in step S1215, the MFP 3 compares the print job name, user name, and computer name that have been acquired from the print queue database, with the print job name, user name, and computer name that have been temporarily saved in step S1206 (step S1217).

As a result of comparing all pieces of information of comparison targets, the MFP 3 determines whether the respective pieces of information to be compared coincide with each other (step S1218). If the MFP 3 determines that the respective pieces of information coincide with each other, the process advances to step S1219. If the MFP 3 determines that one or more pieces of information are not coincident, the process advances to step S1220.

In step S1219, the MFP 3 confirms the print queue database shown in FIG. 26A, and determines whether the print queue database includes a reservation for the request of another print job higher in priority than the print job, the start of which has been requested by CreatePrintJobRequest received in step S1202 (step S1219). If the MFP 3 determines that such a reservation exists, the process advances to step S1222. If the MFP 3 determines that such a reservation does not exist, the process returns to step S1210.

In step S1220, the MFP 3 sets "1" in the new_job flag. In step S1222, the MFP 3 sends back, to the PC 60, Fault (ServerErrorNotAcceptingJobs) representing that this print job cannot be accepted in response to the print job request CreatePrintJobRequest received in step S1202. In step S1223, the MFP 3 ends the CreatePrintJob processing.

[GetPrinterElements Processing in MFP 3]

FIG. 13 is a flowchart showing the procedures of GetPrinterElements processing in the MFP 3. A program regarding the flowchart of FIG. 13 is stored in the ROM 16, read out to the RAM 17, and executed by the CPU 15. When the PC 60 issues GetPrinterElementsRequest (for example, FIG. 8A, 9A, or 10A) to the MFP 3 and the MFP 3 accepts it, step S1301 of FIG. 13 starts. The MFP 3 receives GetPrinterElementsRequest (step S1302), and confirms a value set in the <wprt:Name> element (for example, 801, 903, or 1001) from GetPrinterElementsRequest (step S1304). In step S1304, a plurality of <wprt:Name> elements may exist in GetPrinterElementsRequest, so the MFP 3 temporarily saves values set in all the acquired <wprt:Name> elements. If wprt:PrinterDescription is detected as a value set in the <wprt:Name> element, the process advances to step S1306. If wprt:PrinterDescription is not detected, the process advances to step S1308 (step S1305).

In step S1306, the MFP 3 sets "true" in the <ans:MultipleJobsControl> element 802, and the process advances to step S1308. In step S1308, the MFP 3 confirms all values set in the <wprt:Name> elements temporarily saved in step S1304. If ans:ABCCommand is detected, the process advances to step S1303. If ans:ABCCommand is not detected, the process advances to step S1319. In step S1303, the MFP 3 acquires a count value capable of calculating the time or elapsed time from the timer incorporated in the MFP 3, and saves it in Time2. The unit of the count value is "sec".

In step S1309, the MFP 3 acquires and saves all pieces of information included in the <ans:ABCComand> element (for example, 904 or 1002) in GetPrinterElementsRequest. The MFP 3 confirms the value of the new_job flag. If "1" has been set, the process advances to step S1307. If a value other than "1" has been set ("0" has been set), the process advances to step S1311 (step S1320). In step S1307, the MFP 3 subtracts Time1 saved in step S1203 of FIG. 12 from Time2, thereby measuring the elapsed time until the MFP 3 received GetPrinterElementsRequest in step S1302 after the MFP 3 received CreatePrintJobRequest in step S1202 of FIG. 12. If the elapsed time has exceeded 5 sec, the process advances to step S1321. If the elapsed time has not exceeded 5 sec, the process advances to step S1310.

In step S1310, the MFP 3 confirms a value set in the <ans:Retry> element (for example, 901 or 1005). If this value is "0", the process advances to step S1317. If the value is not "0" (is an integer larger than 0 in practice), the process advances to step S1311. In step S1317, the MFP 3 executes print reservation ID issuing processing shown in FIG. 16A.

Figure 16A:
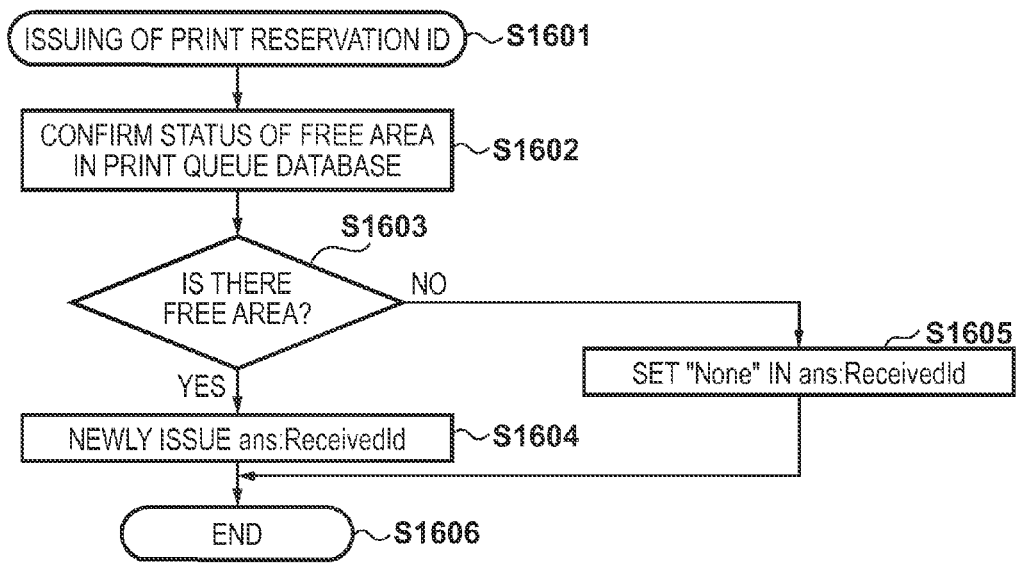
FIGS. 16A and 16B are flowcharts respectively showing the procedures of print reservation ID issuing processing in the MFP and registration processing in the print queue database of a proxy APP.

The MFP 3 confirms a value set in the <ans:ReceivedId> element (for example, 912 or 1011) in FIG. 16A. If the value is "None", the process advances to step S1321. If the value is not "None", the process advances to step S1318 (step S1323). In step S1318, the MFP 3 registers pieces of information as a reservation for a new print job request in the print queue database shown in FIG. 26A based on a print reservation ID (ans:ReceivedId) newly issued in step S1604 of FIG. 16A, thereby updating the print queue database. At this time, the MFP 3 updates the time count value set in the "Time" field by the value saved in Time2.

In step S1321, the MFP 3 initializes the new_job flag by setting "0". The MFP 3 sets pieces of information in GetPrinterElementsResponse by using the information set in step S1306, the information set in step S1605 of FIG. 16A, the information set in the print queue database shown in FIG. 26A, and the like. The MFP 3 sends back GetPrinterElementsResponse to the PC (PC 60) as a response to GetPrinterElementsRequest received in step S1302 (step S1319). Then, the MFP 3 ends the GetPrinterElements processing (step S1322).

In step S1311, the MFP 3 accepts a print reservation ID (for example, 1004) set in the <ans:ReceivedId> element. The MFP 3 determines whether this print reservation ID exists in "ans:ReceivedId" within the print queue database shown in FIG. 26A (step S1312). If the MFP 3 has found, in the print queue database shown in FIG. 26A, a print reservation ID representing a reservation for this print job request, the process advances to step S1314. If the MFP 3 has not found the print reservation ID, the process advances to step S1317 (step S1313).

In step S1314, the MFP 3 acquires, from the print queue database shown in FIG. 26A, a time count value set in the "Time" field for the reservation for the print job reserved with this print reservation ID. The MFP 3 subtracts this time count value from Time2 saved in step S1303, thereby measuring the elapsed time after this print job reservation was updated the last time. If the elapsed time has exceeded a predetermined time (20 sec is set here), the MFP 3 advances to step S1316. If the elapsed time has not exceeded the predetermined time, the MFP 3 advances to step S1323 (step S1315). In step S1316, the MFP 3 temporarily deletes the print reservation ID (ans:ReceivedId) of the print job request from the print queue database shown in FIG. 26A, and moves this print job request to the bottom of the print queue database to change this reservation into a reservation for a lowest-priority print job request. Thereafter, the process advances to step S1317.

The 5-sec fixed timeout value is set as the value for determining the lapse of a predetermined time in step S1212 of FIG. 12 and step S1307 of FIG. 13, but the value is not limited to these examples. For example, a fixed timeout value such as 3 sec, 8 sec, or 10 sec may be set in accordance with the use environment of the MFP 3 or the environment of a network used by the user. It may also be configured to set an arbitrary appropriate value corresponding to the use environment by using the touch panel of the display unit 21 of the MFP 3 or by a button operation to the operation unit 20. The MFP 3 may also be configured to monitor PCs on the network 11, grasp the congestion of the network in accordance with the number of PCs, and set an optimal timeout value based on the congestion. Further, the timeout value in step S1212 of FIG. 12 and the timeout value in step S1307 of FIG. 13 may be not the same value but different values. In this case, for example, it is also possible to set the timeout value in step S1212 of FIG. 12 to be 5 sec, and the timeout value in step S1307 of FIG. 13 to be 3 sec.

Figure 16B:
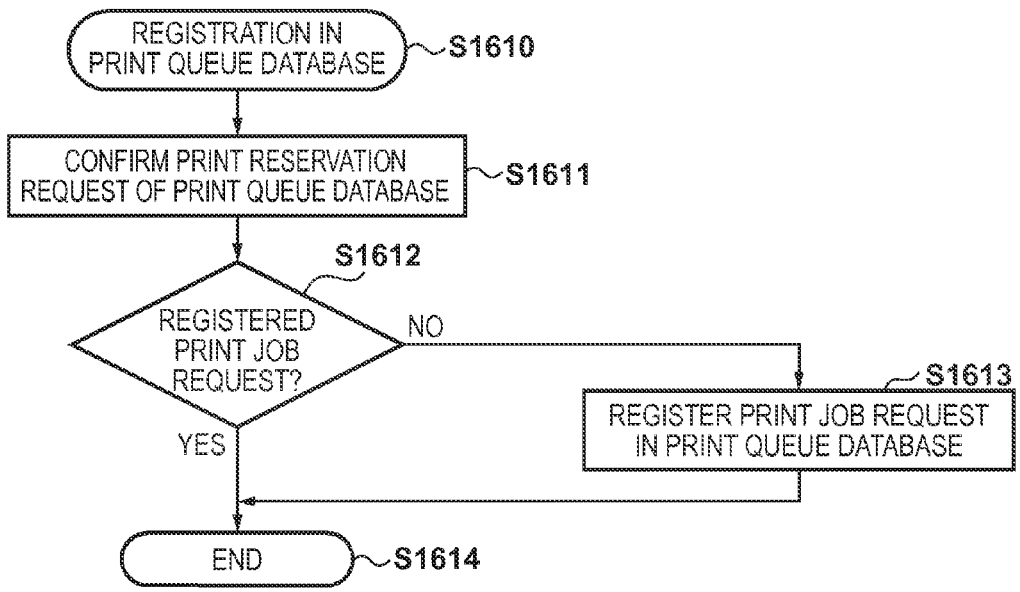

FIGS. 16A and 16B are a flowchart showing the procedures of print reservation ID issuing processing in the MFP 3, and a flowchart showing the procedures of processing of registering a print job request in the proxy APP 143, respectively. A program regarding the flowchart of FIG. 16A is stored in the ROM 16, read out to the RAM 17, and executed by the CPU 15. When the MFP 3 executes the print reservation ID issuing processing in step S1317 of FIG. 13, step S1601 of FIG. 16A starts. The MFP 3 confirms the status of a free area in the print queue database shown in FIG. 26A (step S1602). If there is a free area, the process advances to step S1604. If there is no free area, the process advances to step S1605 (step S1603).

In step S1604, the MFP 3 newly issues a print reservation ID (ans:ReceivedId), sets the print reservation ID in the <ans:ReceivedId> element (for example, 912 or 1011), and ends the print reservation ID issuing processing (step S1606). The process then advances to step S1323 of FIG. 13. The print reservation ID issued in step S1704 is managed in the MFP 3, and is a value uniquely decided in the MFP 3. In step S1605, the MFP 3 sets "None" in the <ans:ReceivedId> element (for example, 912 or 1011), and ends the print reservation ID issuing processing (step S1606). The process then advances to step S1323 of FIG. 13.

FIG. 16B is a flowchart showing the procedures of processing of registering a print job request received by the proxy APP 143 from the MFP 3. When registration processing starts in the print queue database of the server in step S1222 of FIG. 12, step S1610 of FIG. 16B starts. In step S1611, the print queue database of the proxy APP 143 is confirmed. If it is determined in step S1612 that the request is a registered print job request, the process ends (step S1614). If it is determined that the request is an unregistered print job request, the process advances to step S1613. In step S1613, the print job request received by the proxy APP 143 from the MFP 3 is registered in the print queue database of the proxy APP 143 shown in FIG. 26B. The process then ends (step S1614).

FIG. 17 is a view showing an example of the window of the document creation APP 145 of the PC 7 that is displayed on the Web browser. FIG. 17 shows a state in which a certain document is opened. The document creation APP 145 transmits information of this window to the mobile terminal 14, the PC 1, and the MFPs 3 and 103. Then, the mobile terminal 14, the PC 1, and the MFPs 3 and 103 receive this information and display the window on the Web browsers 9, 25, 27, and 28. In this manner, the window of the document creation APP 145 is displayed on the Web browsers by using the Web browsers 9, 25, 27, and 28. A file menu 402 includes sub menus used to display a content (document) selection window (not shown), open documents or contents saved in advance, or create a new document. The sub menus allow the user to select a document or content, or create a new document. Note that the content (document) selection window is constituted by a window similar to a general file selection window in the PC or the like, and a description thereof will not be given. A print menu 401 accepts various operations regarding printing. For example, when the user presses the print menu 401 at the time of printing an opened document by operating an input unit such as the KBD 203 or the operation unit 20, the print window 142 shown in FIG. 18 appears.

Figure 18:
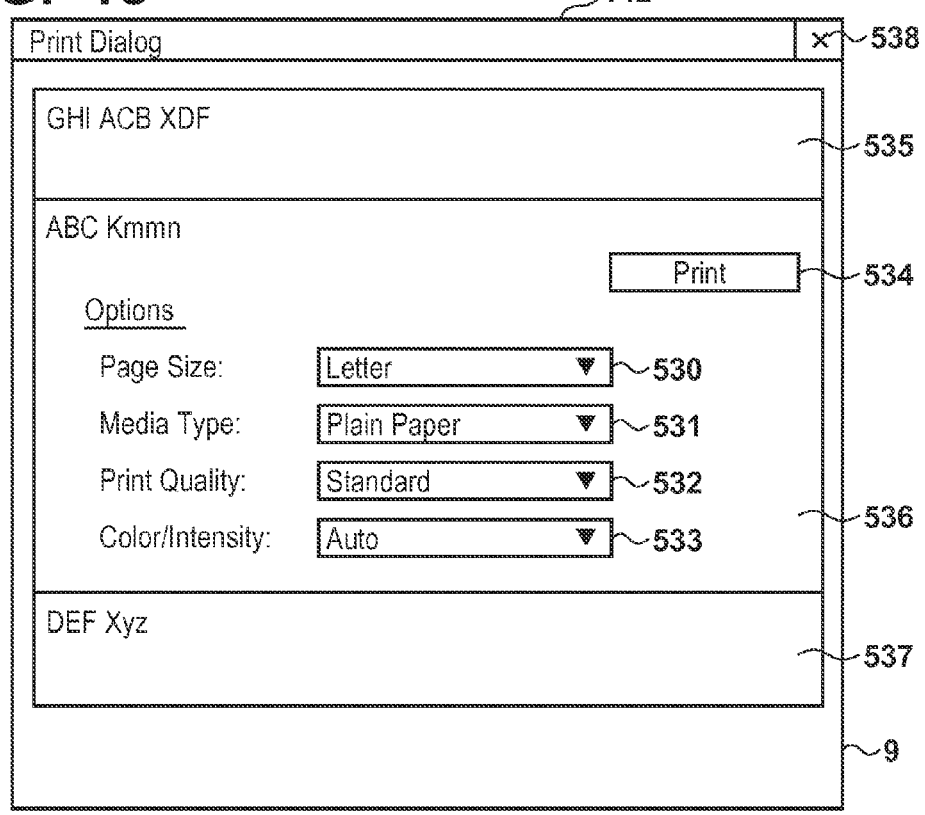
FIG. 18 is a view showing an example of a print window.

FIG. 18 is a view showing an example of the print window 142. The document creation APP 145 controls the print window 142 as a print setting window for the MFP 3 or 103 with respect to the user. The document creation APP 145 transmits window information of the print window 142 to the mobile terminal 14, the PC 1, or the MFP 3 or 103. Then, the mobile terminal 14, the PC 1, or the MFP 3 or 103 receives the information, and displays the window on the Web browser 9, 25, 27, or 28. In this fashion, the print window 142 is displayed on the Web browser by using the Web browser 9, 25, 27, or 28. Device choices 535, 536, and 537 are choices of selectable devices. The device choices 535, 536, and 537 respectively represent choices corresponding to an MFP with a model name "ACBXDF" available from GHI Company, an MFP (MFP 3) with a model name "Kmmn" available from ABC Company, and an MFP with a model name "Xyz" available from DEF Company. FIG. 18 shows a state in which the device choice 536 representing the MFP 3 is selected.

When the print window 142 is displayed on the Web browser 27 (28) of the MFP 3 (103), the document creation APP 145 transmits, to the MFP 3 (103), information for displaying the device choice 536 alone, so as to inhibit the user from selecting other devices. When the print window 142 is displayed on the Web browser 9 of the mobile terminal 14 or the Web browser 25 of the PC 1, the document creation APP 145 transmits, to the mobile terminal 14 or the PC 1, information for displaying the device choices 535, 536, and 537. The mobile terminal 14 or the PC 1 receives this information and displays it on the Web browser 9 or 25. When the user operates the Web browser 9 of the mobile terminal 14 or the Web browser 25 of the PC 1, the document creation APP 145 controls to allow the user to select all devices.

At a paper size selection portion 530, a size of paper used for printing by the MFP 3 is selected from choices "A5", "A4", "B5", and "Letter" in accordance with a user operation. FIG. 18 shows a state in which "Letter" is selected. At a type selection portion 531, a type of paper used for printing by the MFP 3 is selected from choices "Plain Paper", "Photo Paper", and "Postcard" in accordance with a user operation. FIG. 18 shows a state in which "Plain Paper" is selected. At a print quality selection portion 532, a print quality used for printing by the MFP 3 is selected from choices "High", "Standard", and "Fast" in accordance with a user operation. FIG. 18 shows a state in which "Standard" is selected. At a color/density selection portion 533, a color and density used for printing by the MFP 3 are selected from choices "Auto" and "Manual" in accordance with a user operation. FIG. 18 shows a state in which "Auto" is selected.

A print button 534 accepts a print start instruction. When the print button 534 is pressed by a user operation, the document creation APP 145 generates a print job for the MFP 3 that is associated with the device choice 536, and issues the print job to the cloud print APP 146. A close button 538 accepts an instruction to close the print window 142. When the close button 538 is pressed by a user operation, the document creation APP 145 closes the print window 142.

[Cloud Print Processing]

FIGS. 19 to 21, 23, and 24 are flowcharts showing the procedures of cloud print processing. Programs regarding these flowcharts are stored in the PC or the MFP. The program of an application that runs on the PC is stored in the HDD 202, read out to the RAM 201, and executed by the CPU 204. The program of an application that runs on the MFP is stored in the ROM 16, read out to the RAM 17, and executed by the CPU 15.

Figure 21:
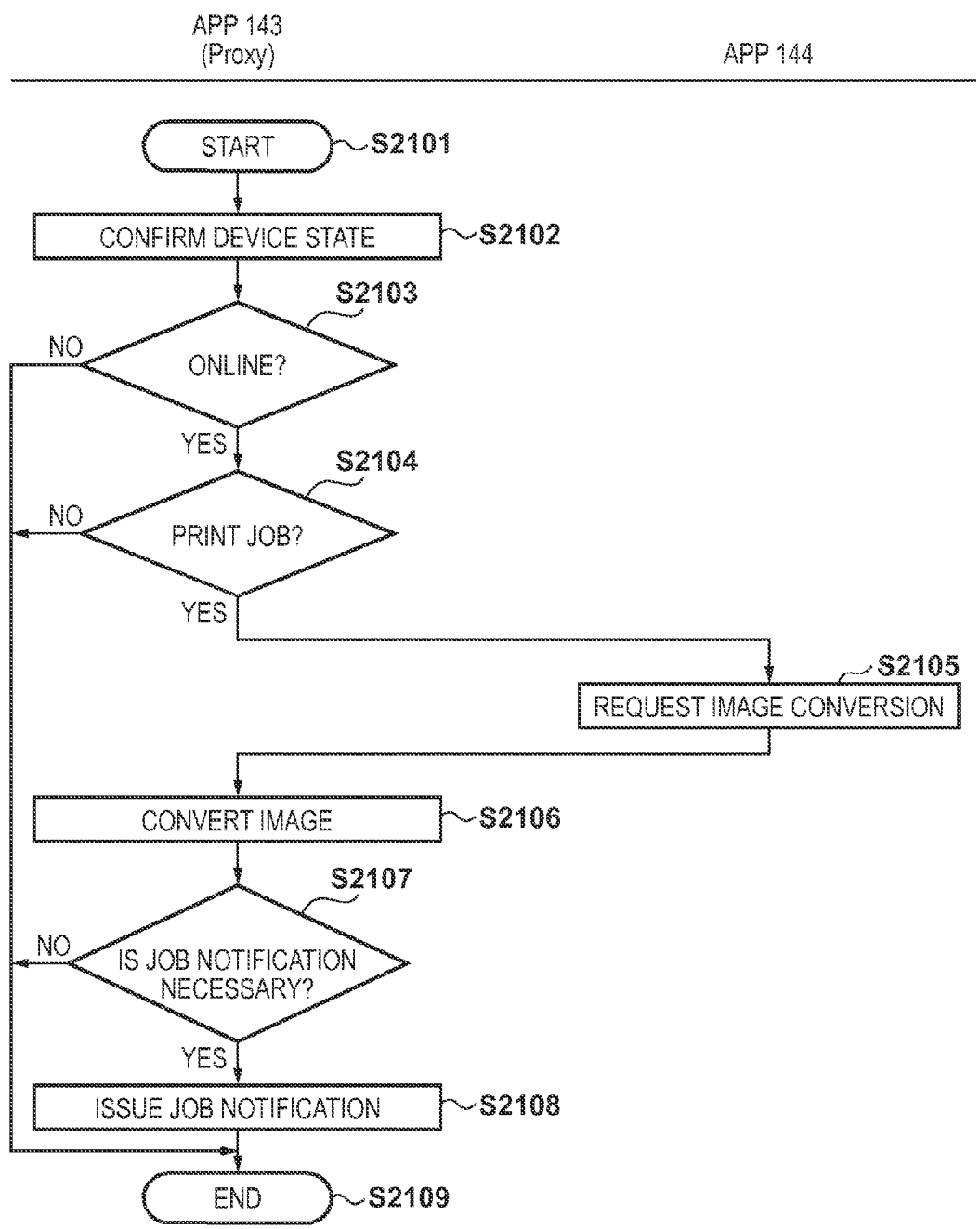
FIG. 21 is a flowchart showing the procedures of job notification processing in the proxy APP.
Figure 23:
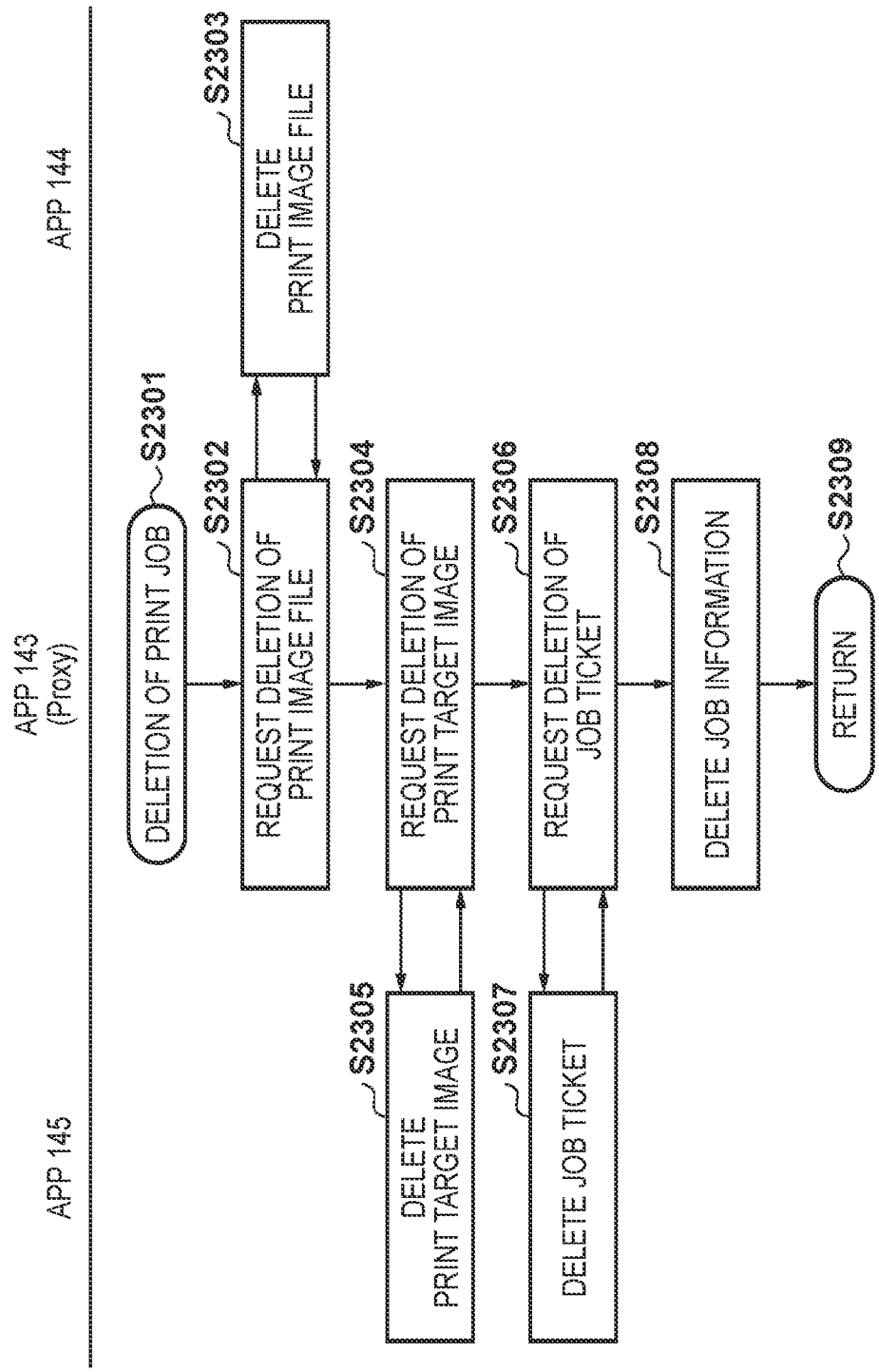
FIG. 23 is a flowchart showing the procedures of print job deletion processing in the MFP and the proxy APP.
Figure 24:
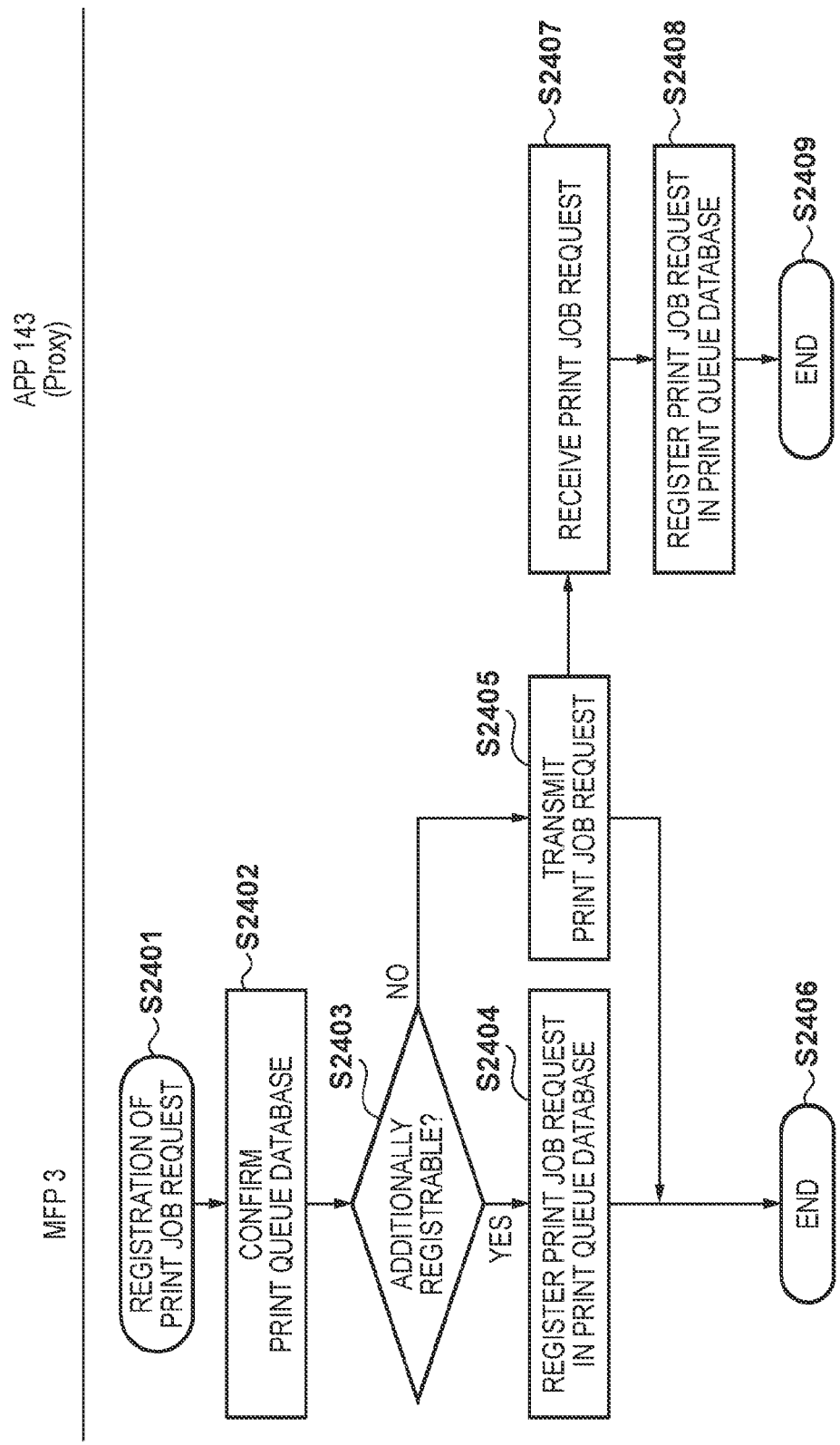
FIG. 24 is a flowchart showing the procedures of registration processing of a print job request of cloud printing.

In FIG. 19, vertical lines represent processing execution sources, and correspond from the left to the PC 1 (Web browser 25), the cloud print APP 146, the proxy APP 143, the document creation APP 145 or the reading APP 147, and the MFP 3 (Web browser 27). In FIGS. 21 and 23, vertical lines represent processing execution sources, and correspond from the left to the document creation APP 145, the proxy APP 143, and the image conversion APP 144. In drawings in which there is no processing for a certain execution source, this execution source is not illustrated in some cases. In FIG. 24, vertical lines represent processing execution sources, and correspond from the left to the MFP 3 and the proxy APP 143. In drawings in which there is no processing for a certain execution source, this execution source is not illustrated in some cases.

A communication control method in a case (a series of processes regarding document printing) in which the user prints a document by the MFP 3 using the PC 1 or the MFP 3 will be explained.

FIG. 19 is a flowchart showing the procedures of processing when printing is performed by executing the document creation APP 145 from the Web browser 25 of the PC 1. In FIG. 19, when the user activates the Web browser 25 of the PC 1 and executes the document creation APP 145 (step S1901), the Web browser 25 requests the document creation APP 145 to transmit a home window (step S1902). The document creation APP 145 transmits information of the home window to the PC 1 (step S1903). Then, the PC 1 displays this window on the Web browser 25 (step S1902).

If it is detected that the user has operated the Web browser 25 and starts selection of a print target content (document) by using the sub menu in the file menu 402, the Web browser 25 requests the document creation APP 145 to transmit the content (document) selection window (step S1904). The document creation APP 145 transmits information of the content (document) selection window to the PC 1 (step S1905), and the Web browser 25 of the PC 1 displays this window (step S1904). If it is detected that the user has pressed the print menu 401 shown in FIG. 17 while selecting a content (document), the Web browser 25 requests the document creation APP 145 to transmit the print window 142 shown in FIG. 18 (step S1904). The document creation APP 145 transmits information of the print window 142 to the PC 1 (step S1905), and the Web browser 25 of the PC 1 displays this window (step S1904).

If it is detected that the user has pressed the print button 534 while selecting the device choice 536 (selecting the MFP 3), the Web browser 25 issues a print request to the document creation APP 145 (step S1906). At this time, this print request includes information (host=PC) indicating that the host which has issued this print request is the PC, and information (notification=yes) indicating that this print request requires a job notification to the MFP 3.

If the document creation APP 145 accepts the print request, it issues a print job to the cloud print APP 146 (step S1907). At this time, this print request includes the information (host=PC) indicating that the host which has issued the print request of the print job is the PC, and the information (notification=yes) indicating that this print job requires a job notification to the MFP 3.

The cloud print APP 146 inputs the print job to the print queue of the proxy APP 143 (step S1908). At this time, the cloud print APP 146 adds, to the print job, the information (host=PC) indicating that the host which has issued the print request of the print job is the PC, the information (notification=yes) indicating that this print request requires a job notification to the MFP 3, and the issuing year/month/day/time (issuing time) of the print job. The proxy APP 143 executes job stack processing shown in FIG. 20A, sends back a job ID (print job ID) to the cloud print APP 146 (step S1909), and then waits for a print job acquisition request from the MFP 3 (step S1910).

In step S1908, the cloud print APP 146 sends back the job ID (print job ID) sent back from the proxy APP 143 to the document creation APP 145. If the Web browser 25 of the PC 1 receives a response to the print request issued to the document creation APP 145, it requests a home window of the document creation APP 145 (step S1911). The document creation APP 145 transmits information of the home window to the PC 1 (step S1912). The PC 1 displays the window on the Web browser 25 (step S1911), and waits for an input operation by the user (step S1913).

As will be described later with reference to FIG. 21, the proxy APP 143 transmits a job (print job) notification to the MFP 3 in step S2108 of FIG. 21. If the MFP 3 receives the job (print job) notification (step S1914), it registers the print job request in the print queue database, which will be described later with reference to FIG. 24 (step S1915). Then, the MFP 3 changes to an online standby state (step S1916).

At the start of printing, the display unit 21 displays a message representing that print-related processing is in progress, such as "in print preparation" or "print in progress", thereby notifying the user that the MFP 3 has shifted to the print mode. The MFP 3 displays this message without the mediacy of the Web browser 27. The MFP 3 issues a job (print job) acquisition request to the proxy APP 143 (step S1917). The proxy APP 143 executes job information reply processing shown in FIG. 20B, and as a result, sends back the following print job information to the MFP 3 (step S1918).

[Example of Print Job Information]
jobId: prn0001
dateTime: 20120814121812100
host: PC
owner: chancy
deviceId: 77778888
ticketUri:
https://ske88funclub.com/print/ticket/prn001/ticket.xml
dataUri:
https://ske88funclub.com/print/data/prn001/data.jpg status: queued The MFP 3 acquires, from the print job information, the storage destination of a print setting file indicating print settings, and the storage destination of a print image file (ticketUri and dataUri). The MFP 3 accesses paths (URIs) designated by ticketUri and dataUri, and acquires print jobs (print setting file and print image file). The MFP 3 executes printing in accordance with the contents of the print setting file and print image file, and notifies the APP 143 of the end of printing when printing is completed or ended (step S1919). In step S1920, the proxy APP 143 executes job deletion processing shown in FIG. 23, and ends a series of processes regarding the job (step S1921). After printing is completed or ended, the MFP 3 changes to the online standby state (step S1922).

[Job Stack Processing and Job Information Reply Processing in Proxy APP 143]

Figure 20A:
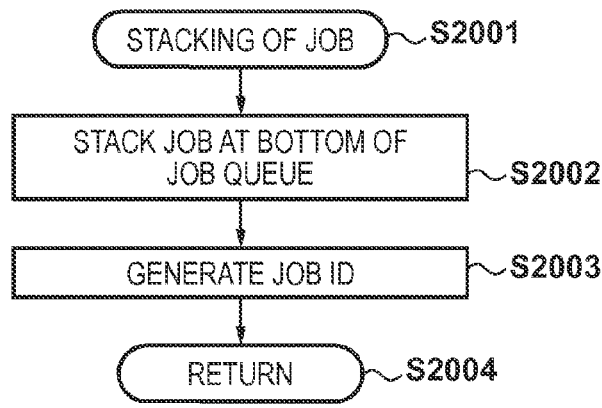
FIGS. 20A and 20B are flowcharts showing the procedures of job stack processing and job information reply processing in the proxy APP.
Figure 20B:
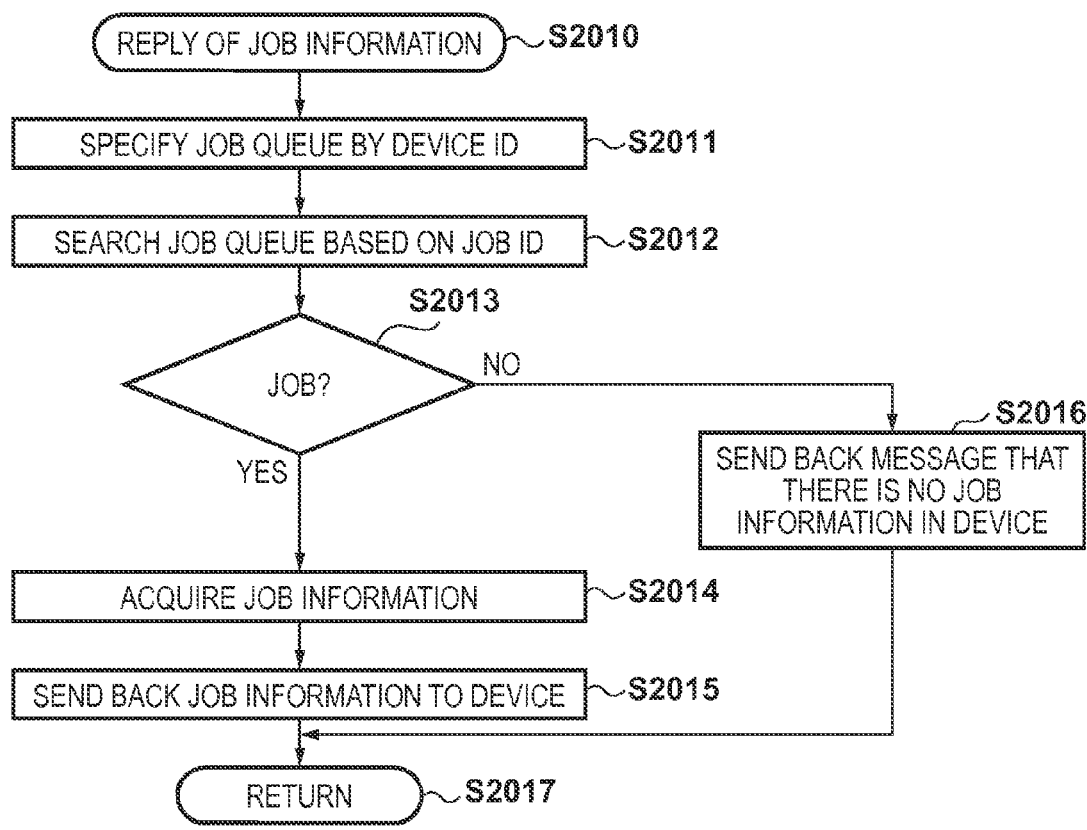

FIGS. 20A and 20B are flowcharts showing the procedures of job stack processing and job information reply processing in the proxy APP 143. FIG. 20A is a flowchart showing the procedures of job stack processing in the proxy APP 143.

When job stack processing is executed in step S1909 of FIG. 19, the proxy APP 143 starts the job stack processing in FIG. 20A (step S2001). The proxy APP 143 stacks a job in the job queue shown in FIG. 22A, and saves each piece of information in a table capable of storing job information shown in FIG. 22B (step S2002). The proxy APP 143 generates a job ID (step S2003), and sends back the job ID (print job ID or read job ID) to the call source of this processing. Then, the control returns to the call source of this processing (step S2004).

FIG. 20B is a flowchart showing the procedures of job information reply processing in the proxy APP 143. When job information reply processing is executed in step S1918 of FIG. 19, the proxy APP 143 starts the job information reply processing in FIG. 20B (step S2010). The proxy APP 143 specifies the job queue of the target device (MFP 3) (step S2011), and searches the job queue for a job having a coincident job ID (step S2012).

An example of the job queue is one shown in FIG. 22A. If the proxy APP 143 determines that a job exists in the job queue, the process advances to step S2014. If the proxy APP 143 determines that no job exists, the process advances to step S2016 (step S2013).

In step S2014, the proxy APP 143 acquires job information of a job ID stacked in the job queue, and the process advances to step S2015. In step S2015, the proxy APP 143 sends back the job information acquired in step S2014 to the device, and the control returns to the call source of this processing (step S2017).

Since a job having the job ID does not exist in the job queue of the target device in step S2016, the proxy APP 143 sends back, to the device, a message that there is no job information. Then, the control returns to the call source of this processing (step S2017).

[Job Notification Processing in Proxy APP 143]

FIG. 21 is a flowchart showing the procedures of job notification processing in the proxy APP 143. The proxy APP 143 is always active, executes processing shown in FIG. 21 sequentially for management/control target devices (printer and MFP), and if necessary, transmits job notifications (print job notifications) to the target devices. FIG. 21 shows processing after a target device is specified. In this example, the MFP 3 is specified as a target device.

If the MFP 3 is specified as a target device and job notification processing is executed, the proxy APP 143 starts processing shown in FIG. 21 (step S2101). The proxy APP 143 confirms the state of the device (MFP 3) (step S2102). If the proxy APP 143 determines that the device is in the online state, the process advances to step S2104. If the proxy APP 143 determines that the device is not in the online state, the process advances to step S2109 (step S2103).

In step S2104, the proxy APP 143 refers to the job queue shown in FIG. 22A, and confirms the presence/absence of a print job for the MFP 3. If the proxy APP 143 determines that there is a print job, the process advances to step S2105. If the proxy APP 143 determines that there is no print job, the process advances to step S2109.

In step S2105, the proxy APP 143 requests image conversion of the image conversion APP 144. In accordance with the image conversion request from the proxy APP 143, the image conversion APP 144 converts a print target image into a JPEG file serving as a file format printable by the MFP 3 (step S2106). The print target image is a print target content or a PDF file generated for printing, which is temporarily saved in the HDD 202 by the document creation APP 145.

Upon completion of the image conversion processing by the image conversion APP 144, the proxy APP 143 confirms the necessity/nonnecessity of a job notification (print job notification) by referring to detailed information of the print job shown in FIG. 22B using the job ID of the print job during processing as a key. If the proxy APP 143 determines that the job notification is necessary (notification=yes), the process advances to step S2108. If the proxy APP 143 determines that the job notification is unnecessary (notification=no), the process advances to step S2109 (step S2107). In step S2107, the proxy APP 143 saves the determination result as information representing the necessity/nonnecessity of a job notification in the table that stores job information shown in FIG. 22B. In step S2108, the proxy APP 143 transmits the job notification (print job notification) to the MFP 3, and ends this processing (step S2109).

[Job Queue in Proxy APP 143 and Print Job Information of Job Stacked in Job Queue]

FIGS. 22A and 22B are a table showing the job queue in the proxy APP 143, and a table showing a table that stores print job information of a job stacked in the job queue of the proxy APP 143. The job queue is constituted by a general database. In FIGS. 22A and 22B, a job ID with "prn" is the job ID of a print job, and the proxy APP 143 generates such job IDs. In an example of a job ID "prn0010" shown in FIG. 22A, the issuing year/month/day/time represents that this job was issued at 7:7:15 on Aug. 14, 2012. The job queue in FIG. 22A is constituted by only one job queue, and is an example of a job queue set to have top priority and no capacity limitation.

Pieces of print job information stored in the table shown in FIG. 22B are, for example, the issuing year/month/day/time, host, owner name, device ID, job ticket path (URI), print image data path (URL), status, the necessity/nonnecessity of a job notification, and the priority of a job.

[Print Job Deletion Processing in Proxy APP 143]

FIG. 23 is a flowchart showing the procedures of print job deletion processing in the proxy APP 143. If print job deletion processing is executed in step S1920 of FIG. 19, the proxy APP 143 starts the print job deletion processing (step S2301). The proxy APP 143 issues a print image file deletion request to the image conversion APP 144 (step S2302). The image conversion APP 144 deletes the print image file stored at a path (URI) designated by dataUri (step S2303).

The proxy APP 143 issues a print target image deletion request to the document creation APP 145 (step S2304). The document creation APP 145 deletes a print target image, that is, a print target content or a PDF file generated for printing, which is temporarily saved in the HDD 202 (step S2305). The proxy APP 143 issues a job ticket deletion request (step S2306). The document creation APP 145 deletes the print setting file (job ticket) (step S2307). The proxy APP 143 deletes job information, and deletes this job from the job queue shown in FIG. 22A (step S2308). Then, the control returns to the call source of this processing (step S2309).

[Registration of Print Job Request of Cloud Printing in Print Queue Database]

FIG. 24 is a flowchart showing the procedures of processing of registering a print job request of cloud printing in the print queue database. A program regarding the flowchart of FIG. 24 is stored in the ROM 16, read out to the RAM 17, and executed by the CPU 15.

When print job request registration processing is executed in step S1915 of FIG. 19, the MFP 3 starts processing of registering a print job request in the print queue database (step S2401). In step S2401, the MFP 3 confirms the print queue database shown in FIG. 26A. If the MFP 3 determines in step S2402 that the print queue database has a free area and a print job request can be registered in step S2402, the process advances to step S2404. If the print queue database does not have a free area and no print job request can be registered, the process advances to step S2405.

In step S2404, the MFP 3 registers the print job request of a cloud print job with a Protocol name "HTTP" in the print queue database shown in FIG. 26A, and ends this processing (step S2406).

In step S2405, the MFP 3 transmits the print job request to the proxy APP 143, and ends this processing (step S2406). The proxy APP 143 receives the print job request (step S2407), registers it in the print queue database shown in FIG. 26B (step S2408), and ends this processing (step S2409).

[Confirmation Processing of Top-Priority Print Job Request in Print Queue Database in MFP 3]

Figure 25:
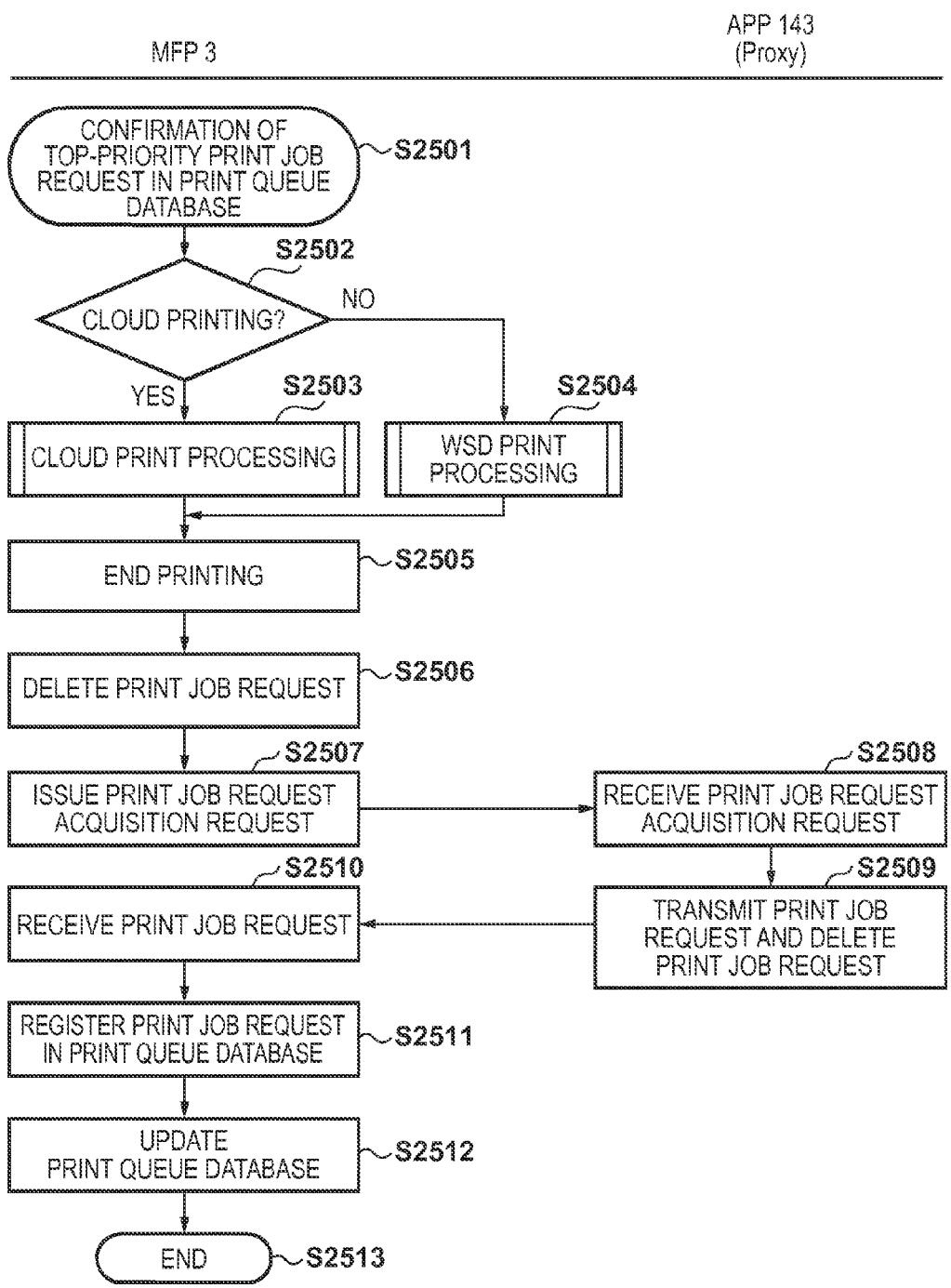
FIG. 25 is a flowchart showing the procedures of confirmation processing of a top-priority print job request in the print queue database of the MFP.

FIG. 25 is a flowchart showing the procedures of confirmation processing of a top-priority print job request in the print queue database of the MFP 3. Vertical lines represent processing execution sources, and correspond from the left to the MFP 3 and the proxy APP 143. In drawings in which there is no processing for a certain execution source, this execution source is not illustrated in some cases. A program regarding the flowchart of FIG. 25 is stored in the ROM 16, read out to the RAM 17, and executed by the CPU 15.

When the MFP 3 registers a print job request in the print queue database shown in FIG. 26A in a state in which the print job request is reserved in the print queue database shown in FIG. 26B in the proxy APP 143, or when a top-priority print job request is updated, processing shown in FIG. 25 is executed (step S2501). In step S2502, the MFP 3 confirms the "Protocol" field of a top-priority print job request reserved in the print queue database shown in FIG. 26A, and determines whether the print job request indicates cloud printing. If "HTTP" is registered, the MFP 3 determines that the print job request indicates cloud printing, and the process advances to step S2503. If "WSD" is registered, the MFP 3 determines that the print job request does not indicate cloud printing, and the process advances to step S2504.

In step S2503, the MFP 3 performs cloud print processing in steps S1917 to S1921 of FIG. 19, and ends the printing (step S2505). On the other hand, in step S2504, the MFP 3 receives a print job from a PC, as shown in FIG. 14, starts printing, and ends it (step S2505).

After the end of printing, the MFP 3 deletes the print job request, printing of which has ended (has been executed), from the print queue database (step S2506). The MFP 3 issues a print job request acquisition request to the proxy APP 143 (step S2507).

The proxy APP 143 receives the print job request acquisition request from the MFP 3 (step S2508), and transmits, to the MFP 3, a top-priority print job request among print job requests reserved in the print queue database of FIG. 26B in the proxy APP 143. The proxy APP 143 deletes the transmitted print job request from the print queue database (step S2509). The MFP 3 registers the print job request received from the proxy APP 143 (step S2510) in the print queue database of the MFP 3 (step S2511), updates the print queue database in step S2512, and ends the processing (step S2513).

[Print Queue Database Update Interrupt Processing in MFP 3]

Figure 27:
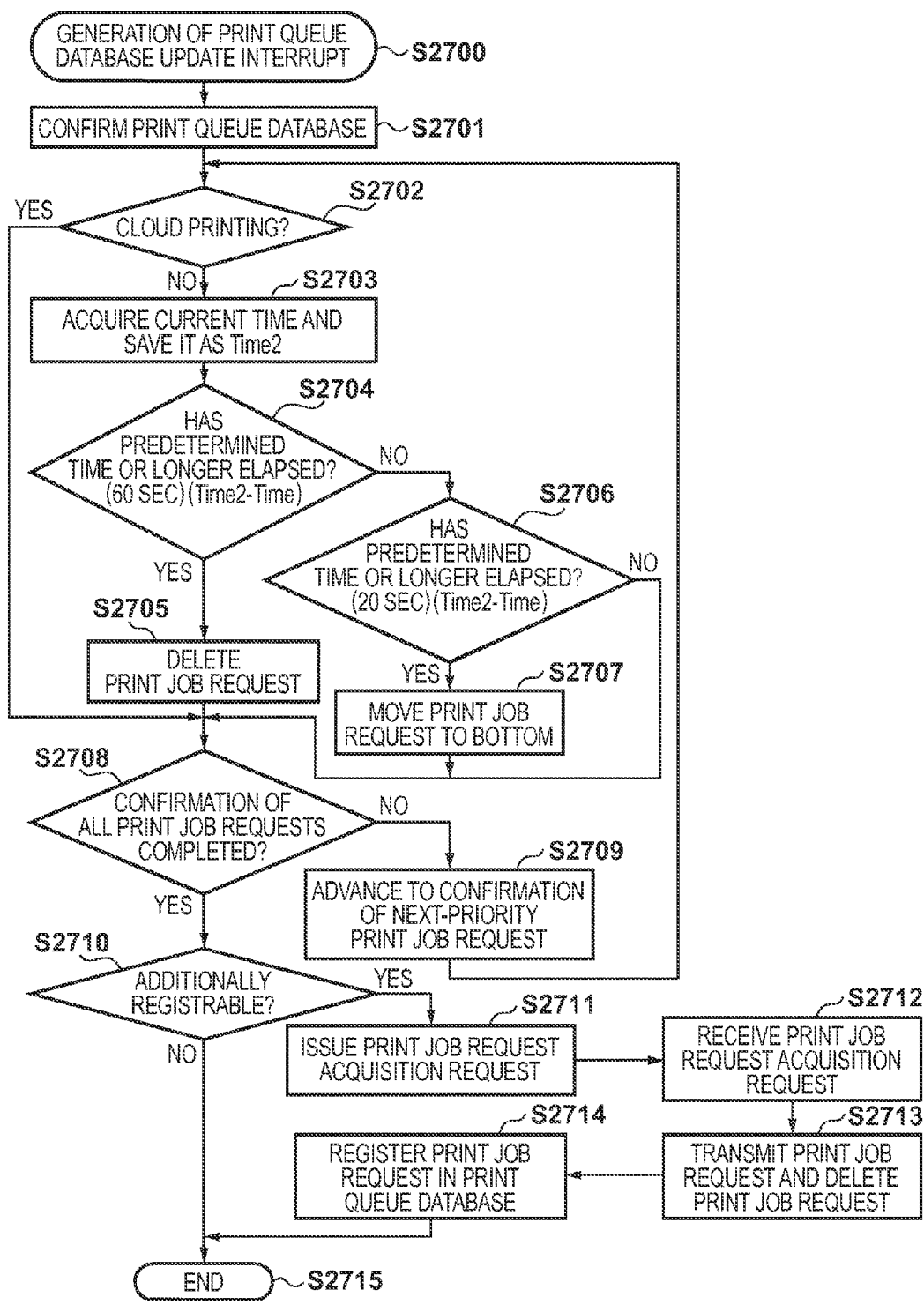
FIG. 27 is a flowchart showing the procedures of print queue database update interrupt processing in the MFP.

FIG. 27 is a flowchart showing the procedures of print queue database update interrupt processing in the MFP 3. Vertical lines represent processing execution sources, and correspond from the left to the MFP 3 and the proxy APP 143. In drawings in which there is no processing for a certain execution source, this execution source is not illustrated in some cases. A program regarding the flowchart of FIG. 27 is stored in the ROM 16, read out to the RAM 17, and executed by the CPU 15.

An interrupt is generated every 180 sec based on a timer incorporated in the MFP 3, and processing shown in FIG. 27 is executed. When the interrupt processing is generated based on the timer incorporated in the MFP 3, step S2700 of FIG. 27 starts. The MFP 3 confirms the contents of a top-priority print job request among print job requests reserved in the print queue database shown in FIG. 26A (step S2701), and determines whether the print job request indicates cloud printing (step S2702). If "HTTP" is registered in the "Protocol" field of the print job request confirmed in step S2701, the MFP 3 determines that the print job request indicates cloud printing, and the process advances to step S2708. If "WSD" is registered, the MFP 3 determines that the print job request does not indicate cloud printing, and the process advances to step S2703.

In step S2703, the MFP 3 saves, as Time2 in the RAM or the like, a count value capable of measuring the time or elapsed time from the built-in timer (step S2703). The unit of the count value is, for example, "sec". The MFP 3 subtracts a time count value set in the "Time" field of the print queue database from Time2. If the MFP 3 determines that the subtraction result has exceeded a predetermined time (60 sec), the process advances to step S2705. If the subtraction result has not exceeded the predetermined time (60 sec), the process advances to step S2706 (step S2704).

In step S2705, the MFP 3 deletes a reservation for the print job request confirmed in step S2701 from the print queue database shown in FIG. 26A. The process then advances to step S2708. At this time, the MFP 3 deletes even the print reservation ID (ans:ReceivedId) of the print job request.

In step S2706, the MFP 3 determines whether the subtraction result obtained in step S2704 has exceeded a predetermined time (20 sec) (step S2706). If the MFP determines that the subtraction result has exceeded the predetermined time (20 sec), the process advances to step S2707. If the MFP determines that the subtraction result has not exceeded the predetermined time (20 sec), the process advances to step S2708. In this embodiment, the predetermined time (20 sec) is the same value as the time of 20 sec set in step S1315 of FIG. 13. In step S2707, the MFP 3 temporarily deletes the print reservation ID (ans:ReceivedId) of the print job request targeted in step S2701. The MFP 3 moves this print job request to the bottom of the print queue database to change this reservation into a reservation for a lowest-priority print job request. Thereafter, the process advances to step S2708.

If the MFP 3 has completed the confirmation of reservations for all print job requests in step S2708, the process advances to step S2710. If the MFP 3 has not completed the confirmation, the process advances to step S2709. In step S2709, the MFP 3 advances to confirmation of a next-priority print job request in the print queue database shown in FIG. 26A. Then, the process returns to step S2702.

If the MFP 3 determines in step S2710 that the print queue database shown in FIG. 26A in the MFP 3 has a free area and a print job request can be registered, the process advances to step S2711. If the print queue database does not have a free area and no print job request can be registered, the print queue database update interrupt processing ends (step S2715).

In step S2711, the MFP 3 issues a print job request acquisition request to the proxy APP 143. In step S2712, the proxy APP 143 receives the print job request acquisition request issued from the MFP 3 in step S2711. In step S2713, the proxy APP 143 transmits, to the MFP 3, a top-priority print job request among print job requests reserved in the print queue database shown in FIG. 26B, and deletes the transmitted print job request from the print queue database. In step S2714, the MFP 3 registers the print job request transmitted from the proxy APP 143 in the print queue database shown in FIG. 26A, and ends the print queue database update interrupt processing (step S2715).

[Print Queue Database Update Processing]

Figure 28:
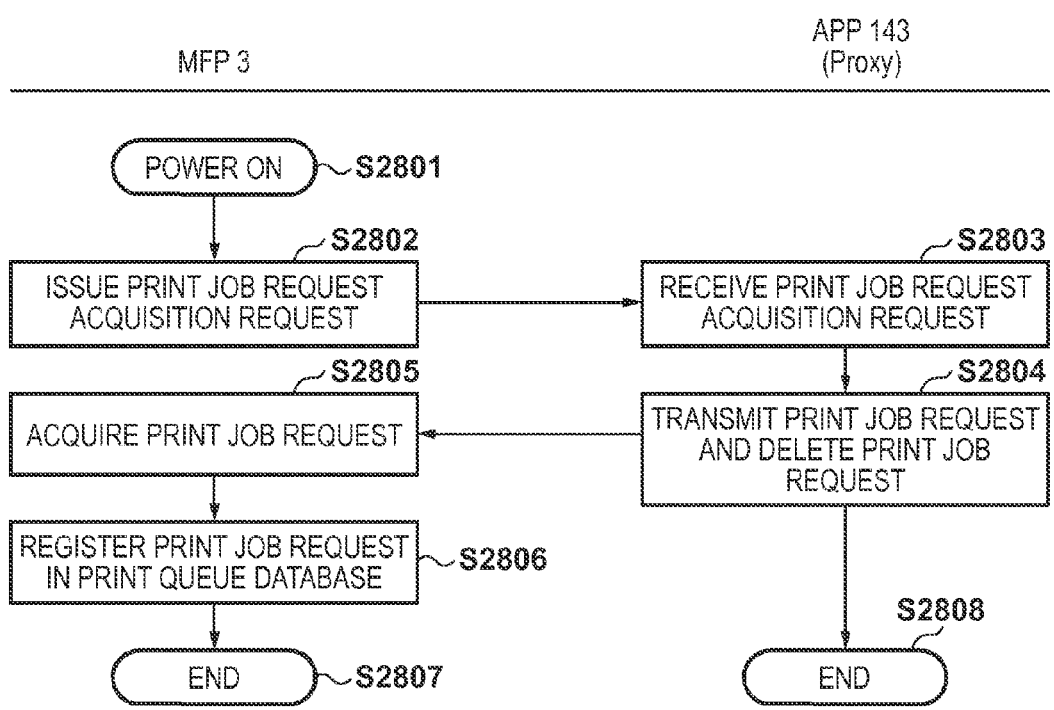
FIG. 28 is a flowchart showing the procedures of print queue database update processing in the MFP.

FIG. 28 is a flowchart showing the procedures of print queue database update processing. Vertical lines represent processing execution sources, and correspond from the left to the MFP 3 and the proxy APP 143. In drawings in which there is no processing for a certain execution source, this execution source is not illustrated in some cases. A program regarding the flowchart of FIG. 28 is stored in the ROM 16, read out to the RAM 17, and executed by the CPU 15.

This processing is performed when the print queue database shown in FIG. 26A is stored in a volatile memory such as the RAM 17. When the print queue database shown in FIG. 26A is stored in a nonvolatile memory (not shown), this processing need not be performed.

When the MFP 3 is turned on, the processing shown in FIG. 28 starts (step S2801). In step S2802, the MFP 3 issues a print job request acquisition request to the proxy APP 143. The proxy APP 143 receives the print job request acquisition request from the MFP 3 (step S2803), and transmits print job requests to the MFP 3 by the number by which print job requests can be registered in the print queue database of the MFP 3, out of print job requests reserved in the print queue database shown in FIG. 26B in the proxy APP 143. The proxy APP 143 deletes the transmitted print job requests from the print queue database (step S2804), and ends this processing (step S2808).

The MFP 3 receives the print job request transmitted from the proxy APP 143 (step S2805), registers the received print job request in the print queue database (step S2806), and ends the print queue database update processing (step S2807).

In this embodiment, print jobs of different protocols are managed in a single print queue database and thus printing can be performed in the issuing order. More specifically, for example, WSD printing from an information processing apparatus connected by a local network, and cloud printing from an information processing apparatus connected via a wide area network are managed using a single print queue database, and WSD printing and cloud printing can be performed in the issuing order.

In this embodiment, an apparatus (MFP 3 in this case) that executes printing includes a print queue database (print queue management table). In addition, an external apparatus (PC 2 in this case) connected via a wide area network to the MFP 3 that executes printing also includes a print queue database for the MFP 3. Even the print queue database of the proxy APP 143 of the PC 2 can centralize management of print job requests of different protocols. When the print request of a print job is transmitted to the MFP 3 and the transmitted print job request cannot be registered in the print queue database of the MFP 3, the print job is transferred to the PC 2 and registered in the print queue database of the PC 2. Accordingly, a larger number of print job reservation requests can be managed. That is, even when the capacity of the print queue database of the MFP 3 is small and no reservation request can be registered in the print queue database of the MFP 3, printing can be reserved.

Second Embodiment

The first embodiment has explained an example in which the document creation APP 145 is executed from the Web browser 25 of the PC 1 to perform printing, as shown in FIGS. 19 and 21. In this example, before the proxy APP 143 issues a print job notification to the MFP 3, image conversion processing in steps S2105 and S2106 of FIG. 21 is performed. When the processing in step S1917 of FIG. 19 starts, the MFP 3 can quickly acquire the converted image data and print.

However, when the processing in step S1917 of FIG. 19 does not start, image data converted in step S2106 of FIG. 21 remains present in the PC 2 and occupies the disk capacity of the PC 2 during the presence. It is therefore preferable to delete image data from the PC 2 in terms of the disk capacity and security when the image data is not printed for a specific time or longer.

However, when image data is deleted from the PC 2 a specific time or longer after image conversion in step S2106 of FIG. 21, if the print job acquisition request in step S1917 of FIG. 19 starts upon the lapse of the specific time or longer (after deleting the image data), printing may fail. The second embodiment will explain an example of a peripheral apparatus control system for solving this problem. A description of the contents already described in the first embodiment will not be given.

In this embodiment, the image conversion request in step S2105 of FIG. 21 and image conversion processing in step S2106 are performed after issuing acquisition of a print job request from an MFP 3 to a proxy APP 143 in step S1917 of FIG. 19. Hence, after the MFP 3 becomes able to start printing, the image conversion request in step S2105 and image conversion processing in step S2106 are performed. The MFP 3 can quickly print a converted image.

Other Embodiments

The present invention is not limited to the above-described embodiments. For example, in the above-described embodiments, an application server that provides cloud printing includes a print queue database other than the print queue database of an apparatus (MFP 3) that executes printing. However, the present invention is not limited to this. That is, an external apparatus connectable via a network to the apparatus that executes printing suffices to include a print queue database for the apparatus that executes printing. Also, a plurality of external apparatuses may include print queue databases for the apparatus that executes printing. Accordingly, a larger number of print jobs can be registered.

The above-described embodiments have exemplified WSD printing as the first job issued via a local area network. However, the present invention is not limited to this and is applicable to even printing of another protocol. In this case, the print queue database of the MFP 3 suffices to accept WSD printing and printing of another protocol accepted via a local area network, and cloud printing accepted via a wide area network, and manage print jobs (print job requests) in accordance with the order of issuing from information processing apparatuses.

In the above-described embodiments, the proxy APP 143 performs print job deletion processing. However, the present invention is not limited to this, and the MFP 3 may perform print job deletion processing.

The above-described embodiments employ Ethernet® as the interface of a network used by the PCs 1, 2, 5, 7, 60, 61, and 741 and the MFPs 3 and 103. However, the interface is not limited to this, and an arbitrary interface such as a wireless LAN, IEEE1394, Bluetooth®, or USB may be used. Also, some or all of functions in various applications (firmware) and processes regarding the above-mentioned flowcharts may be constituted using dedicated hardware.

The above-described embodiments have assumed a personal computer as an information processing apparatus. However, the present invention is not limited to this, and is applicable to an arbitrary information processing apparatus (terminal) that enables a similar use method, such as a DVD player, a game machine, a set-top box, or an Internet home appliance. The present invention is thus effective.

The above-described embodiments have exemplified an MFP as a peripheral apparatus. However, the peripheral apparatus may be any of a copying machine, a facsimile apparatus, a scanner, a digital camera, and an apparatus having these multiple functions. As an example of the OS, the above-described embodiments have exemplified an OS equivalent to Windows. However, the present invention is not limited to this OS, and an arbitrary OS is usable. The above-described embodiments use Ethernet® as an example of the configuration of the network 4. However, the present invention is not limited to this example, and an arbitrary network configuration is possible.

The above-described embodiments have explained an example of utilizing a printing system that uses the WSD protocol from the PC 60. However, the present invention is similarly applicable to a printing system that uses a vendor-specific protocol from the PC 60, an arbitrary printing system such as another local or network printing system provided by an OS, or a case in which an arbitrary protocol is used. The above-described embodiments have explained an example of utilizing a printing system that uses GCP from the PC 1. However, the present invention is similarly applicable to a printing system using an arbitrary print service such as Internet Printing Protocol or Universal Plug and Play.

The present invention is also implemented by executing the following processing. More specifically, software (program) for implementing the functions of the above-described embodiments is supplied to a system or apparatus via a network or various kinds of storage media, and the computer (or CPU or MPU) of the system or apparatus reads out and executes the program. The program may be executed by a single computer or a plurality of computers in cooperation. Not all of the above processes need be implemented by software, and some or all of the processes may be implemented by hardware such as an ASIC. Also, it is not necessary to perform all the processes by one CPU, and a plurality of CPUs may perform the processes in cooperation, as needed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-023768, filed Feb. 10, 2014, which is hereby incorporated by reference herein in its entirety.

What is claimed is:

1. An image forming apparatus, comprising:
a reception unit configured to receive a print request of a print job issued from one or more information processing apparatuses
a control unit configured to store information of the print request received by the reception unit in a first print queue in an issuing order of the print request received by the reception unit;
an obtaining unit configured to obtain a print job based on the information of the print request stored in the first print queue;
an executing unit configured to execute the print job obtained by the obtaining unit;
a transmitting unit configured to transmit the print request received by the reception unit without storing the information of the print request received by the reception unit in the first print queue, in accordance with a free capacity of the first print queue, to an external apparatus including a second print queue for the image forming apparatus, wherein the external apparatus is able to transmit the print request stored in the second print queue to the image forming apparatus in response to an acquisition request by the image forming apparatus, and the second print queue stores the information of the transmitted print request in the issuing order;
an issuing unit configured to issue the acquisition request of the transmitted print request to the external apparatus after the executing unit executes the print job,
a determination unit configured to determine whether information of a print request stored in the first print queue is information of the print request received from a first information processing apparatus via a wide area network; and
a second issuing unit configured to issue an acquisition request of the print job in a case where the determination unit determines that information of a print request stored in the first print queue is the information of the print request received from the first information processing apparatus via the wide area network,
wherein the obtaining unit obtains the print job from a second information processing apparatus, which is different from the first information processing apparatus, based on print job information transmitted from the first information processing apparatus according to the acquisition request issued by the second issuing unit, and wherein each of the reception unit, the control unit, the obtaining unit, the executing unit, the transmitting unit and the issuing unit is implemented using at least one processor.

2. The apparatus according to claim 1, wherein the external apparatus is connected to the image forming apparatus via a wide area network.

3. The apparatus according to claim 1, further comprising a notification unit configured to, in a case where the print job corresponding to the print request which is received from an information processing apparatus which is connected to the image forming apparatus via a wide area network by the reception unit is executed, notify the information processing apparatus which issued the print request corresponding to the executed print job, of a completion of an execution of the print job.

4. The apparatus according to claim 1, wherein in a case where the first print queue does not have a free capacity capable of storing the information of the print request received by the reception unit, the transmitting unit transmits the print request received by the reception unit to the external apparatus.

5. The apparatus according to claim 1, wherein the control unit moves the information of the print request received from an information processing apparatus which is connected to the image forming apparatus via a wide area network, for which a predetermined time has elapsed after storing in the first print queue, to an end of a queue in the first print queue.

6. The apparatus according to claim 1, wherein the control unit acquires, from the second print queue in the issuing order, the print request.

7. The apparatus according to claim 1, further comprising:
  a determination unit configured to determine whether information of a print request stored in the first print queue is information of the print request received from a first information processing apparatus which is connected to the image forming apparatus via a wide area network; and
  a second issuing unit configured to issue an acquisition request of the print job in a case where the determination unit determines that information of a print request stored in the first print queue is the information of the print request received from the first information processing apparatus which is connected to the image forming apparatus via the wide area network,
  wherein the obtaining unit obtains the print job from a second information processing apparatus based on print job information transmitted from the first information processing apparatus according to the acquisition request issued by the second issuing unit, wherein the second information processing apparatus is an apparatus which is different from the first information processing apparatus from which the reception unit receives the print request, and
  wherein each of the determination unit and the second issuing unit is implemented using a processor.

8. The apparatus according to claim 1, wherein the print request received by the reception unit includes issuing time of a job from an information processing apparatus of the one or more information processing apparatuses.

9. The apparatus according to claim 1, wherein the reception unit receives the print request issued from an information processing apparatus via a wide area network, and receives another print request issued from another information processing apparatus via a local area network.

10. The apparatus according to claim 1, further comprising a determination unit configured to determine whether the information of the print request received by the reception unit has been stored in the first print queue, and
  wherein in a case where the determination unit determines that the information of the print request received by the reception unit has not been stored in the first print queue, and the print request received by the reception unit is able to be stored in the first print queue, the control unit stores the information of the print request received by the reception unit.

11. The apparatus according to claim 1, wherein the control unit deletes the information of the print request of the print job executed by the executing unit from the first print queue, in a case where the issuing unit issues the acquisition request to the external apparatus after the executing unit executes the print job.

12. A control method to be executed in an image forming apparatus, the control method comprising:
  receiving a print request of a print job issued from one or more information processing apparatuses;
  storing information of the received print request, in a first print queue in an issuing order of the received print request;
  obtaining a print job based on the information of the print request stored in the first print queue;
  executing the obtained print job;
  transmitting the received print request without storing the information of the received print request in the first print queue, in accordance with a free capacity of the first print queue, to an external apparatus including a second print queue for the image forming apparatus, wherein the external apparatus is able to transmit the print request stored in the second print queue to the image forming apparatus in response to an acquisition request by the image forming apparatus, and the second print queue stores the information of the transmitted print request in the issuing order; and
  issuing the acquisition request of the transmitted print request to the external apparatus after the print job is executed;
  determining whether information of a print request stored in the first print queue is information of the print request received from a first information processing apparatus via a wide area network; and
  issuing an acquisition request of the print job in a case where it is determined that information of a print request stored in the first print queue is the information of the print request received from the first information processing apparatus via the wide area network,
  wherein the print job is obtained from a second information processing apparatus, which is different from the first information processing apparatus, based on print job information transmitted from the first information processing apparatus according to the acquisition request issued by the second issuing unit.

13. A non-transitory computer-readable storage medium storing a program for causing a computer to execute each step of a control method to be executed in an image forming apparatus, the method comprising:

receiving a print request of a print job issued from one or more information processing apparatuses;

storing information of the received print request, in a first print queue in an issuing order of the received print request;

obtaining a print job based on the information of the print request stored in the first print queue;

executing the obtained print job;

transmitting the received print request without storing the information of the received print request in the first print queue, in accordance with a free capacity of the first print queue, to an external apparatus including a second print queue for the image forming apparatus, wherein the external apparatus is able to transmit the print request stored in the second print queue to the image forming apparatus in response to an acquisition request by the image forming apparatus, and the second print queue stores the information of the transmitted print request in the issuing order; and issuing the acquisition request of the transmitted print request to the external apparatus after the print job is executed;

determining whether information of a print request stored in the first print queue is information of the print request received from a first information processing apparatus via a wide area network; and issuing an acquisition request of the print job in a case where it is determined that information of a print request stored in the first print queue is the information of the print request received from the first information processing apparatus via the wide area network, wherein the print job is obtained from a second information processing apparatus, which is different from the first information processing apparatus, based on print job information transmitted from the first information processing apparatus according to the acquisition request issued by the second issuing unit.

14. An image forming system comprising:

an image forming apparatus including:

a reception unit configured to receive a print request of a print job issued from one or more information processing apparatuses;

a control unit configured to store information of the print request received by the reception unit in a first print queue in an issuing order of the print request received by the reception unit; and an obtaining unit configured to obtain a print job based on the information of the print request stored in the first print queue;

an executing unit configured to execute the print job obtained by the obtaining unit;

a first transmitting unit configured to transmit the print request received by the reception unit without storing the information of the print request received by the reception unit in the first print queue, in accordance with a free capacity of the first print queue, to a first information processing apparatus including a second print queue for the image forming apparatus;

an issuing unit configured to issue an acquisition request of the transmitted print request to the first information processing apparatus after the executing unit executes the print job; and a determination unit configured to determine whether information of a print request stored in the first print queue is information of the print request received from the first information processing apparatus via a wide area network; and a second issuing unit configured to issue an acquisition request of the print job in a case where the determination unit determines that information of a print request stored in the first print queue is the information of the print request received from the first information processing apparatus via the wide area network, wherein the obtaining unit obtains the print job from a second information processing apparatus, which is different from the first information processing apparatus, based on print job information transmitted from the first information processing apparatus according to the acquisition request issued by the second issuing unit, and the first information processing apparatus which is connected to the image forming apparatus, the first information processing apparatus including:

a second print queue configured to store the information of the print request transmitted from the image forming apparatus, in the issuing order of the print request received by the reception unit;

a second transmitting unit configured to transmit the print request corresponding to the information of the print request stored in the second print queue to the image forming apparatus in response to the acquisition request issued by the issuing unit of the image forming apparatus, wherein each of the reception unit, the control unit, the obtaining unit, the executing unit, the first transmitting unit, the issuing unit, and the second transmitting unit is implemented using at least one processor.

15. The system according to claim 14, further comprising a second information processing apparatus including:

a generation unit configured to accept a print request issued from a third information processing apparatus via a wide area network and generate a print job; and a third transmitting unit configured to transmit, to the first information processing apparatus, the print job generated by generation unit, wherein each of the generation unit and the third transmitting unit is implemented using at least one processor.

16. The system according to claim 15, wherein the image forming apparatus further comprising a notification unit configured to notify, in a case where the print job corresponding to the print request which is transmitted by the second transmitting unit is executed, the first information processing apparatus of a completion of an execution of the print job;

wherein the first information apparatus further comprising a fourth transmitting unit configured to transmit a deletion request of the print job to the second information processing apparatus, in a case where the notification unit notifies the first information processing apparatus of the completion of the execution of the print job, wherein each of the notification unit and the fourth transmitting unit is implemented using at least one processor.

17. The system according to claim 14, wherein the first information processing apparatus is connected to the image forming apparatus via a wide area network.

18. The system according to claim 14, wherein the first information processing apparatus further comprising a third issuing unit configured to issue the print request of a print job; and wherein the first information processing apparatus is connected to the image forming apparatus via a wide area network, wherein the third issuing unit is implemented using at least one processor.

19. The system according to claim 14, wherein the reception unit receives the print request issued from an information processing apparatus via the wide area network, and receives another print request issued from another information processing apparatus via a local area network.

* * * * *